(12) United States Patent
Kobayashi

(10) Patent No.: US 9,165,249 B2
(45) Date of Patent: Oct. 20, 2015

(54) INFORMATION PROCESSING APPARATUS, INFORMATION PROCESSING METHOD, AND PROGRAM

(75) Inventor: Yoshiyuki Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 510 days.

(21) Appl. No.: 13/611,535

(22) Filed: Sep. 12, 2012

(65) Prior Publication Data

US 2013/0097107 A1   Apr. 18, 2013

(30) Foreign Application Priority Data

Oct. 12, 2011  (JP) ................................ 2011-224639

(51) Int. Cl.
  *G06F 15/18*  (2006.01)
  *G06N 3/12*  (2006.01)
(52) U.S. Cl.
  CPC ........................................ *G06N 3/126* (2013.01)
(58) Field of Classification Search
  None
  See application file for complete search history.

(56) References Cited

U.S. PATENT DOCUMENTS

| 8,001,063 B2 * | 8/2011 | Tesauro et al. ................... | 706/12 |
| 2008/0249844 A1 * | 10/2008 | Abe et al. ......................... | 705/10 |

FOREIGN PATENT DOCUMENTS

JP   2009-48266   3/2009

OTHER PUBLICATIONS

Lopes, Melo and Montesano. Active Learning for Reward Estimation in Inverse Reinforcement Learning. Machine Learning and Knowledge Discovery in Databases Lecture Notes in Computer Science vol. 5782, 2009, pp. 31-46.*
Niekum, S., L. Spector, and A. Barto. Jul. 2011. Evolution of Reward Functions for Reinforcement Learning. In GECCO'11 Posters, Genetic and Evolutionary Computation Conference. ACM Press. pp. 177-178.*
Mabu, Hirasawa and Hu. A Graph-Based Evolutionary Algorithm: Genetic Network Programming (GNP) and Its Extension Using Reinforcement Learning. Evolutionary Computation. Fall 2007, vol. 15, No. 3, pp. 369-398.*
Keller, Mannor and Precup. Automatic Basis Function Construction for Approximate Dynamic Programming and Reinforcement Learning. Proceedings of the 23rd International Conference on Machine Learning, Pittsburgh, PA, 2006.*
U.S. Appl. No. 13/616,988, filed Sep. 14, 2012, Kobayashi.

* cited by examiner

*Primary Examiner* — Jeffrey A Gaffin
*Assistant Examiner* — David H Kim
(74) *Attorney, Agent, or Firm* — Hazuki International, LLC

(57) ABSTRACT

Provided is an information processing apparatus including: a reward estimator generating unit using action history data, which includes state data expressing a state of an agent, action data expressing an agent's action, and a reward value expressing a reward of the action, as learning data to generate, through machine learning, a reward estimator estimating the reward value from inputted state data and action data; an action selecting unit preferentially selecting an action not included in the action history data but with a high estimated reward value; and an action history adding unit causing the agent to perform the selected action and adding to the action history data the state data and action data for the action and the action's reward value in association with each other. The reward estimator is regenerated when a set of state data, action data, and the reward value is added to the action history data.

12 Claims, 67 Drawing Sheets

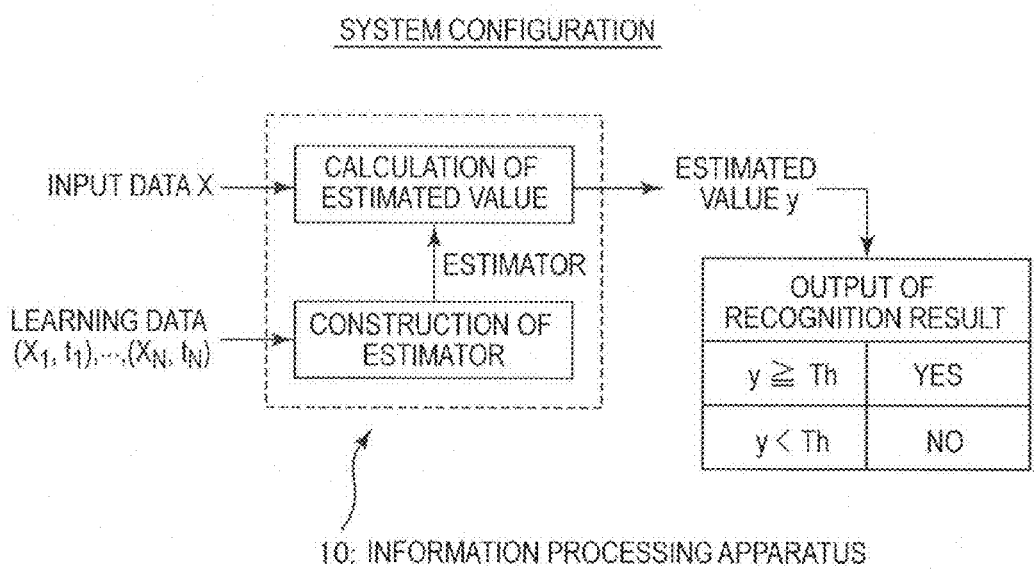

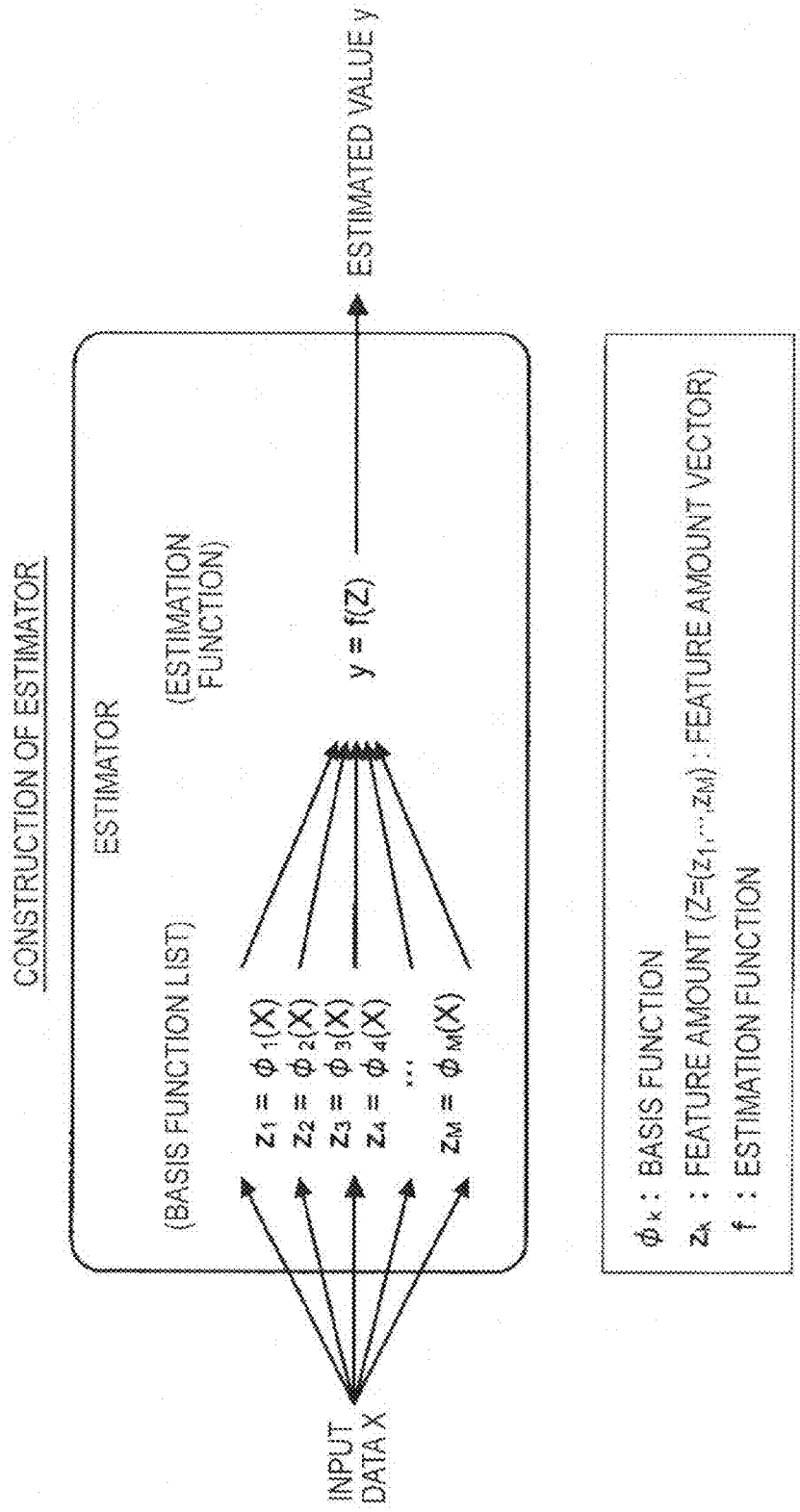

S202: NORMALIZATION OF FEATURE AMOUNT COORDINATES

BEFORE NORMALIZATION

|  | $z_1$ | $z_2$ | $z_3$ | ... |
|---|---|---|---|---|
| LEARNING DATA#1 | 12 | 0.01 | -1028 | ... |
| LEARNING DATA#2 | 15 | 0.03 | -650 | ... |
| LEARNING DATA#3 | 11 | 0.02 | -20 | ... |
| LEARNING DATA#4 | 13 | 0.05 | -34 | ... |
| ⋮ | ⋮ | ⋮ | ⋮ | ⋮ |

(DISPERSION 1, MEAN 0)

AFTER NORMALIZATION

|  | $z_1$ | $z_2$ | $z_3$ | ... |
|---|---|---|---|---|
| LEARNING DATA#1 | -0.43916 | -1.02470 | -1.20546 | ... |
| LEARNING DATA#2 | 1.31747 | 0.14639 | -0.43964 | ... |
| LEARNING DATA#3 | -1.02470 | -0.43916 | 0.83673 | ... |
| LEARNING DATA#4 | 0.14639 | 1.31747 | 0.80837 | ... |
| ⋮ | ⋮ | ⋮ | ⋮ | ⋮ |

S205: SELECTION OF ONE LEARNING DATA FROM PACKETS IN SPECIFIED ORDER

<SELECTION RULES>
- SKIP EMPTY PACKETS
- REMOVE SELECTED LEARNING DATA FROM ALL PACKETS
- RANDOMLY SELECT ONE LEARNING DATA IF A PLURALITY OF LEARNING DATA HAVE BEEN ASSIGNED TO A SINGLE PACKET

CORRESPONDENCE BETWEEN FEATURE AMOUNT SPACE AND PACKETS

CORRESPONDING TO PACKET

FIG. 26
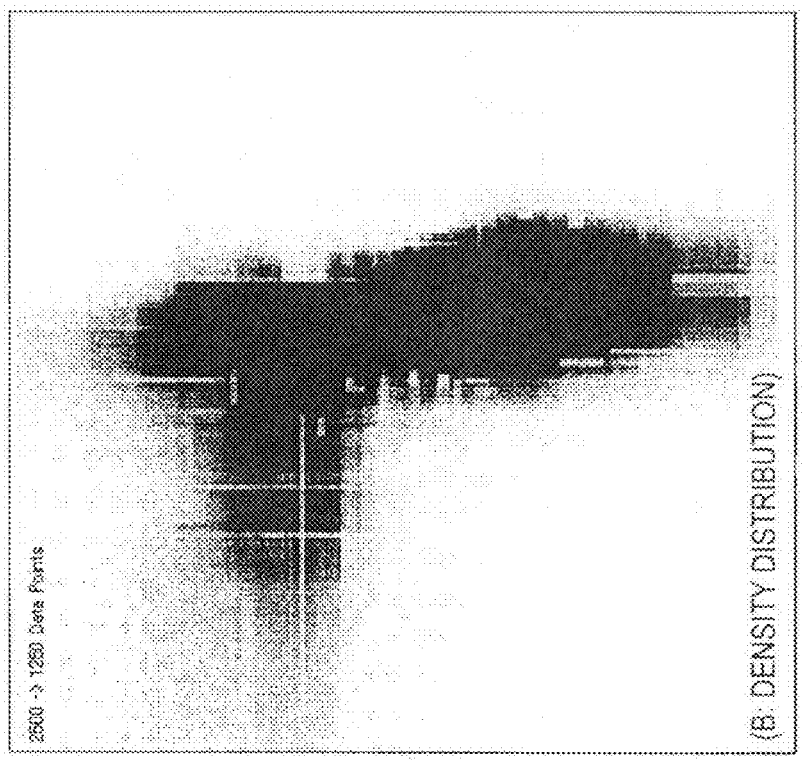
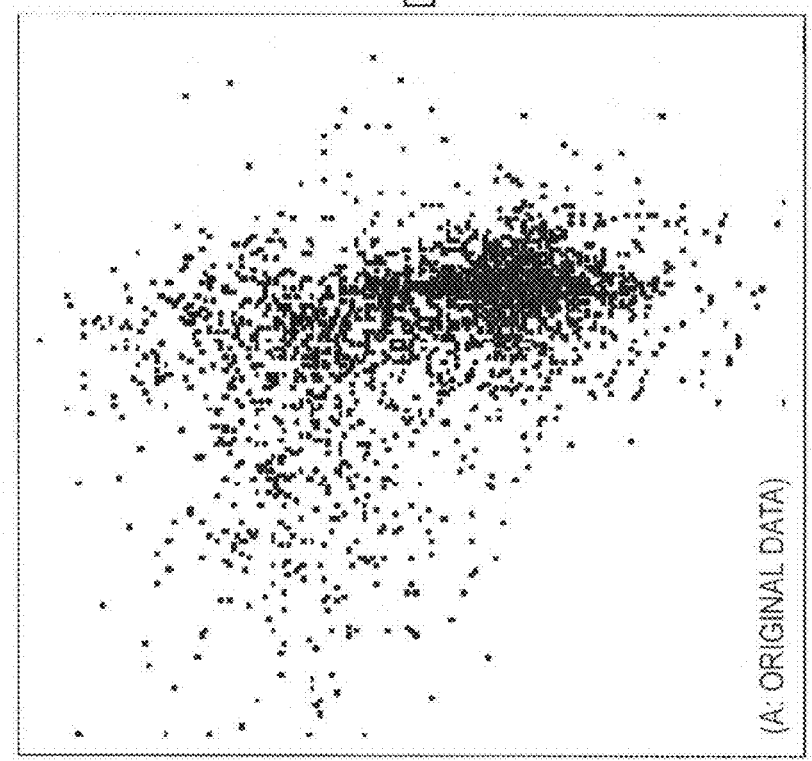

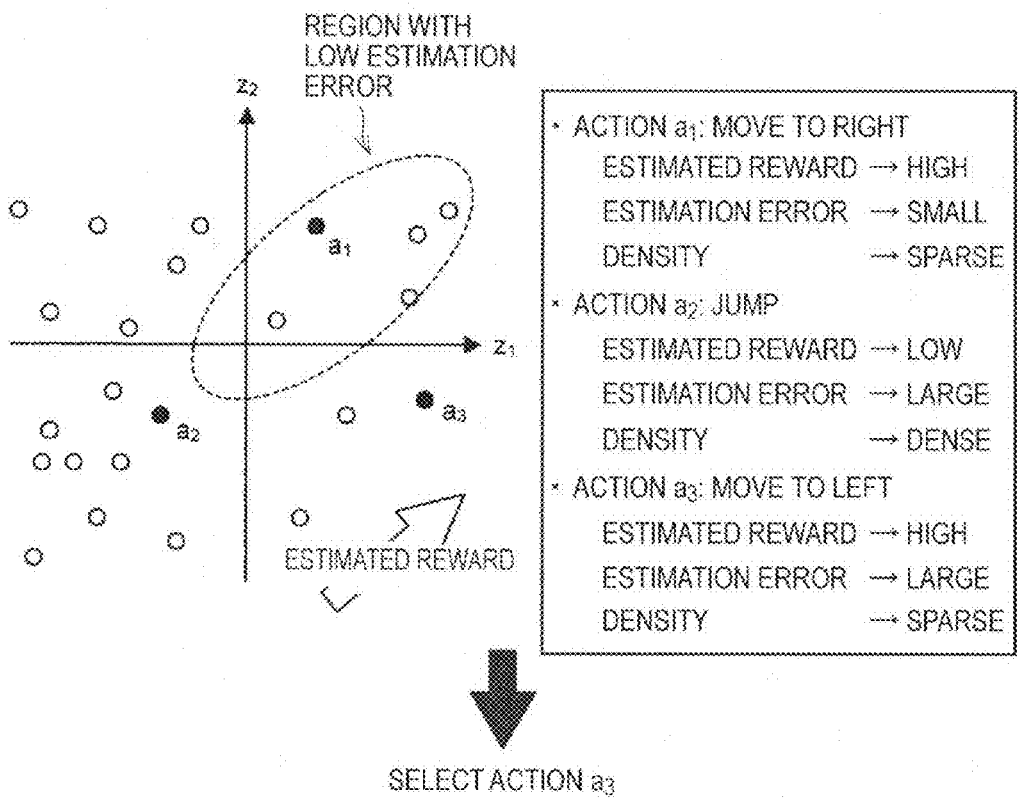

(MODIFICATION 1: THOUGHT ROUTINE USING ACTION SCORE ESTIMATOR)

(MODIFICATION 2: ESTIMATE REWARDS USING PREDICTOR)

(MODIFICATION 2: ESTIMATE REWARDS USING PREDICTOR)

STATE S(t), ACTION a(t) ⇨ PREDICTOR ⇨ STATE S(t+1) ⇨ REWARD ESTIMATOR ⇨ ESTIMATED REWARDS y (MODIFICATION 2: ESTIMATE REWARDS USING PREDICTOR)

(APPLICATION TO "TIC-TAC-TOE")

<RULES OF "TIC-TAC-TOE">

• PLAYERS TAKE ALTERNATE TURNS
• FIRST PLAYER TO PLACE
  THREE MARKS IN A ROW WINS

■ BOARD=S, MOVE=a

FIG. 49
(APPLICATION TO "TIC-TAC-TOE")
y = DISADVANTAGEOUS
FOR O
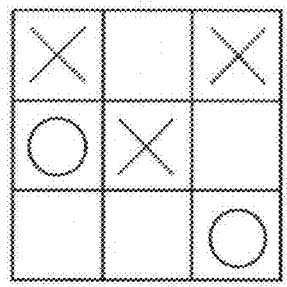
y = NEUTRAL
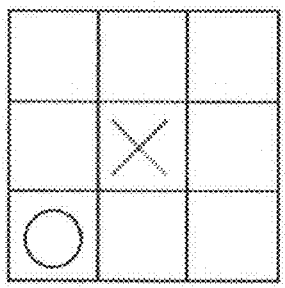
y = ADVANTAGEOUS
FOR O
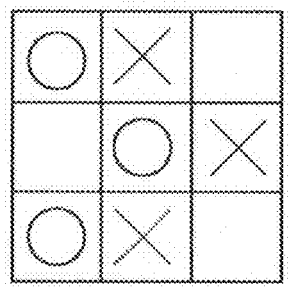
FIG. 50
(APPLICATION TO "TIC-TAC-TOE")
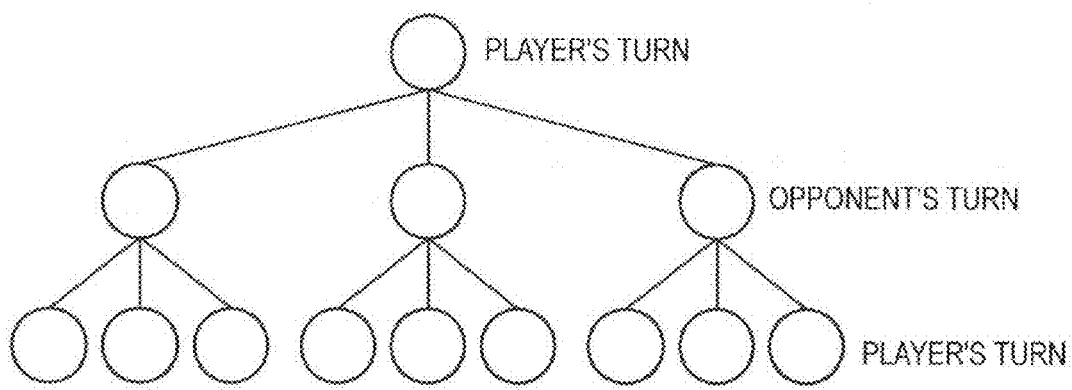

- STATE S, ACTION a EXPRESSED BY 3 × 3 MATRIX
  → STATE S IS BOARD AT START OF PLAYER'S TURN
  → BOARD THAT REFLECTS PLAYER'S MOVE IS (S, a)
- O (PLAYER) EXPRESSED AS "1", × (OPPONENT) AS "-1", AND EMPTY SPACES AS "0"

FIG. 55

(APPLICATION TO "FIGHTING GAME")

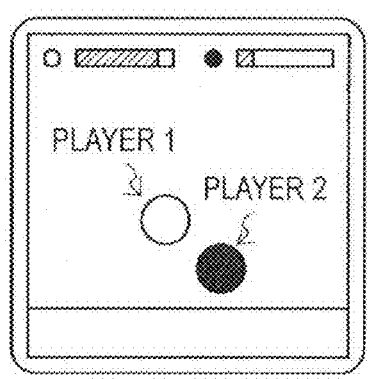

<RULES OF FIGHTING GAME>
- FIGHT BETWEEN TWO CHARACTERS
- ACTIONS OF THE RESPECTIVE PLAYERS ARE A COMBINATION OF "MOVE TO LEFT", "MOVE TO RIGHT", "NO LEFT/RIGHT MOVEMENT", "JUMP", AND "NO JUMP"
- IF PLAYER TRAMPLES ON OPPONENT, DAMAGE TO OPPONENT IS CAUSED IN KEEPING WITH THE DIFFERENCE IN ACCELERATION IN Y AXIS DIRECTION

FIG. 56

(APPLICATION TO "FIGHTING GAME")

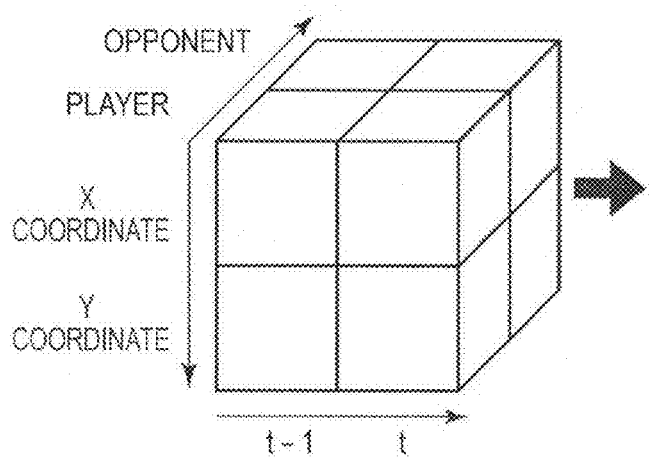

<ACTION SCORES AT TIME t>
- NO LEFT/RIGHT MOVEMENT: N = 0.5
- MOVE TO LEFT: L = 0.3
- MOVE TO RIGHT: R = 0.2
- JUMP: J = 0.1
- NO JUMP: NJ = 0.6

FIG. 57

(APPLICATION TO "FIGHTING GAME")

| BINARY DATA OF STATE S | N | L | R | J | NJ | |
|---|---|---|---|---|---|---|
| *as1235asagsdagsd554ads3a | 0 | 1 | 0 | 1 | 0 | |
| *lasrigfa543kjadfa674khla | 0 | 0 | 1 | 0 | 1 | ← REWARD r = 1 |
| *687ags87dagsd554ads3a | 0 | 1 | 0 | 1 | 0 | |
| *sdagsd55as1235asag4ads3a | 0 | 1 | 0 | 0 | 1 | |
| *gsd55as123sda5asag4ads3a | 0 | 0 | 1 | 1 | 0 | ← CAUSE DAMAGE |
| *s4ad687d55ags87dags3a | 0 | 1 | 0 | 0 | 1 | |
| *87dad687d55gs3as4aags | 0 | 1 | 0 | 0 | 1 | ← REWARD r = 0 |
| *5ags8gs3as4ad7da687d5 | 1 | 0 | 0 | 1 | 0 | ← RECEIVE DAMAGE |
| ⋮ | ⋮ | ⋮ | ⋮ | ⋮ | ⋮ | |

↓ TIME (APPLICATION TO "FIGHTING GAME":
SIMULTANEOUS LEARNING FOR PLURALITY OF PLAYERS)

EVALUATION RESULT FOR 1000 MATCHES AFTER LEARNING

|    | WIN RATIO FOR MATCHES | RANDOM OPPONENT |
|----|-----------------------|-----------------|
| 1P | 90.6%                 | 92.4%           |
| 2P | 9.4%                  | 91.5%           |

(APPLICATION TO "FIGHTING GAME")

STATE S=LUMINANCE IMAGE FOR GAME SCREEN (16 × 16 BLOCKS)

(APPLICATION TO "POKER")

<RULES OF POKER>
- PLAYER ARE DEALT FIVE CARDS
- CARDS TO BE DISCARDED ARE SELECTED
- STRONGEST HAND WINS

↓

- CONSTRUCT THOUGHT ROUTINE THAT DECIDES CARDS TO BE DISCARDED (APPLICATION TO "POKER")

STATE S, ACTION a EXPRESSED BY SYMBOL STRINGS

FIG. 67

(APPLICATION TO "POKER")

ACTION HISTORY DATA

| STATE S: ACTION a EXPRESSED BY SYMBOL STRINGS | REWARD r |
|---|---|
| D7SJHKCJS9: SJ HK CJ S9 | 1 |
| H5DJH0D4DQ: D4 | 1 |
| S6CQSJSKH0: CQ SK | 1 |
| CQHQDAD9D5: HQ D9 | 1 |
| C2D2H4HQDA: D2 H4 | 0 |
| ⋮ | ⋮ |

<RPG RULES>
- FOUR CHARACTERS IN A PARTY    · THREE TO FIVE ENEMIES
- STATE S=INFORMATION PROVIDED TO PLAYER
  (ex. STATUS, TYPE OF ENEMIES, ETC.)
- ACTION a=COMMAND
  (ex. FIGHT→TARGET, MAGIC→MAGIC TYPE→TARG)

FIG. 70

(APPLICATION TO "ROLE-PLAYING GAME": PROFESSIONS)

| PROFESSION | STATUS INCREASE RATE (MULTIPLE) | | | | | MAGIC LEVEL | | | MAGIC EFFECT (MULTIPLE) | | |
|---|---|---|---|---|---|---|---|---|---|---|---|
| | MAX HP | MAX MP | ATTACK STRENGTH | DEFENSE STRENGTH | SPEED | Heal | Fire | Ice | Heal | Fire | Ice |
| KNIGHT | 1.06 | 1.00 | 1.06 | 1.05 | 1.04 | | | | 1 | 1 | 1 |
| THIEF | 1.05 | 1.00 | 1.05 | 1.05 | 1.06 | | | | 1 | 1 | 1 |
| WITCH | 1.04 | 1.07 | 1.04 | 1.04 | 1.05 | | 0 | 5 | 1 | 1 | 1 |
| PRIEST | 1.05 | 1.05 | 1.04 | 1.05 | 1.05 | 0 | | | 1 | 1 | 1 |
| SLIME | 1.05 | 1.05 | 1.05 | 1.05 | 1.05 | 10 | 10 | 15 | 1 | 1 | 1 |
| UNDEAD | 1.05 | 1.05 | 1.05 | 1.06 | 1.04 | | | 15 | 0 | 1.5 | 0.5 |
| DRAGON | 1.06 | 1.05 | 1.06 | 1.05 | 1.05 | | 5 | 10 | 1 | 0.5 | 1.5 |
| MACHINE | 1.05 | 1.00 | 1.05 | 1.05 | 1.06 | | | | 1 | 0 | 0 |

FIG. 71

(APPLICATION TO "ROLE-PLAYING GAME"; ALLIES INFORMATION INCLUDED IN STATE S)

| | LV | PROFESSION | | | | | | | |
| --- | --- | --- | --- | --- | --- | --- | --- | --- | --- |
| | | KNIGHT | THIEF | WITCH | PRIEST | SLIME | UNDEAD | DRAGON | MACHINE |
| ALLY 1 | | | | | | | | | |
| ALLY 2 | | | | | "1" FOR CORRESPONDING ITEM, "0" OTHERWISE | | | | |
| ALLY 3 | | | | | | | | | |

| HP | MAX HP | MP | MAX MP | ATTACK STRENGTH | DEFENSE STRENGTH | SPEED |
| --- | --- | --- | --- | --- | --- | --- |
| | | | | | | |
| | | | | | | |

FIG. 72

(APPLICATION TO "ROLE-PLAYING GAME": ENEMY INFORMATION INCLUDED IN STATE S)

| | Lv | PROFESSION | | | | | | | TOTAL DAMAGE |
| --- | --- | --- | --- | --- | --- | --- | --- | --- | --- |
| | | KNIGHT | THIEF | WITCH | PRIEST | SLIME | UNDEAD | DRAGON | MACHINE | |
| ENEMY 1 | | | | | | | | | | |
| ENEMY 2 | | | | | | | | | | |
| ENEMY 3 | | | | | | | | | | |

FIG. 73

(APPLICATION TO "ROLE-PLAYING GAME": ACTION a (SURVIVING ALLIES))

|  | PERFORMER | ACTION TARGET | ACTION TYPE ||||
|---|---|---|---|---|---|---|
|  |  |  | ATTACK | Heal | Fire | Ice |
| ALLY 1 | | | | | | |
| ALLY 2 | "1" WHEN APPLICABLE, "0" OTHERWISE |||||  |
| ALLY 3 | | | | | | |

FIG. 74

(APPLICATION TO "ROLE-PLAYING GAME": ACTION a (ENEMIES))

|  | ACTION TARGET |
|---|---|
| ENEMY 1 | |
| ENEMY 2 | |
| ENEMY 3 | |

FIG. 75

(APPLICATION TO "ROLE-PLAYING GAME")

| TIME | STATE S | ACTION a | REWARD r |
|---|---|---|---|
| 0 | STATE $S_0$ | ATTACK ENEMY 1 ($a_0$) | 0 |
| 1 | STATE $S_1$ | HEAL ALLY 1 ($a_1$) | -5 (ALLY WAS DEFEATED) |
| 2 | STATE $S_2$ | ATTACK ENEMY 2 ($a_2$) | 0 |
| 3 | STATE $S_3$ | FIRE AT ALL ENEMIES ($a_3$) | 1 (ENEMY DEFEATED) |

INFORMATION PROCESSING APPARATUS, INFORMATION PROCESSING METHOD, AND PROGRAM

BACKGROUND

The present disclosure relates to an information processing apparatus, an information processing method, and a program.

In recent years, attention has been focused on a method of mechanically extracting feature amounts from an arbitrary data group for which it is difficult to quantitatively determine features. For example, a method is known for automatically constructing an algorithm that inputs arbitrary music data and mechanically extracts a music genre to which such music data belongs. Music genres such as jazz, classical, and pop are not quantitatively decided by the types of musical instruments or the style of playing. For this reason, it was conventionally thought difficult to mechanically extract the genre of music data when arbitrary music data is provided.

However, in reality, features that decide the genre of a piece of music are latently included in a combination of various information, such as the combination of intervals included in the music data, the way in which the intervals are combined, the combination of types of instruments, and the structure of the melody line and/or the bass line. For this reason, on the assumption that it might be possible to automatically construct an algorithm (or "feature amount extraction device") for extracting such features through machine learning, research has been conducted into feature amount extraction devices. One result of such research is the automated construction method for a feature amount extraction device based on a genetic algorithm disclosed in Japanese Laid-Open Patent Publication No. 2009-48266. The expression "genetic algorithm" refers to an algorithm that considers selections, crosses, and mutations of elements in a process of machine learning in the same way as in the process of biological evolution.

By using the automated construction algorithm for a feature amount extraction device disclosed in the cited publication, it is possible to automatically construct a feature amount extraction device that extracts, from arbitrary music data, the music genre to which the music data belongs. The automated construction algorithm for a feature amount extraction device disclosed in the cited publication also has extremely wide applicability and it is possible to automatically construct a feature amount extraction device that extracts feature amounts of an arbitrary data group from such data group without being limited to music data. For this reason, there is expectation that the automated construction algorithm for a feature amount extraction device disclosed in the cited publication can be applied to feature amount analysis of man-made data, such as music data and/or video data, and to feature amount analysis of various observed values present in the natural world.

SUMMARY

The present inventors investigated whether, by further extending the technology of the cited publication, it is possible to develop a technology that automatically constructs an algorithm for causing an agent to act intelligently. During such investigation, the present inventors focused on a technology that automatically constructs a thought routine for deciding an action to be selected out of the actions that an agent can take in a particular state. The present disclosure relates to such technology and aims to provide a novel and improved information processing apparatus, an information processing method, and a program capable of efficiently and automatically constructing an estimator that outputs information that is decisive when selecting an action to be taken by an agent.

According to an embodiment of the present disclosure, there is provided an information processing apparatus, including a reward estimator generating unit using action history data, which includes state data expressing a state of an agent, action data expressing an action taken by the agent in the state, and a reward value expressing a reward obtained by the agent as a result of the action, as learning data to generate, through machine learning, a reward estimator that estimates the reward value from inputted state data and action data, an action selecting unit preferentially selecting, out of actions that can be taken by the agent, an action that has a high reward value estimated using the reward estimator and is not included in the action history data, and an action history adding unit causing the agent to carry out the action according to a selection result of the action selecting unit and adding action history data associating the state data and the action data obtained in a process of the action with a reward value obtained as a result of the action. The reward estimator generating unit is operable when a set of the state data, the action data, and the reward value has been added to the action history data, to regenerate the reward estimator.

Further, according to another embodiment of the present disclosure, there is provided an information processing apparatus, including a reward estimator generating unit using action history data, which includes state data expressing a state of an agent, action data expressing an action taken by the agent in the state, and a reward value expressing a reward obtained by the agent as a result of the action, as learning data to generate, through machine learning, a reward estimator that estimates the reward value from inputted state data and action data, an action selecting unit preferentially selecting, out of actions that can be taken by the agent, an action that has a high reward value estimated using the reward estimator and whose reward value has a large estimation error, and an action history adding unit causing the agent to carry out the action according to a selection result of the action selecting unit and adding action history data associating the state data and the action data obtained in a process of the action with a reward value obtained as a result of the action. The reward estimator generating unit is operable when a set of the state data, the action data, and the reward value has been added to the action history data, to regenerate the reward estimator.

Further, according to another embodiment of the present disclosure, there is provided an information processing method, including using action history data, which includes state data expressing a state of an agent, action data expressing an action taken by the agent in the state, and a reward value expressing a reward obtained by the agent as a result of the action, as learning data to generate, through machine learning, a reward estimator that estimates the reward value from inputted state data and action data, preferentially selecting, out of actions that can be taken by the agent, an action that has a high estimated reward value and is not included in the action history data, causing the agent to carry out the action according to a selection result and adding action history data associating the state data and the action data obtained in a process of the action with a reward value obtained as a result of the action, and regenerating the reward estimator when a set of the state data, the action data, and the reward value has been added to the action history data.

Further, according to another embodiment of the present disclosure, there is provided an information processing method, including using action history data, which includes state data expressing a state of an agent, action data expressing an action taken by the agent in the state, and a reward value expressing a reward obtained by the agent as a result of the action, as learning data to generate, through machine learning, a reward estimator that estimates the reward value from inputted state data and action data, an action selecting unit preferentially selecting, out of actions that can be taken by the agent, an action that has a high estimated reward value and whose reward value has a large estimation error, causing the agent to carry out the action according to a selection result and adding action history data associating the state data and the action data obtained in a process of the action with a reward value obtained as a result of the action, and regenerating the reward estimator when a set of the state data, the action data, and the reward value has been added to the action history data.

Further, according to another embodiment of the present disclosure, there is provided a program causing a computer to realize a reward estimator generating function using action history data, which includes state data expressing a state of an agent, action data expressing an action taken by the agent in the state, and a reward value expressing a reward obtained by the agent as a result of the action, as learning data to generate, through machine learning, a reward estimator that estimates the reward value from inputted state data and action data, an action selecting function preferentially selecting, out of actions that can be taken by the agent, an action that has a high reward value estimated using the reward estimator and is not included in the action history data, and an action history adding function causing the agent to carry out the action according to a selection result of the action selecting function and adding action history data associating the state data and the action data obtained in a process of the action with a reward value obtained as a result of the action. The reward estimator generating function is operable when a set of the state data, the action data, and the reward value has been added to the action history data, to regenerate the reward estimator.

Further, according to another embodiment of the present disclosure, there is provided a program causing a computer to realize a reward estimator generating function using action history data, which includes state data expressing a state of an agent, action data expressing an action taken by the agent in the state, and a reward value expressing a reward obtained by the agent as a result of the action, as learning data to generate, through machine learning, a reward estimator that estimates the reward value from inputted state data and action data, an action selecting function preferentially selecting, out of actions that can be taken by the agent, an action that has a high reward value estimated using the reward estimator and whose reward value has a large estimation error, and an action history adding function causing the agent to carry out the action according to a selection result of the action selecting function and adding action history data associating the state data and the action data obtained in a process of the action with a reward value obtained as a result of the action. The reward estimator generating function is operable when a set of the state data, the action data, and the reward value has been added to the action history data, to regenerate the reward estimator.

According to another embodiment of the present disclosure, there is provided a computer-readable recording medium on which the program described above has been recorded.

According to the embodiments of the present disclosure described above, it is possible to efficiently and automatically construct an estimator that outputs information that is decisive when selecting an action to be taken by an agent.

BRIEF DESCRIPTION OF THE DRAWINGS

FIG. 1 is a diagram useful in explaining an automated construction method for an estimator;

FIG. 2 is a diagram useful in explaining an automated construction method for an estimator;

FIG. 3 is a diagram useful in explaining an automated construction method for an estimator;

FIG. 26 is a diagram useful in explaining a method of integrating data sets;

FIG. 41 is a diagram useful in explaining an efficient method of constructing a reward estimator;

FIG. 42 is a diagram useful in explaining an efficient method of constructing a reward estimator;

FIG. 49 is a diagram useful in explaining an application to tic-tac-toe;

FIG. 50 is a diagram useful in explaining an application to tic-tac-toe;

FIG. 55 is a diagram useful in explaining an application to a fighting game;

FIG. 56 is a diagram useful in explaining an application to a fighting game;

FIG. 57 is a diagram useful in explaining an application to a fighting game;

FIG. 67 is a diagram useful in explaining an application to poker;

FIG. 70 is a diagram useful in explaining an application to a role-playing game;

FIG. 71 is a diagram useful in explaining an application to a role-playing game;

FIG. 72 is a diagram useful in explaining an application to a role-playing game;

FIG. 73 is a diagram useful in explaining an application to a role-playing game;

FIG. 74 is a diagram useful in explaining an application to a role-playing game;

FIG. 75 is a diagram useful in explaining an application to a role-playing game;

DETAILED DESCRIPTION OF THE EMBODIMENT(S)

Figure 4:
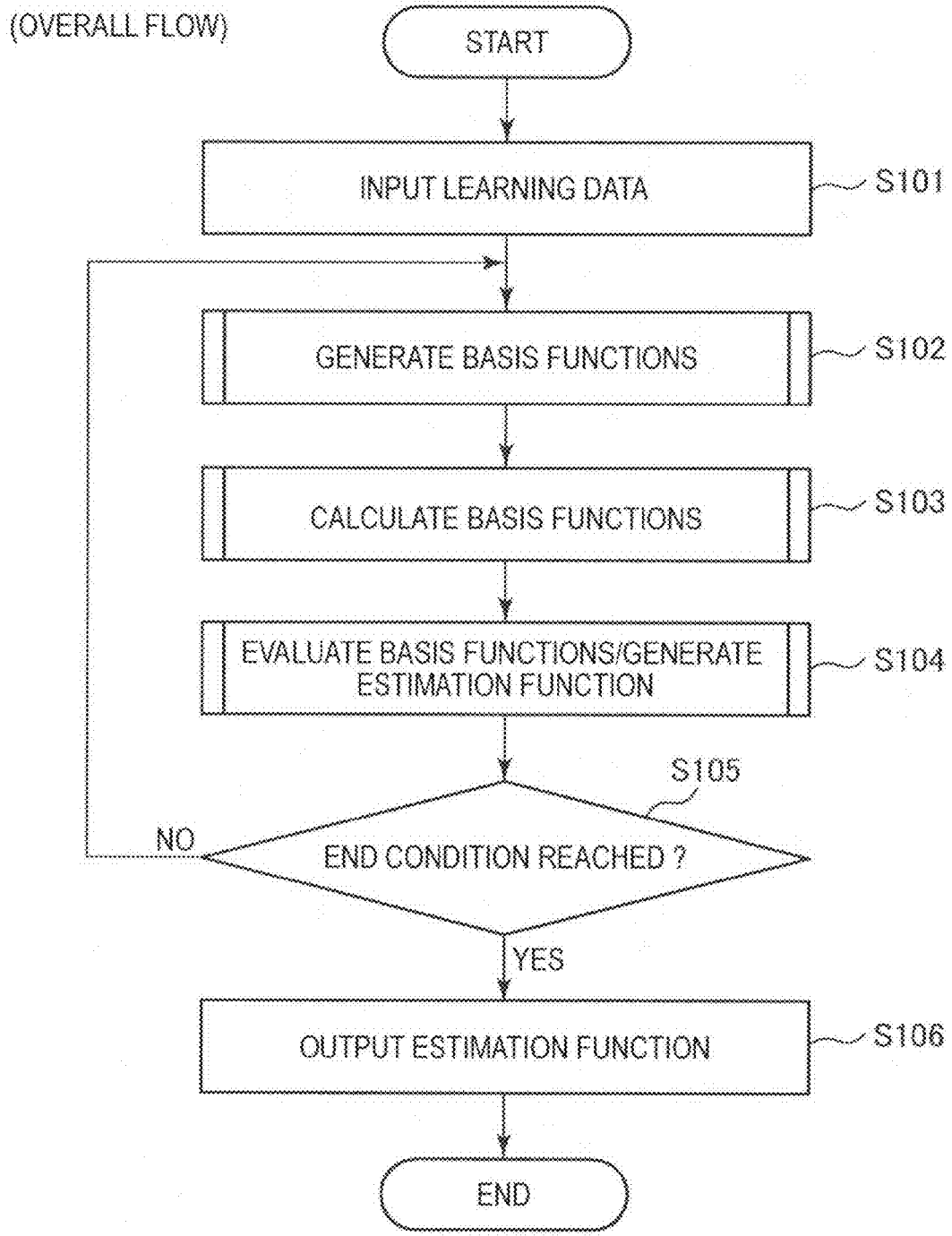
FIG. 4 is a diagram useful in explaining an automated construction method for an estimator.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Order of Explanation

The order of the following explanation will first be described in brief.

The fundamental technology according to an embodiment of the present disclosure will be described first. More specifically, an automated construction method for an estimator will be described first with reference to FIGS. 1 to 12. After that, an automated construction method for an estimator based on online learning will be described with reference to FIG. 13.

Next, a method of integrating data sets will be described with reference to FIGS. 14 to 16. After that, an efficient method of sampling data sets will be described with reference to FIGS. 17 to 23. Next, an efficient method of weighting will be described with reference to FIGS. 24 to 27. An efficient method combining sampling and weighting data sets will then be described with reference to FIG. 28. After that, other methods of sampling and weighting data sets will be described with reference to FIGS. 29 to 33.

The configuration of a thought routine and a method of constructing a thought routine will then be described with reference to FIGS. 34 to 38. After that, the functional configuration of an information processing apparatus 10 according to an embodiment of the present disclosure will be described with reference to FIGS. 39 and 40. Next, an efficient method of constructing a reward estimator will be described with reference to FIGS. 41 and 42. The configuration of a thought routine that uses an action score estimator will then be described with reference to FIGS. 43 and 44. After that, a method of estimating rewards using a predictor will be described with reference to FIGS. 45 to 47.

A method of applying the technology of an embodiment of the present disclosure to tic-tac-toe will be described with reference to FIGS. 48 to 54. After that, a method of applying the technology of an embodiment of the present disclosure to a fighting game will be described with reference to FIGS. 55 to 62. A method of applying the technology of an embodiment of the present disclosure to a "connect five" game will then be described with reference to FIGS. 63 and 64. Next, a method of applying the technology of an embodiment of the present disclosure to poker will be described with reference to FIGS. 65 to 67. After that, a method of applying the technology of an embodiment of the present disclosure to a role-playing game will be described with reference to FIGS. 68 to 79.

An example hardware configuration capable of realizing the functions of the information processing apparatus 10 according to an embodiment of the present disclosure will be described with reference to FIG. 80. Finally, the technical concept of an embodiment of the present disclosure will be summarized and the operational effects obtained by such technical concept will be described in brief.

INDEX

1. Fundamental Technology
    1-1: Automated Construction Method for Estimator
       1-1-1: Configuration of Estimator
       1-1-2: Flow of Construction Process
    1-2: Online Learning
    1-3: Method of Integrating Learning Data
       1-3-1: Distribution of Learning Data in Feature Amount Space and
Precision of Estimator
       1-3-2 Sampling Configuration Used During Data Integration
       1-3-3: Weighting Configuration Used During Data Integration
       1-3-4: Sampling and Weighting Configuration Used During Data
Integration
    1-4: Efficient Sampling/Weighting Methods
       1-4-1: Sampling Method
       1-4-2: Weighting Method
       1-4-3: Combined Method
    1-5: Modifications to Sampling Process and Weighting Process
       1-5-1: Modification 1 (Processing Based on Distance)
       1-5-2: Modification 2 (Processing Based on Clustering)
       1-5-3: Modification 3 (Processing Based on Density Estimating Method)
2: Embodiment
    2-1: Automated Construction Method for Thought Routine
       2-1-1: Thought Routine
       2-1-2: Configuration of Thought Routine
       2-1-3: Method of Constructing Reward Estimator
       2-2: Configuration of Information Processing Apparatus 10
       2-3: Method of Efficiently Constructing a Reward Estimator
       2-4: Modification 1. Thought Routine Using Action Score Estimator
       2-5: Modification 2. Estimation of Rewards using a Predictor
          2-5-1: Method of Constructing a Predictor
          2-5-2: Method of Estimating Rewards
       2-6: Modification 3. Simultaneous Learning for a Plurality of Agents
3: Applications
    3-1: Application to Tic-tac-toe
    3-2: Application to Fighting Game
    3-3: Application to "Connect Five" Game
    3-4: Application to Poker
    3-5 Application to Role-Playing Game
4: Example Hardware Configuration
5: Conclusion

1: FUNDAMENTAL TECHNOLOGY

The embodiment described later relates to an automated construction method for an estimator. Also, such embodiment relates to a framework (hereinafter, "online learning") that makes it possible to add learning data to be used in the construction of an estimator. For this reason, an automated construction method for an estimator and an online learning method (hereinafter, "fundamental technology") will be described before the technology according to the embodiment is described in detail. Note that although the explanation will proceed below for an automated construction method for an estimator based on a generic algorithm as one example, the technical scope of application of the embodiment of the present disclosure is not limited to such.

1-1: Automated Construction Method for Estimator

An automated construction method for an estimator will now be described.

1-1-1: Configuration of Estimator

First, the configuration of an estimator will be described with reference to FIGS. 1 to 3. FIG. 1 is a diagram useful in explaining an example system configuration of a system that uses an estimator. FIG. 2 is a diagram useful in explaining an example configuration of learning data to be used in the construction of an estimator. FIG. 3 is a diagram useful in showing the structure of an estimator and an overview of a constructing method.

First, FIG. 1 will be described. As shown in FIG. 1, the constructing of an estimator and the calculation of estimated values are carried out by an information processing apparatus 10, for example. The information processing apparatus 10 constructs an estimator using learning data $(X_1, t_1), \ldots, (X_N, t_N)$. The information processing apparatus 10 also calculates an estimated value y from input data X using the constructed estimator. The estimated value y is used in recognizing the input data X. For example, a recognition result of "Yes" is obtained if the estimated value y is equal to or larger than a specified threshold Th and a recognition result of "No" is obtained if the estimated value y is smaller than the specified threshold Th.

Let us now consider the specific configuration of an estimator with reference to FIG. 2. The collection of learning data illustrated in FIG. 2 is used to construct an image recognition device that recognizes images of the sea. In this case, the estimator constructed by the information processing apparatus 10 outputs an estimated value y expressing the likeness to the sea of the inputted image. As shown in FIG. 2, the learning data is composed of pairs of data $X_k$ and a target variable $t_k$ (where k is 1 to N). The data $X_k$ is the $k^{th}$ image data (image#k). The target variable $t_k$ is a variable that takes the value "1" when the image#k is an image of the sea and takes the value "0" when the image#k is not an image of the sea.

In the example in FIG. 2, image#1 is an image of the sea, image#2 is an image of the sea, . . . and image#N is not an image of the sea. In this case, $t_1=1, t_2=1, \ldots, t_N=0$. When this learning data is inputted, the information processing apparatus 10 constructs an estimator that outputs an estimated value y expressing the likeness to the sea of an inputted image according to machine learning based on the inputted learning data. The estimated value y approaches "1" the closer the likeness to the sea of the inputted image and approaches "0" the weaker the likeness to the sea.

When new input data X (an image X) is inputted, the information processing apparatus 10 inputs the image X into the estimator constructed using the collection of learning data to calculate the estimated value y expressing the likeness to the sea of the input data X. By using the estimated value y, it is possible to recognize whether the image X is an image of the sea. As one example, if the estimated value y≥specified threshold Th, the inputted image X is recognized as an image of the sea. Meanwhile, if the estimated value y<specified threshold Th, the inputted image X is recognized as not being an image of the sea.

The present embodiment relates to a technology that automatically constructs an estimator such as that described above. Note that although an estimator to be used in constructing an image recognition device is described here, the technology according to the present embodiment can be applied to an automated construction method for a variety of estimators. As examples, it is possible to use the technology to construct a language analyzer and to use the technology to construct a music analyzer that analyzes the melody line and/or chord progression of a song. In addition, it is possible to use the technology to construct a motion prediction device that reproduces a natural phenomenon and/or predicts natural behavior, such as movement of a butterfly or movement of clouds.

For example, it is possible to apply the technology to the algorithms disclosed in the specifications of Japanese Laid-Open Patent Publication Nos. 2009-48266, 2010-159598, 2010-159597, 2009-277083, 2009-277084, and the like. The technology may also be applied to an ensemble learning method such as AdaBoost, or a learning method that uses a kernel such as SVM or SVR. When applied to an ensemble learning method such as AdaBoost, weak learners correspond to the basis functions φ described later. When the technology is applied to a learning method such as SVM or SVR, the kernel corresponds to the basis functions φ described later. Note that "SVM" is an abbreviation of "Support Vector Machine", "SVR" is an abbreviation of "Support Vector Regression" and "RVM" is an abbreviation of "Relevance Vector Machine".

The structure of an estimator will now be described with reference to FIG. 3. As shown in FIG. 3, the estimator is composed of a basis function list $(\phi_1, \ldots, \phi_M)$ and an estimation function f. The basis function list $(\phi_1, \ldots, \phi_M)$ includes M basis functions $\phi_k$, (where k=1 to M). Each basis function $\phi_k$ is a function that outputs a feature amount $z_k$ in response to the inputting of the input data X. In addition, the estimation function f is a function that outputs an estimated value y in response to the input of a feature amount vector $Z=(z_1, \ldots, z_M)$ including M feature amounts $z_k$ (where k is 1 to M) as elements. The basis functions $\phi_k$ are generated by combining one or a plurality of processing functions provided in advance.

As the processing functions, as examples it is possible to use a trigonometric function, an exponential function, the four arithmetic operations, a digital filter, a differential operation, a median filter, a normalization operation, processing that adds white noise, and an image processing filter. As one example, when the input data X is an image, a basis function $\phi_j(X)=AddWhiteNoise(Median(Blur(X)))$ that is a combination of a process "AddWhiteNoise( )" that adds white noise, a median filter "Median ( )", and a blurring process "Blur( )" may be used. This basis function $\phi_j$ successively carries out a blurring process, a median filter process, and a process that adds white noise on the input data X.

1-1-2: Flow of Construction Process

The configuration of the basis functions $\phi_k$ (where k is 1 to M), the configuration of the basis function list, and the configuration of the estimation function f are decided through machine learning based on learning data. The process for constructing an estimator through machine learning will now be described in more detail.

Overall Configuration

First the overall flow of processing will now be described with reference to FIG. 4. FIG. 4 is a diagram useful in explaining the overall flow of processing. Note that the processing described below is executed by the information processing apparatus 10.

As shown in FIG. 4, first learning data is inputted into the information processing apparatus 10 (S101). Note that a pair of data X and a target variable t is inputted as the learning data. When learning data has been inputted, the information processing apparatus 10 generates basis functions by combining processing functions (S102). Next, the information processing apparatus 10 inputs the data X into the basis functions to calculate the feature amount vector Z (S103). After that, the information processing apparatus 10 carries out evaluation of the basis functions and generation of the estimation function (S104).

The information processing apparatus 10 then determines whether a specified end condition is satisfied (S105). If the specified end condition is satisfied, the information processing apparatus 10 advances to step S106. Meanwhile, if the specified end condition is not satisfied, the information processing apparatus 10 returns to step S102 and the processing in steps S102 to S104 is executed once again. If the processing has advanced to step S106, the information processing apparatus 10 outputs the estimation function (S106). As described above, the processing in steps S102 to S104 is repeatedly executed. For this reason, in the processing described below, the basis functions generated in step S102 in the $\tau^{th}$ iteration of the processing is referred to as the $\tau^{th}$ generation basis functions.

Generation of Basis Functions (S102)

The processing (generation of basis functions) in step S102 will now be described in more detail with reference to FIGS. 5 to 10.

Figure 5:
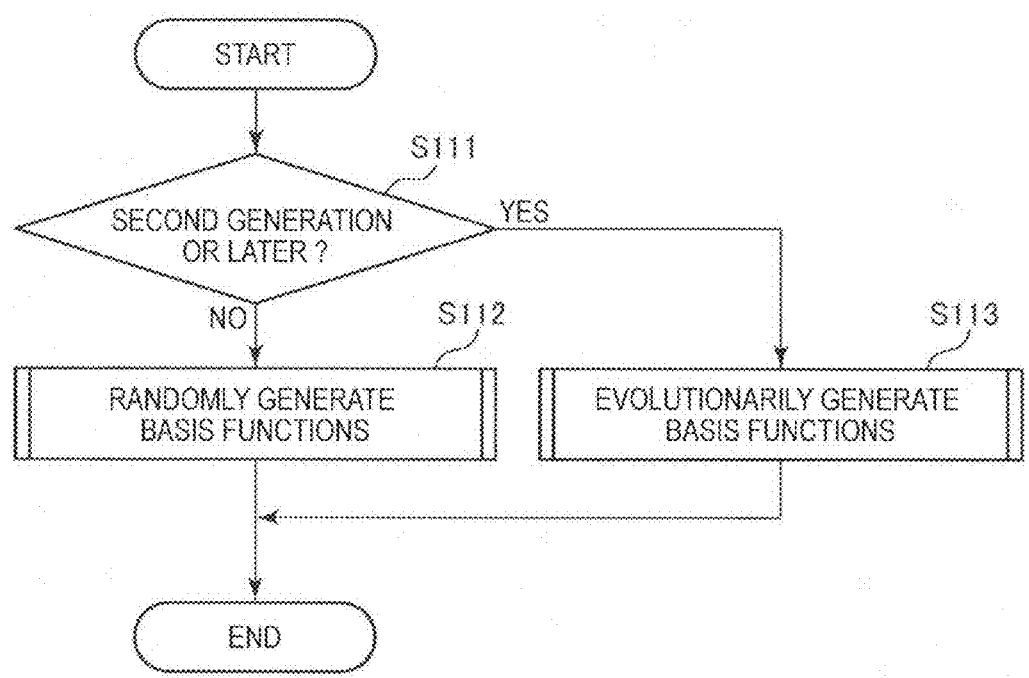
FIG. 5 is a diagram useful in explaining an automated construction method for an estimator.

FIG. 5 will be described first. As shown in FIG. 5, the information processing apparatus 10 determines whether the present generation is the second or a later generation (S111). That is, the information processing apparatus 10 determines whether the processing in step S102 that is currently about to be executed is the second or later iteration of the processing. If the processing is the second or a later generation, the information processing apparatus 10 advances to step S113. Meanwhile if the processing is not for a second or later generation (i.e., the processing is for a first generation), the information processing apparatus 10 advances to step S112. If the processing has advanced to step S112, the information processing apparatus 10 generates basis functions randomly (S112). Meanwhile, if the processing has advanced to step S113, the information processing apparatus 10 evolutionarily generates basis functions (S113). After this, on completing the processing in step S112 or S113, the information processing apparatus 10 ends the processing in step S102.

S112: Random Generation of Basis Functions

Next, the processing in step S112 will be described in more detail with reference to FIGS. 6 and 7. The processing in step S112 relates to processing that generates the first generation basis functions.

Figure 6:
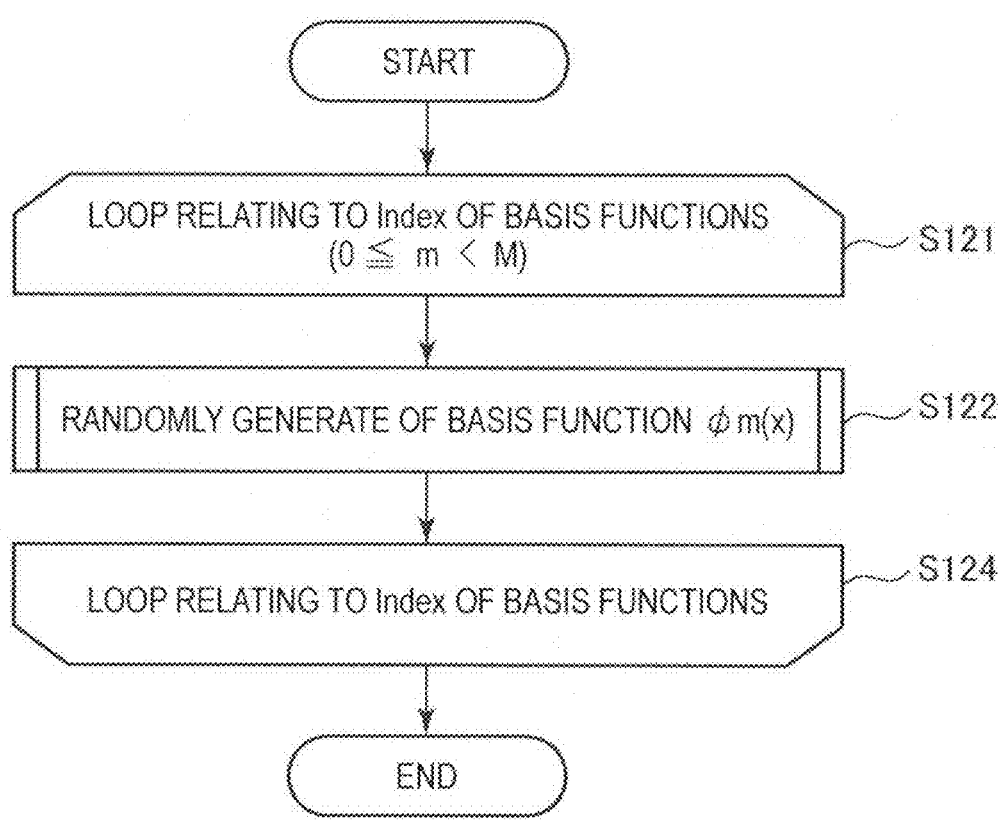
FIG. 6 is a diagram useful in explaining an automated construction method for an estimator.

FIG. 6 will be described first. As shown in FIG. 6, the information processing apparatus 10 starts a processing loop relating to an index m (where m=0 to M−1) for basis functions (S121). Next, the information processing apparatus 10 randomly generates the basis function $\phi_m(x)$ (S122). Next, the information processing apparatus 10 determines whether the index m of the basis function has reached M−1, and if the index m of the basis function has not reached M−1, the information processing apparatus 10 increments the index m of the basis function and the processing returns to step S121 (S124). Meanwhile, if the index m of the basis function is such that m=M−1, the information processing apparatus 10 ends the processing loop (S124). On ending the processing loop in step S124, the information processing apparatus 10 completes the processing in step S112.

Details of Step S122

Next, the processing in step S122 will be described in more detail with reference to FIG. 7.

Figure 7:
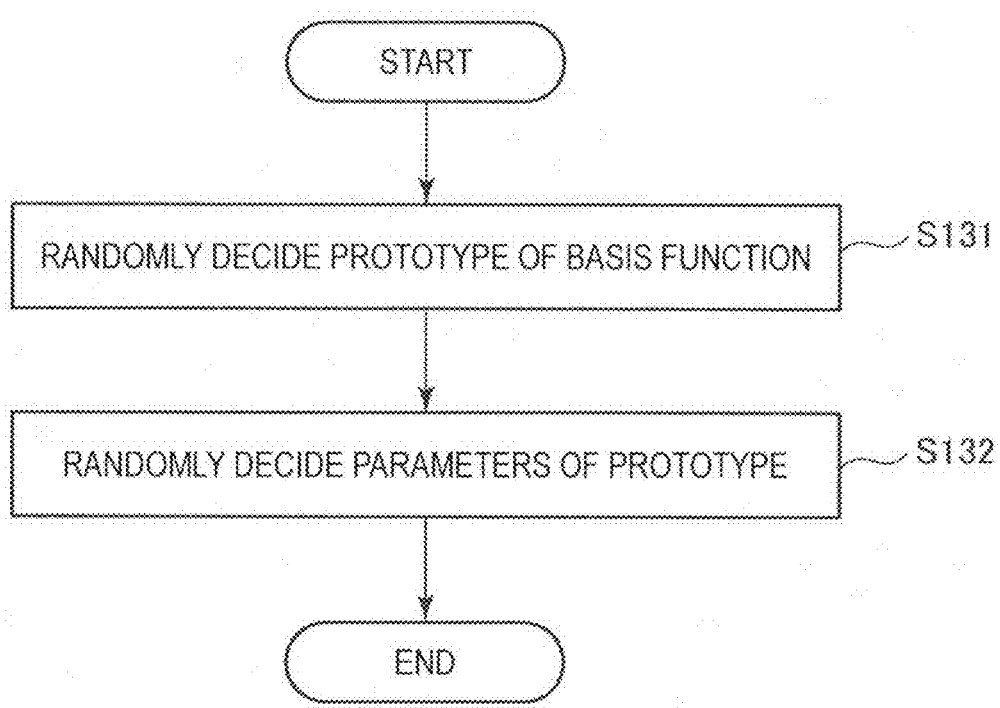
FIG. 7 is a diagram useful in explaining an automated construction method for an estimator.

When the processing in step S122 starts, as shown in FIG. 7, the information processing apparatus 10 randomly decides a prototype of the basis function (S131). As the prototype, aside from the processing functions that have already been listed as examples, it is possible to use a processing function such as a linear term, a Gaussian kernel, or a sigmoid kernel. Next, the information processing apparatus 10 randomly decides the parameters of the decided prototype to generate a basis function (S132).

S113: Evolutionary Generation of Basis Functions

Next, the processing in step S113 will be described in more detail with reference to FIGS. 8 to 10. The processing in step S113 relates to a process that generates $\tau^{th}$ (where $\tau \geq 2$) generation basis functions. Accordingly, when executing step S113, basis functions $\phi_{m,\tau-1}$ (where m=1 to M) of the $(\tau-1)^{th}$ generation and evaluation values $v_{m,\tau-1}$ of the basis functions $\phi_{m,\tau-1}$ are obtained.

Figure 8:
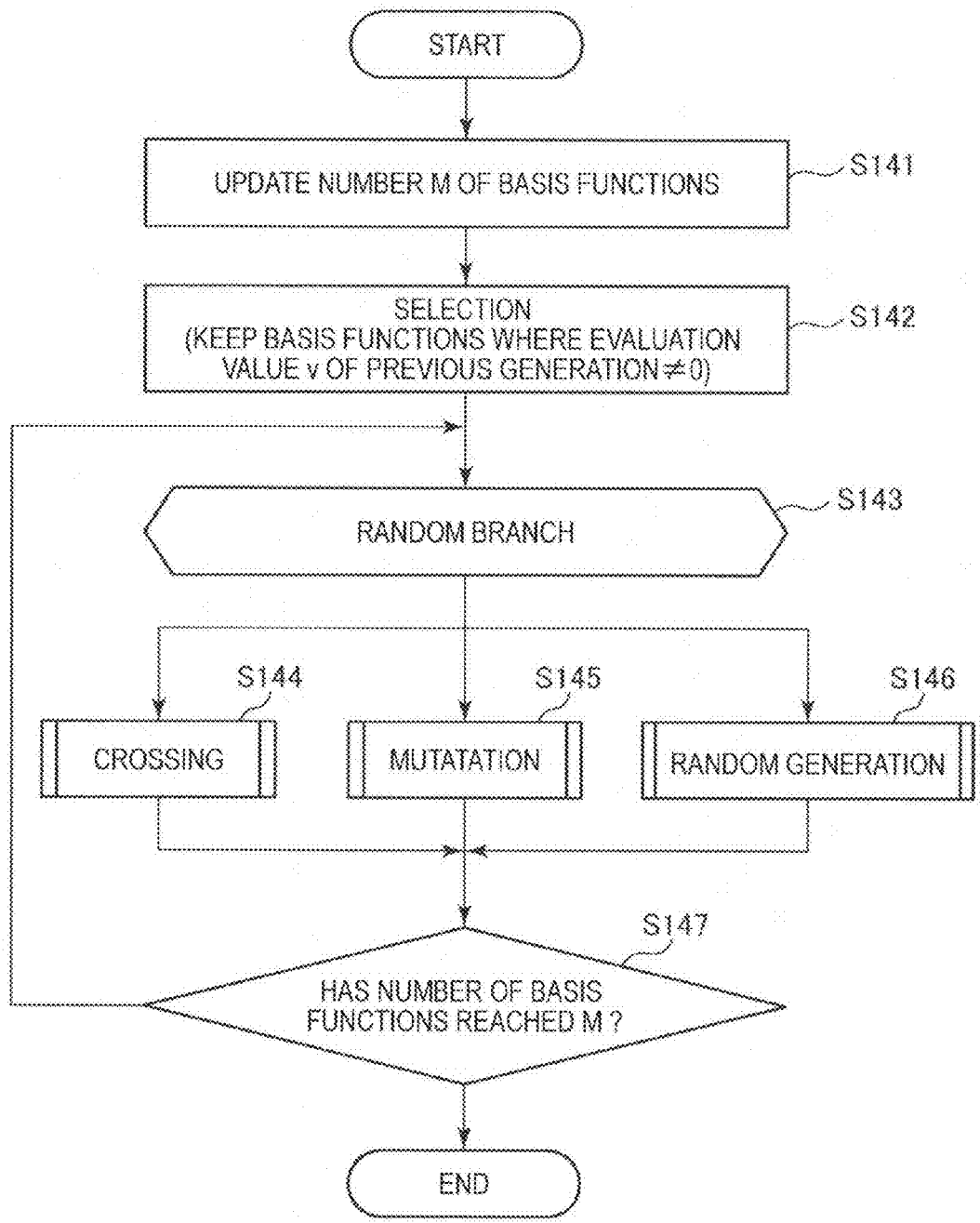
FIG. 8 is a diagram useful in explaining an automated construction method for an estimator.

FIG. 8 will be described first. As shown in FIG. 8, the information processing apparatus 10 updates the number M of basis functions (S141). That is, the information processing apparatus 10 decides the number $M_\tau$ of $\tau^{th}$ generation basis functions. Next, the information processing apparatus 10 selects e useful basis functions out of the $(\tau-1)^{th}$ generation basis functions based on the evaluation values $v_{\tau-1} = \{v_{1,\tau-1}, \ldots, v_{M,\tau-1}\}$ of the $(\tau-1)^{th}$ generation basis functions $\phi_{m,\tau-1}$ (where m=1 to M) and sets the selected basis functions as the $\tau^{th}$ generation basis functions $\phi_{1,\tau}, \ldots, \phi_{e,\tau}$ (S142).

Next, the information processing apparatus 10 randomly selects the method of generating the remaining ($M_\tau$−e) basis functions $\phi_{e+1,\tau}, \ldots, \phi_{M\tau,\tau}$ (S143) out of crossing, mutation, and random generation. When crossing is selected, the information processing apparatus 10 advances to step S144. When mutation is selected, the information processing apparatus 10 advances to step S145. When random generation is selected, the information processing apparatus 10 advances to step S146.

When the processing has advanced to step S144, the information processing apparatus 10 generates a new basis function $\phi_{m',\tau}$ (where m'≥e+1) by crossing basis functions selected out of the basis functions $\phi_{1,\tau}, \ldots, \phi_{e,\tau}$ selected in step S142. When the processing has advanced to step S145, the information processing apparatus 10 generates a new basis function $\phi_{m',\tau}$ (where m'≥e+1) by causing mutation of a basis function selected out of the basis functions $\phi_{1,\tau}, \ldots, \phi_{e,\tau}$ selected in step S142 (S145). Meanwhile, when the processing has advanced to step S146, the information processing apparatus 10 randomly generates a new basis function $\phi_{m',\tau}$ (where m'≥e+1) (S146).

When the processing in one of steps S144, S145, and S146 has ended, the information processing apparatus 10 advances to step S147. When the processing has advanced to step S147, the information processing apparatus 10 determines whether the number of $\tau^{th}$ generation basis functions has reached M (that is, $M=M_\tau$) (S147). If the number of $\tau^{th}$ generation basis functions has not reached M, the information processing apparatus 10 returns once again to step S143. Meanwhile, if the number of $\tau^{th}$ generation basis functions has reached M, the information processing apparatus 10 ends the processing in step S113.

Details of S144: Crossing

Next, the processing in step S144 will be described in more detail with reference to FIG. 9.

Figure 9:
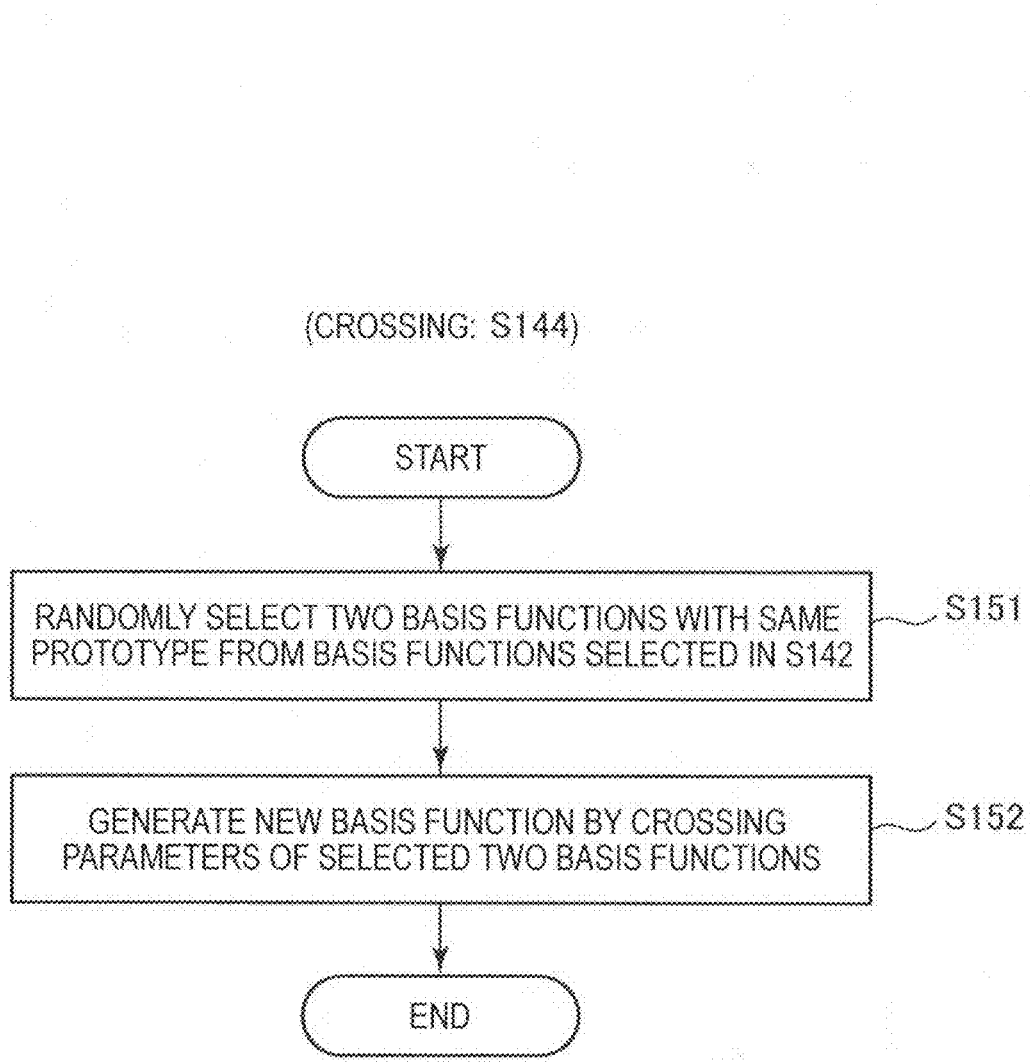
FIG. 9 is a diagram useful in explaining an automated construction method for an estimator.

Once the processing in step S144 starts, as shown in FIG. 9, the information processing apparatus 10 randomly selects two basis functions with the same prototype out of the basis functions $\phi_{1,\tau}, \ldots, \phi_{e,\tau}$ selected in step S142 (S151). After this, the information processing apparatus 10 crosses the parameters of the two selected basis functions to generate a new basis function (S152).

Details of S145: Mutation

Next, the processing in step S145 will be described in more detail with reference to FIG. 10.

Figure 10:
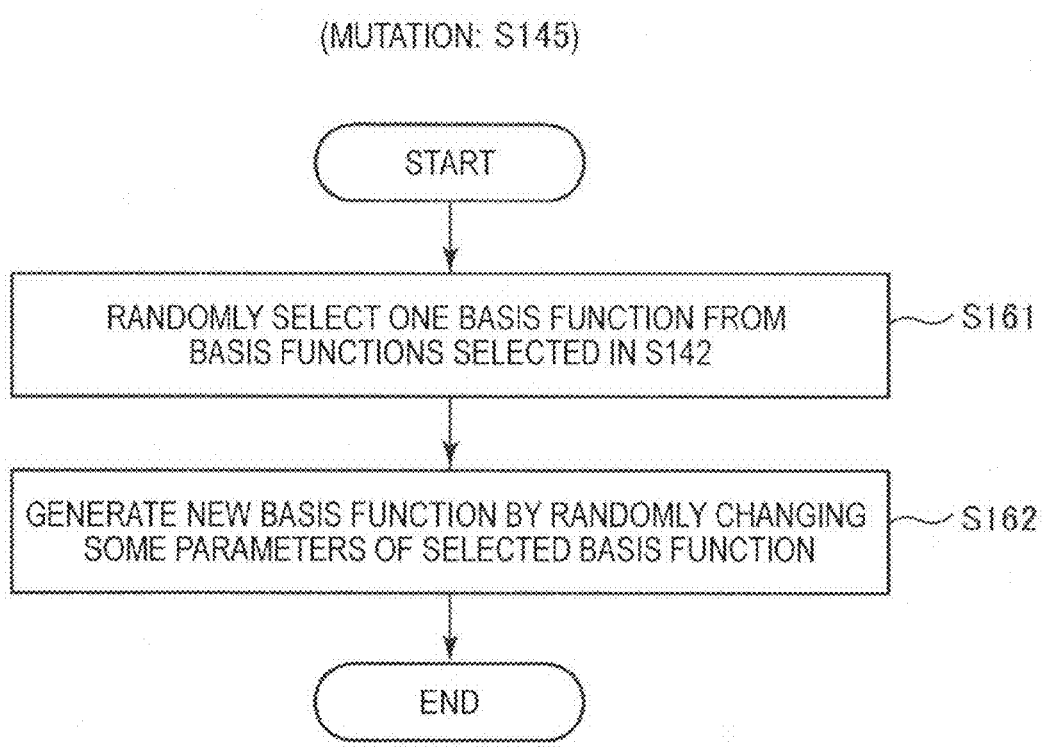
FIG. 10 is a diagram useful in explaining an automated construction method for an estimator.

When the processing in step S145 starts, as shown in FIG. 10, the information processing apparatus 10 randomly selects one of the basis functions out of the basis functions $\phi_{1,\tau}, \ldots, \phi_{e,\tau}$ selected in step S142 (S161). After this, the information processing apparatus 10 randomly changes some of the parameters of the selected basis function to generate a new basis function (S162).

Details of S146: Random Generation

Next, the processing in step S146 will be described in more detail with reference to FIG. 7.

When the processing in step S146 starts, as shown in FIG. 7, the information processing apparatus 10 randomly decides the prototype of the basis function (S131). As the prototype, aside from the processing functions that have already been listed as examples, it is possible to use a processing function such as a linear term, a Gaussian kernel, or a sigmoid kernel. Next, the information processing apparatus 10 randomly decides the parameters of the decided prototype to generate a basis function (S132).

This completes the detailed description of the processing in step S102 (that is, the generation of basis functions).

Calculation of Basis Functions (S103)

Next, the processing in step S103 (that is, the calculation of the basis functions) will be described in more detail with reference to FIG. 11.

Figure 11:
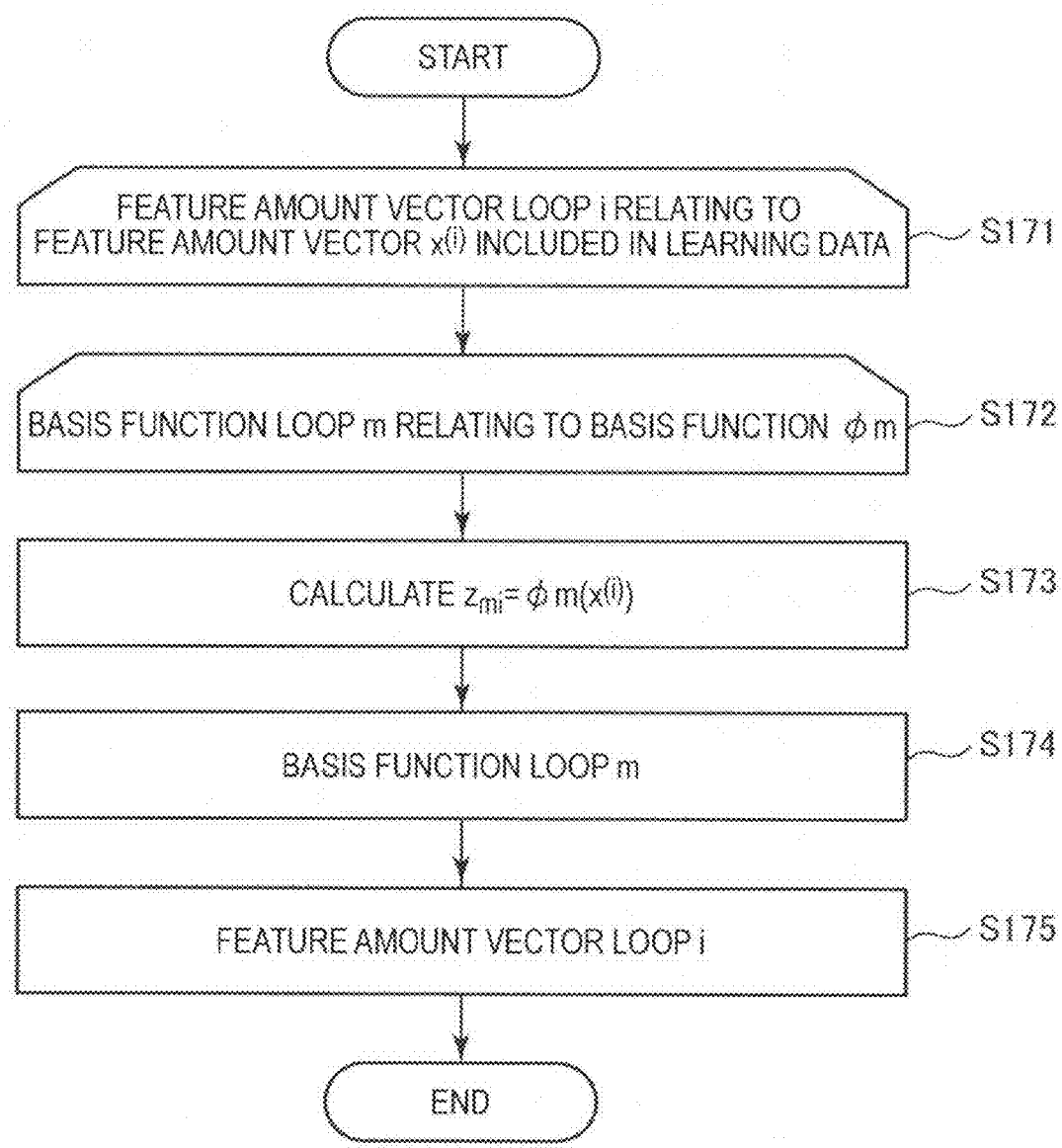
FIG. 11 is a diagram useful in explaining an automated construction method for an estimator.

As shown in FIG. 11, the information processing apparatus 10 starts a processing loop relating to the index i of the $i^{th}$ data $X^{(i)}$ included in the learning data. For example, a processing loop for i=1 to N is executed for a case where N data sets $\{X^{(1)}, \ldots, X^{(N)}\}$ have been inputted as the learning data. After this, the information processing apparatus 10 starts the processing loop for the index m of the basis function $\phi_m$ (S172). For example, if M basis functions have been generated, the processing loop is executed for m=1 to M.

After this, the information processing apparatus 10 calculates the feature amount $z_{mi}=\phi_m(x^{(i)})$ (S173). Next, the information processing apparatus 10 advances to step S174 and the processing loop continues for the index m of the basis functions. On ending the processing loop relating to the index m of the basis functions, the information processing apparatus 10 then advances to step S175 and continues the processing loop relating to the index i. When the processing loop relating to the index i has ended, the information processing apparatus 10 ends the processing in step S103.

This completes the detailed description of the processing in step S103 (that is, the calculation of basis functions).

Evaluation of Basis Functions, Generation of Estimation Function (S104)

Next, the processing in step S104 (that is, the evaluation of basis functions and generation of an estimation function) will be described in more detail with reference to FIG. 12.

Figure 12:
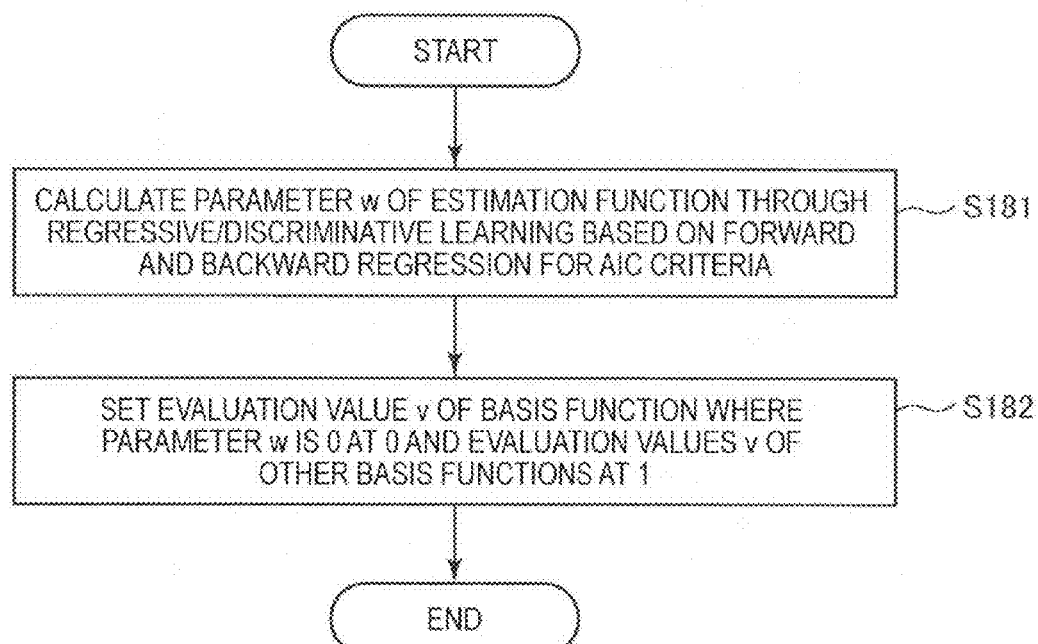
FIG. 12 is a diagram useful in explaining an automated construction method for an estimator.

As shown in FIG. 12, the information processing apparatus 10 calculates parameters $w=\{w_0, \ldots, w_M\}$ of the estimation function according to regressive/discriminative learning based on forward and backward regression for AIC criteria (S181). That is, the information processing apparatus 10 finds a vector $w=\{w_0, \ldots, w_m\}$ according to regressive/discriminative learning so that pairs of a feature amount $z_{mi}=\phi_{m,\tau}(x^{(i)})$ and a target variable $t^{(i)}$ (where i=1 to N) fit the estimation function f. Here, the estimation function f(x) is assumed to be such that $f(x)=\Sigma w_m \phi_{m,\tau}(x)+w_0$. Next, the information processing apparatus 10 sets the evaluation value v of a basis function at 0 when the parameter w is 0 and sets the evaluation value v of other basis functions at 1 (S182). That is, a basis function where the evaluation value v is 1 is a useful basis function.

This completes the detailed description of the processing in step S104 (that is, the evaluation of basis functions and generation of an estimation function).

The flow of processing relating to the construction of an estimator is as described above. In this way, the processing in steps S102 to S104 is repeatedly executed and an estimation function with high estimation precision is obtained by successively updating the basis functions according to an evolutionary method. That is, by using the method described above, it is possible to automatically construct a high-performance estimator.

1-2: Online Learning

As described above, with an algorithm that automatically constructs an estimator according to machine learning, the larger the number of learning data, the higher the performance of the constructed estimator. This means that it is preferable to construct an estimator using the greatest possible number of learning data. With the technology described in the following embodiment, a framework for increasing the learning data is used. For this reason, a new framework (hereinafter referred to as "online learning") that makes it possible to increase the learning data is introduced below.

Figure 13:
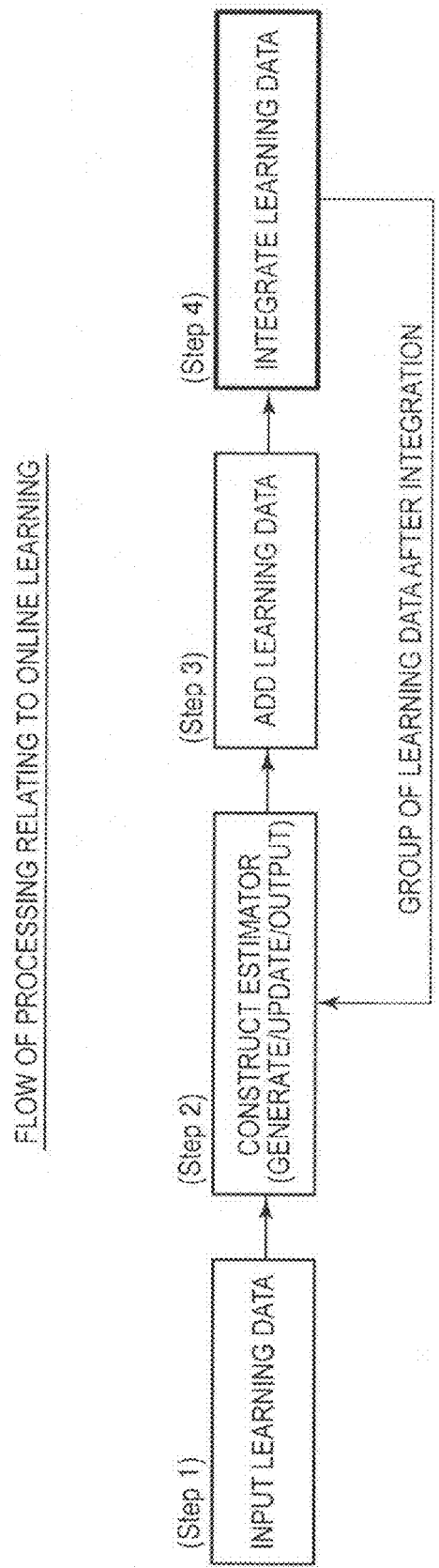
FIG. 13 is a diagram useful in explaining an automated construction method for an estimator based on online learning.

Constructing an estimator relating to online learning is carried out according to the flow of processing shown in FIG. 13. As shown in FIG. 13, first, a collection of learning data is inputted into the information processing apparatus 10 (Step 1). Next, the information processing apparatus 10 uses the inputted collection of learning data to construct an estimator according to the automated construction method for an estimator described earlier (Step 2).

After this, the information processing apparatus 10 acquires the additional learning data at arbitrary or at specified timing (Step 3). Next, the information processing apparatus 10 integrates the learning data acquired in Step 3 into the collection of learning data inputted in Step 1 (Step 4). When doing so, the information processing apparatus 10 executes a sampling process and/or a weighting process on the learning data to generate the collection of learning data after integration. The information processing apparatus 10 then reconstructs the estimator using the collection of learning data after integration (Step 2). When doing so, the information processing apparatus 10 constructs the estimator according to the automated construction method for an estimator described earlier.

The processing in Step 2 to Step 4 is repeatedly executed. Here, the learning data is updated every time the processing is repeated. As one example, since the number of learning data used in the construction process for the estimator will increase if learning data is added in every iteration, the performance of the estimator will improve. Note that in the integration process for the learning data executed in Step 4, the method of integration is subjected to various modifications to make more effective use of the resources of the information processing apparatus 10 and have more useful learning data used in the construction of an estimator. Such modifications are introduced below.

1-3: Method of Integrating Learning Data

The method of integrating the learning data will now be described in more detail.

1-3-1: Distribution of Learning Data in Feature Amount Space and Precision of Estimator First, the relationship between the distribution of the learning data in a feature amount space and the precision of the estimator will be discussed with reference to FIG. 14. FIG. 14 is a diagram useful in explaining an example distribution of the learning data in a feature amount space.

One feature amount vector is obtained by inputting data that composes one set of learning data into each basis function included in the basis function list. That is, one set of learning data corresponds to one feature amount vector (feature amount coordinates). For this reason, the distribution of feature amount coordinates is referred to as the "distribution of learning data" in a feature amount space. The distribution of learning data in the feature amount space is as shown in FIG. 14, for example. Note that although a two-dimensional feature amount space is considered in the example in FIG. 14 for ease of expression, the number of dimensions in the feature amount space is not limited to this.

Figure 14:
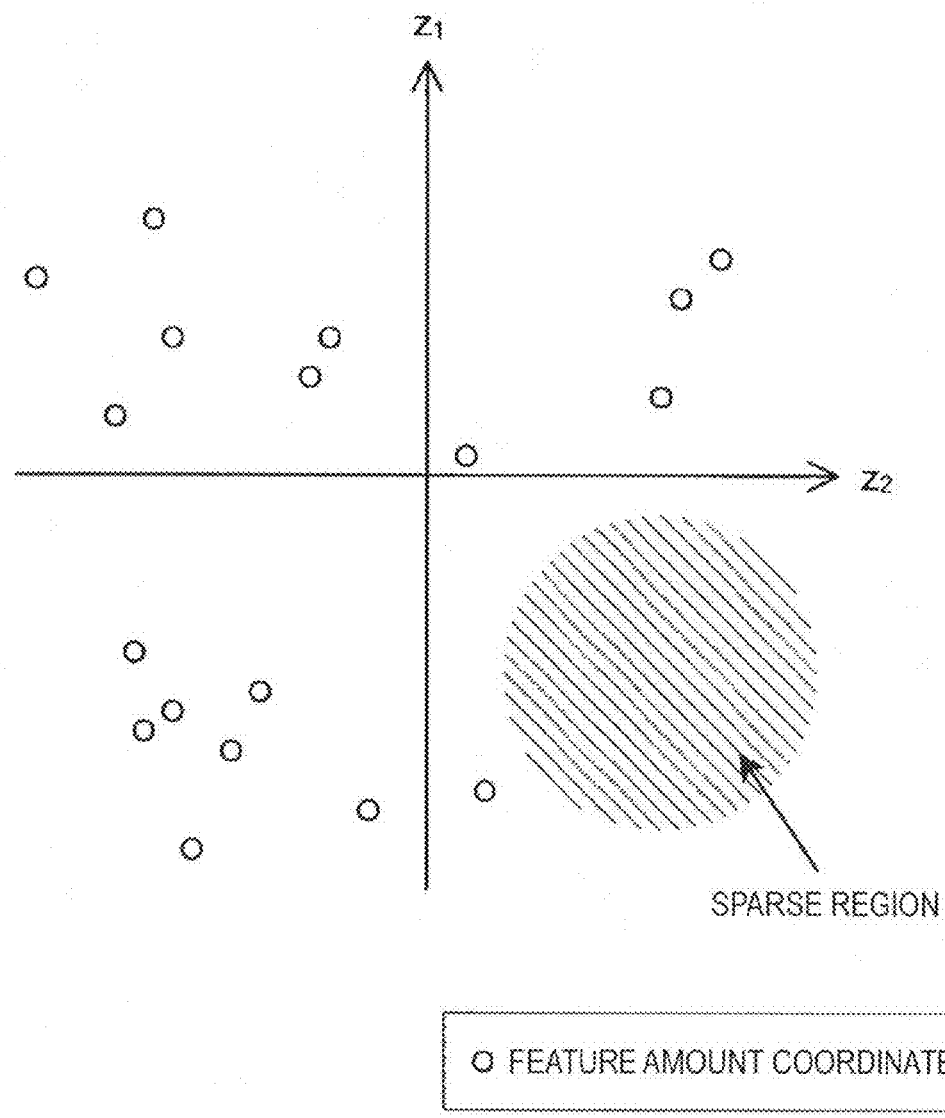
FIG. 14 is a diagram useful in explaining a method of integrating data sets.

In the distribution of feature amount coordinates illustrated in FIG. 14, it should be clear that a sparse region is present in the fourth quadrant. As described earlier, the estimation function is generated by regressive/discriminative learning so that the relationship between feature amount vectors and target variables is accurately expressed for all of the learning data. For this reason, in a region where the feature amount coordinates have a low density, there is a high probability that the estimation function will not accurately express the relationship between feature amount vectors and target variables. Accordingly, if feature amount coordinates corresponding to input data that are to be subjected to a recognition process are positioned in the sparse region described above, it is unrealistic to expect a highly precise recognition result.

Figure 15:
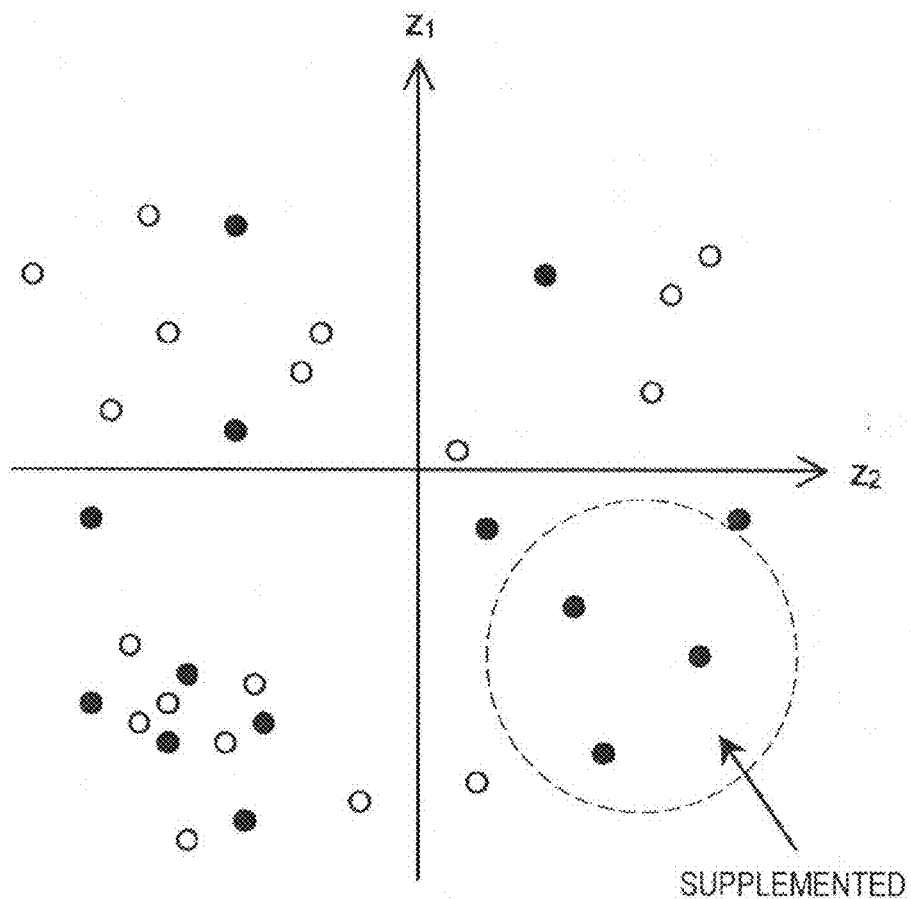
FIG. 15 is a diagram useful in explaining a method of integrating data sets.
Figure 16:
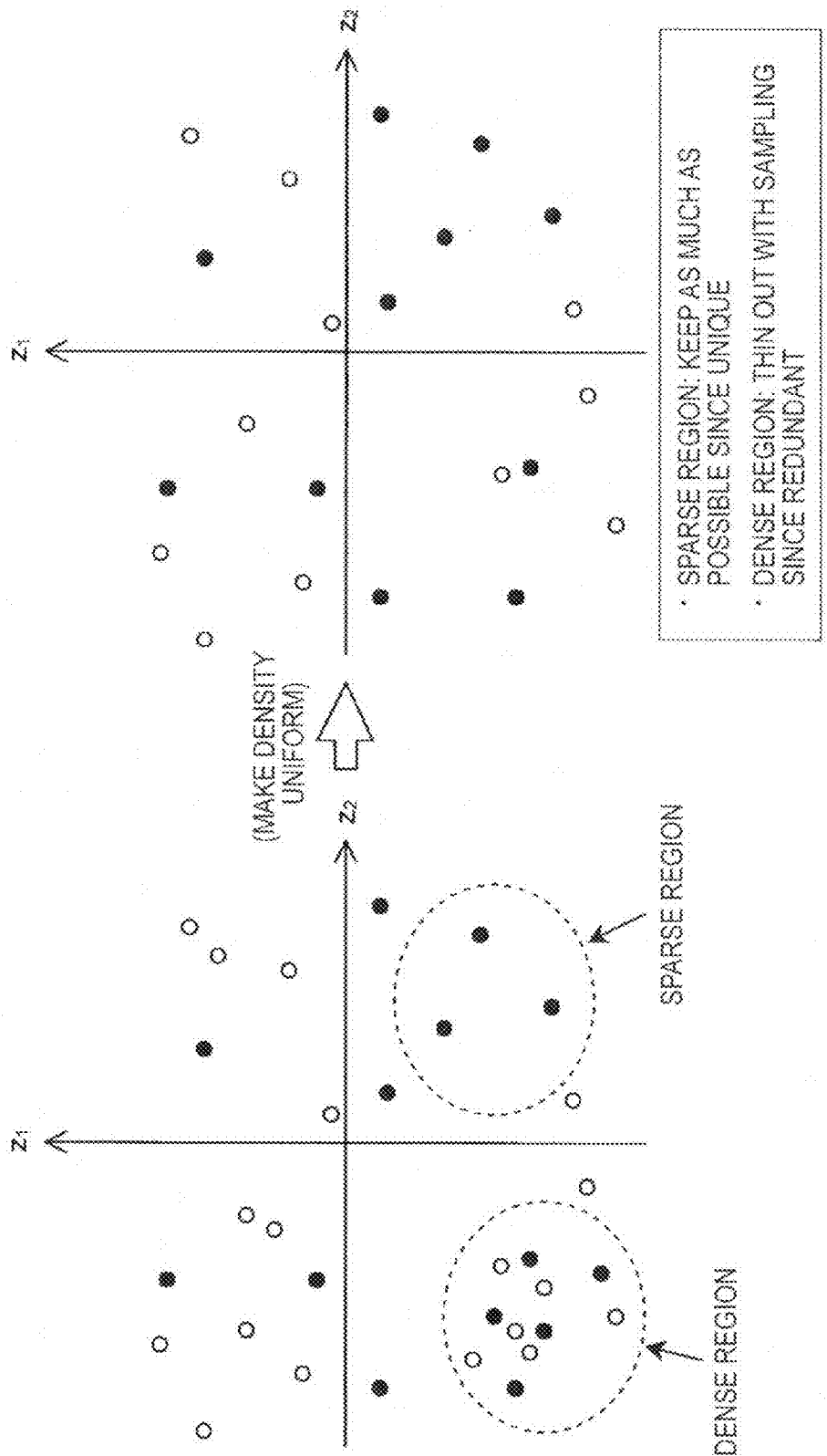
FIG. 16 is a diagram useful in explaining a method of integrating data sets.

As shown in FIG. 15, the larger the number of learning data sets, the harder it is for a sparse region to be produced, which increases the likelihood that an estimator capable of outputting a highly precise recognition result regardless of the region corresponding to the inputted input data will be constructed. Also, even if the number of learning data sets is comparatively low, so long as the feature amount coordinates are evenly distributed across the feature amount space, it is likely that an estimator capable of outputting a highly precise recognition result can be constructed. For this reason, the present inventors devised an adjustment framework that takes the distribution of feature amount coordinates into consideration when integrating the learning data so as to produce a specified distribution (such as a uniform distribution or a Gaussian distribution) for the distribution of feature amount coordinates corresponding to the collection of learning data after integration.

1-3-2 Sampling Configuration Used During Data Integration

First, the method of sampling the learning data will be described with reference to FIG. 16. FIG. 16 is a diagram useful in explaining the method of sampling the learning data.

As described earlier, since it is possible to successively add learning data when online learning is used, it is possible to construct an estimator using a large amount of learning data. However, since the information processing apparatus 10 has limited memory resources, when integrating the learning data, it is necessary to reduce the number of learning data used to construct an estimator. When doing so, instead of simply reducing (i.e., sampling) the learning data randomly, by sampling the learning data with consideration to the distribution of feature amount coordinates, it is possible to reduce the number of learning data without lowering the precision of the estimator. As one example, as shown in FIG. 16, sampling is carried out so as to heavily reduce the number of feature amount coordinates included in a dense region and to retain feature amount coordinates included in a sparse region.

By sampling the learning data according to this method, the density of the feature amount coordinates corresponding to the collection of learning data after integration becomes uniform. That is, although the overall number of learning data is reduced, since the feature amount coordinates are uniformly distributed across the entire feature amount space, it is possible to take the entire feature amount space into consideration during the regressive/discriminative learning carried out when generating the estimation function. As a result, even if the memory resources of the information processing apparatus 10 are limited, it will still be possible to construct a highly precise estimator capable of estimating accurate recognition results.

1-3-3: Weighting Configuration Used During Data Integration

Next, the method of setting weightings for learning data will be described.

When the memory resources of the information processing apparatus 10 are limited, it is effective to sample the learning data during the integration of learning data. Meanwhile, if sufficient memory resources are available, it is possible to improve the performance of the estimator by setting weightings for the learning data instead of sampling the learning data. As one example, a large weighting is set for learning data whose feature amount coordinates are included in a sparse region and a small weighting is set for learning data whose feature amount coordinates are included in a dense region. Such weightings that have been set for the learning data are then taken into consideration during the regressive/discriminative learning carried out when generating the estimation function.

1-3-4: Sampling and Weighting Configuration Used During Data Integration

It is also possible to combine the method of sampling learning data and the method of setting weightings for the learning data. For example, after the learning data has been sampled to set the distribution of feature amount coordinates at a specified distribution, weightings are set in keeping with the density of the feature amount coordinates for the learning data belonging to the collection of learning data retained after sampling. By combining the sampling process and the weighting process in this way, it is possible to construct a more precise estimator even when memory resources are limited.

1-4: Efficient Sampling/Weighting Methods

Next, methods of efficiently sampling and weighting the learning data will be described.

1-4-1: Sampling Method

Figure 17:
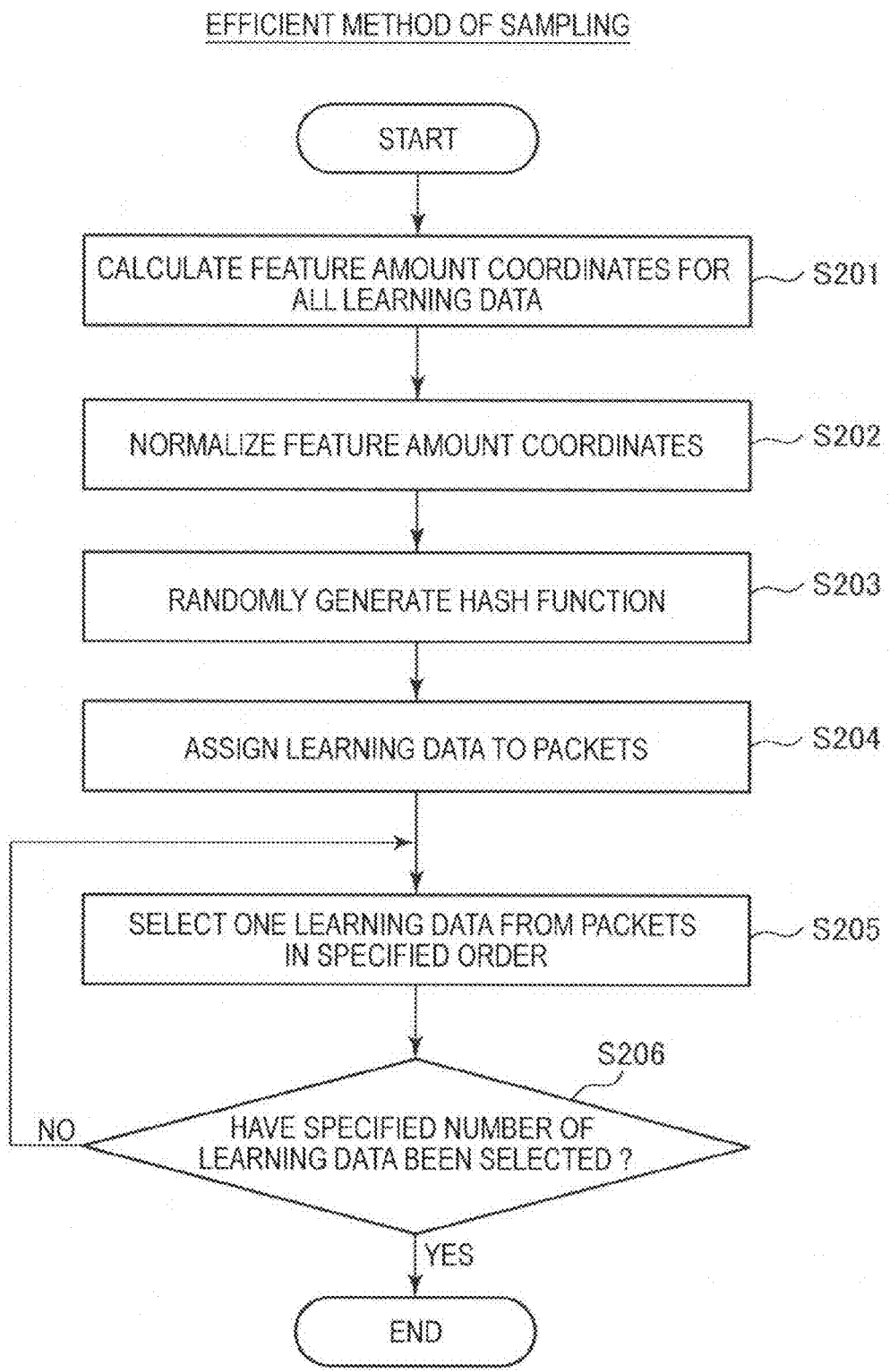
FIG. 17 is a diagram useful in explaining a method of integrating data sets.

First, a method of efficiently sampling the learning data will be described with reference to FIG. 17. FIG. 17 is a diagram useful in explaining a method of efficiently sampling the learning data.

Figure 18:
FIG. 18 is a diagram useful in explaining a method of integrating data sets.

As shown in FIG. 17, the information processing apparatus 10 calculates the feature amount vectors (feature amount coordinates) for all of the learning data (S201). Next, the information processing apparatus 10 normalizes the calculated feature amount coordinates (S202). As one example, as shown in FIG. 18, the information processing apparatus 10 normalizes the values of the respective feature amounts so that the dispersion is 1 and the mean is 0.

Next, the information processing apparatus 10 randomly generates a hash function g (S203). As one example, the information processing apparatus 10 generates a plurality of hash functions g that output five-bit values as shown by Equation (1) given below. At this time, the information processing apparatus 10 generates Q hash functions $g_q$ (where q=1 to Q). The functions $h_j$ (where j=1 to 5) are defined by Equation (2) given below. Here, "d" and "Threshold" are decided by random numbers.

If the distribution of the feature amount coordinates is close to a uniform distribution, a uniform random number is used as the random number used to decide "Threshold". Similarly, if the distribution of the feature amount coordinates is close to a Gaussian distribution, a Gaussian random number is used as the random number used to decide "Threshold". This also applies to other distributions. In the same way, d is decided using a random number that is biased in keeping with a contribution ratio of the basis function used to calculate $z_d$. For example, a random number such that the larger the contribution ratio of the basis function used to calculate $z_d$, the higher the probability of generating d is used.

Math. 1

$$g(Z) = \{h_1(Z), h_2(Z), h_3(Z), h_4(Z), h_5(Z)\} \quad (1)$$

$$h_j(Z) = \begin{cases} 1 & (z_d > \text{Threshold}) \\ 0 & (z_d \le \text{Threshold}) \end{cases} \quad (2)$$

On generating the hash function $g_q$ (where q=1 to Q), the information processing apparatus 10 inputs the feature amount vector Z corresponding to each learning data into the hash function $g_q$ to calculate hash values. The information processing apparatus 10 then assigns the learning data to packets based on the calculated hash values (S204). The expression "packet" used here refers to a region with which values that can be taken by a hash value are associated.

Figure 19:
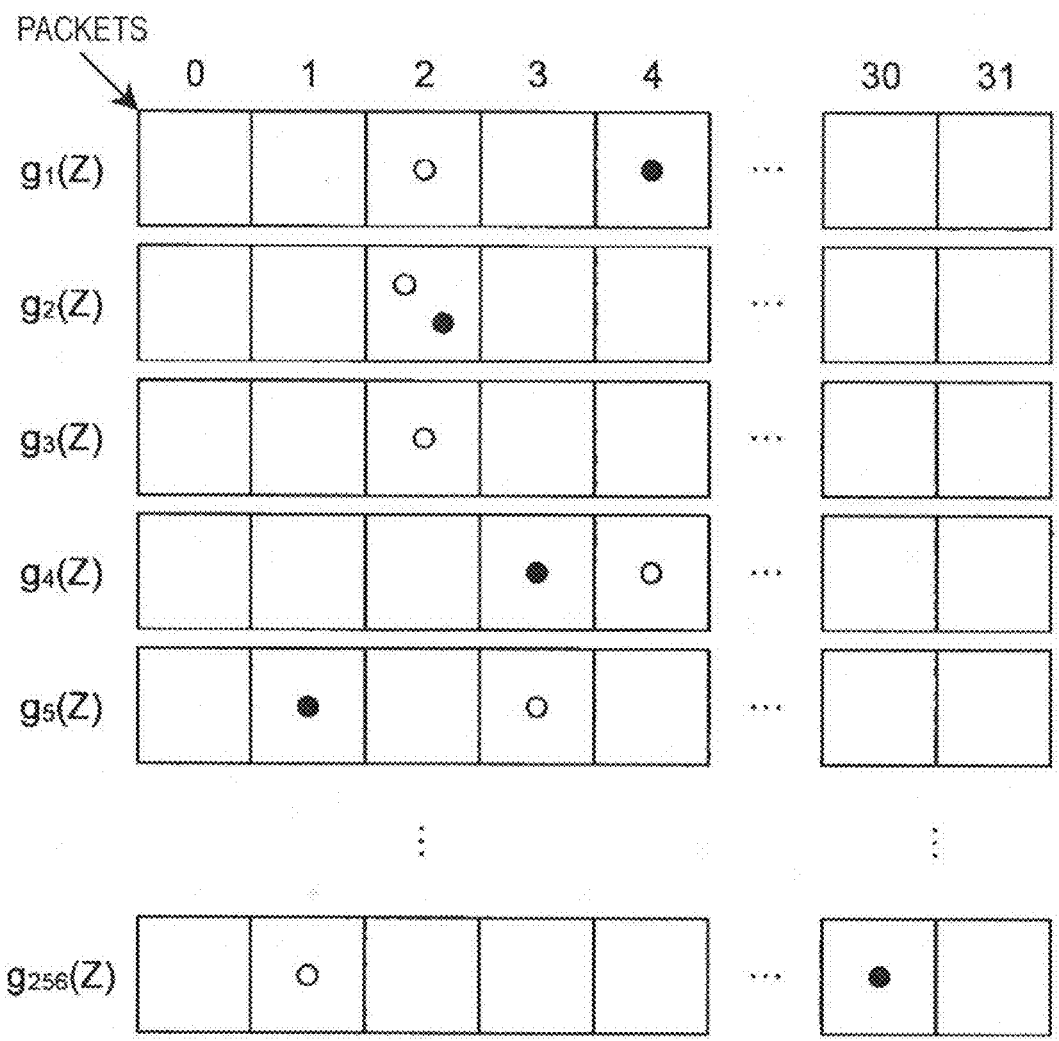
FIG. 19 is a diagram useful in explaining a method of integrating data sets.

For example, let us consider a case where hash values are five-bit and Q is 256. In this case, the configuration of the packets is as shown in FIG. 19. As shown in FIG. 19, since the hash values are five-bit, thirty-two packets (hereinafter referred to as a "packet set") are provided for one hash value $g_q$. Also, since Q=256, 256 packet sets are provided. The method of assigning the learning data to packets will now be described for this example.

When the feature amount vector Z corresponding to a certain set of learning data is given, 256 hash values are calculated using 256 hash functions $g_1$ to $g_{256}$. As one example, if $g_1(Z)=2$ (expressed in base 10), the information processing apparatus 10 assigns such learning data to "2" in the packet set corresponding to $g_1$. In the same way, $g_q(Z)$ (where q=2 to 256) are calculated and the learning data is assigned to packets corresponding to the respective values. In the example in FIG. 19, two types of learning data are expressed by white circles and black circles and the correspondence with the respective packets is schematically shown.

Figure 20:
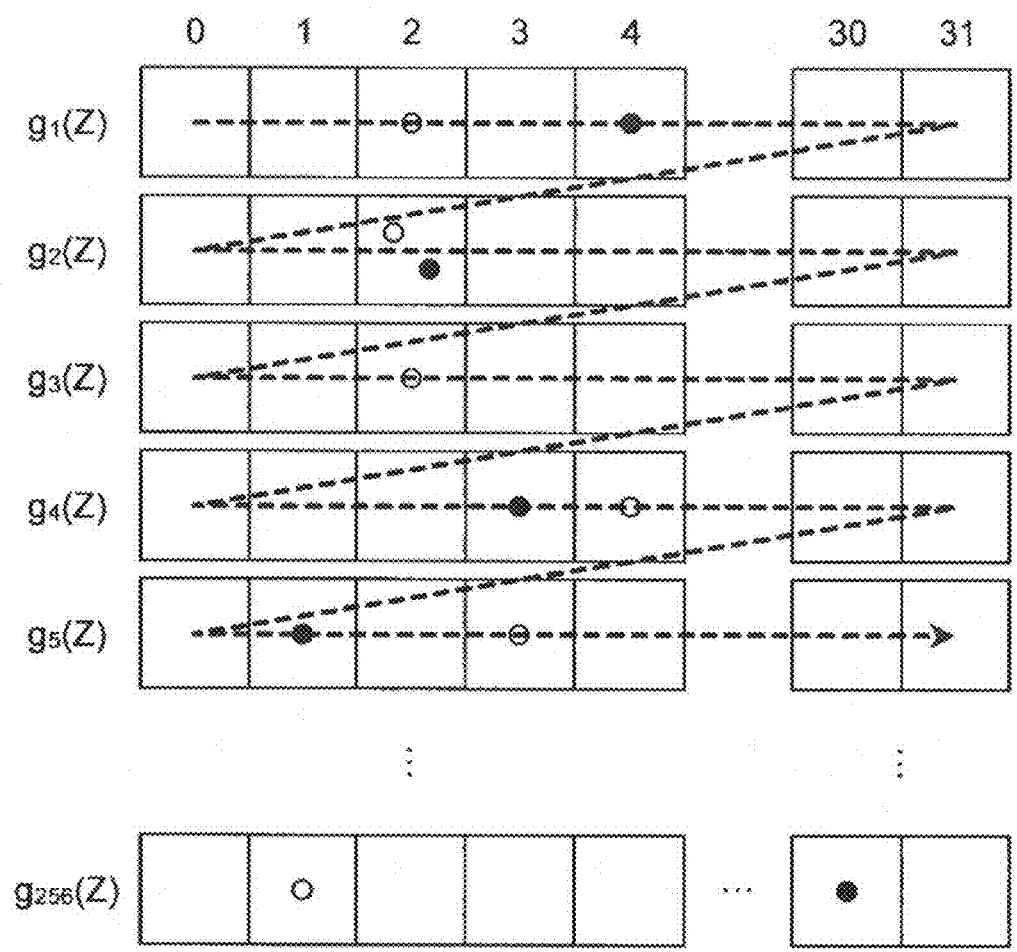
FIG. 20 is a diagram useful in explaining a method of integrating data sets.

After assigning the respective learning data to packets in this way, the information processing apparatus 10 selects one learning data from the packets in a specified order (S205). For example, as shown in FIG. 20, the information processing apparatus 10 scans the packets in order from the top left (where the index q of the hash function is low and the value assigned to the packet is low) and selects one set of learning data assigned to a packet.

Figure 21:
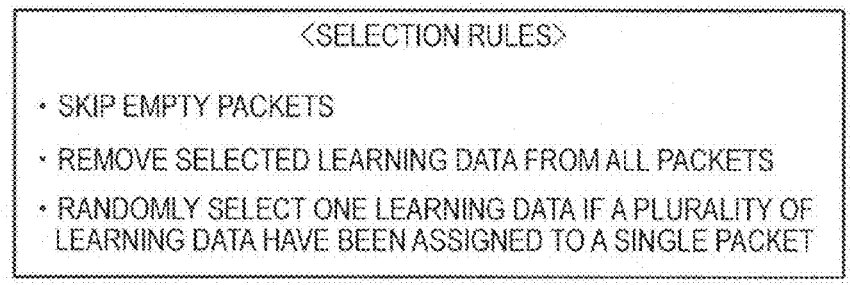
FIG. 21 is a diagram useful in explaining a method of integrating data sets.
Figure 22:
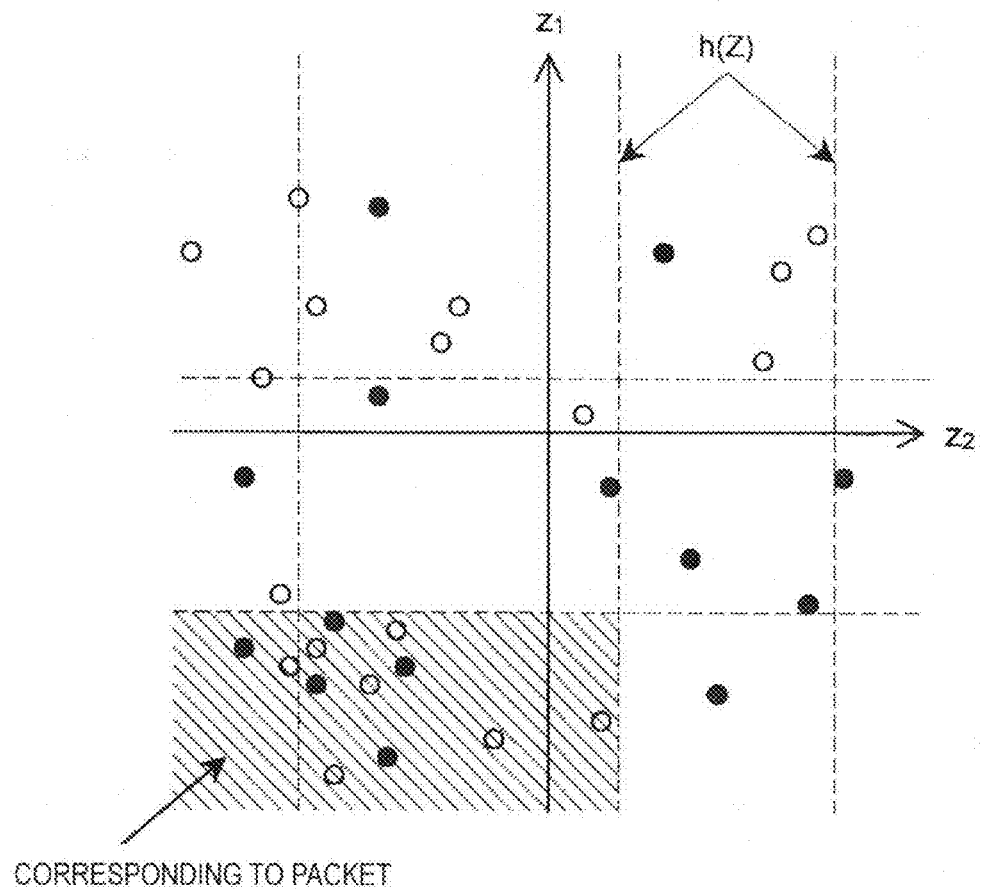
FIG. 22 is a diagram useful in explaining a method of integrating data sets.

Rules for selecting learning data from a packet are shown in FIG. 21. First, the information processing apparatus 10 skips empty packets. Secondly, after selecting one set of learning data, the information processing apparatus 10 removes such learning data from all other packets. Thirdly, the information processing apparatus 10 randomly selects one set of learning data when a plurality of learning data have been assigned to a single packet. Note that information on the selected learning data is stored by the information processing apparatus 10.

After one set of learning data has been selected, the information processing apparatus 10 determines whether a specified number of learning data have been selected (S206). If a specified number of learning data have been selected, the information processing apparatus 10 outputs the selected specified number of learning data as the collection of learning data after integration and ends the series of processes relating to the integration of learning data. Meanwhile, if the specified number of learning data have not been selected, the information processing apparatus 10 returns to step S205.

Figure 23:
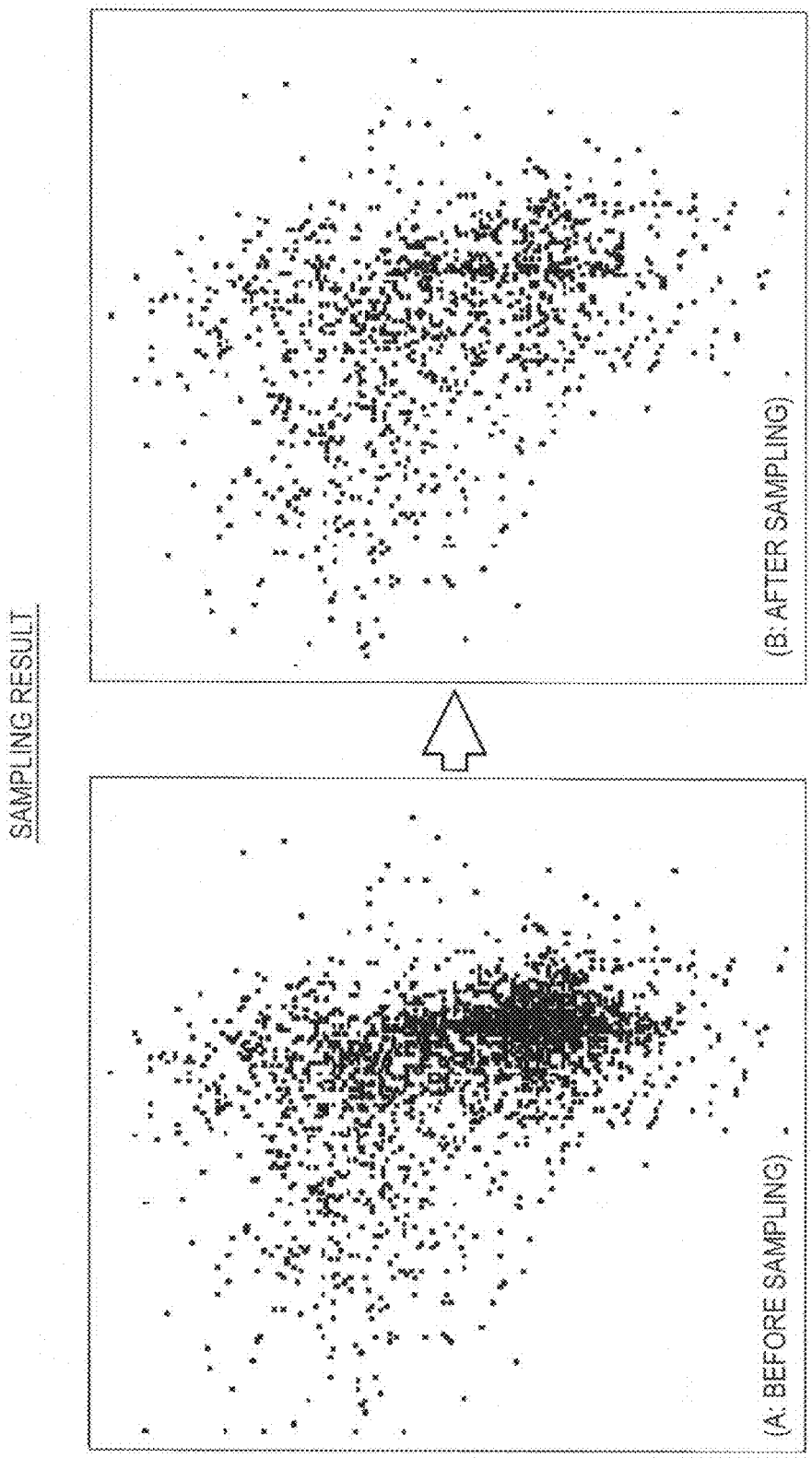
FIG. 23 is a diagram useful in explaining a method of integrating data sets.

This completes the description of an efficient method of sampling the learning data. Note that the correspondence between the feature amount space and the packets described above is depicted by the image shown in FIG. 22. The result of carrying out the sampling of learning data according to the method described above is as shown for example in FIG. 23 (an example of a uniform distribution). As shown in FIG. 23, feature amount coordinates included in a sparse region are kept and feature amount coordinates included in a dense region are sampled (i.e., thinned out). Note that if the packets described above are not used, there is a large increase in the computation load that may be required to sample the learning data.

1-4-2: Weighting Method

Figure 24:
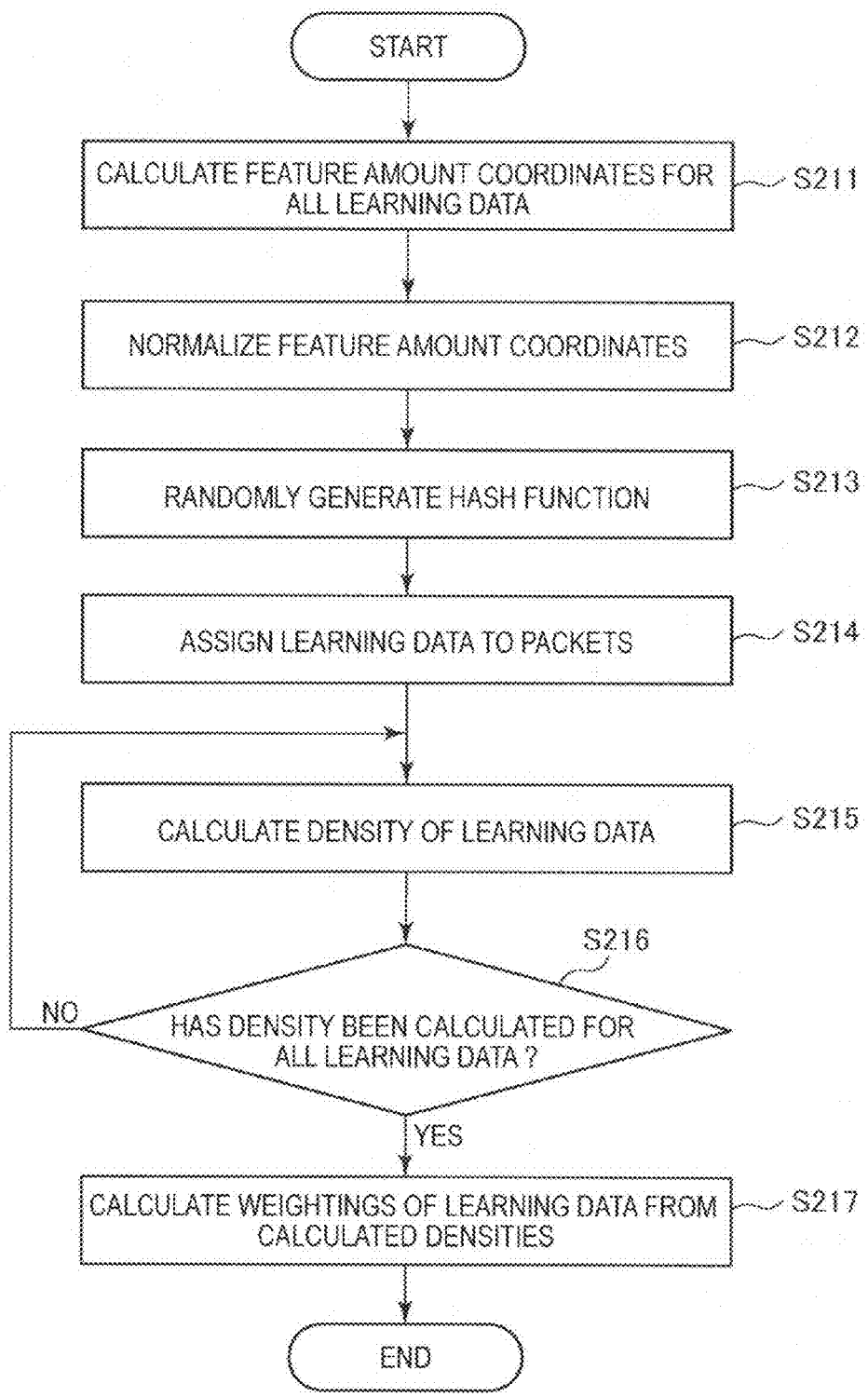
FIG. 24 is a diagram useful in explaining a method of integrating data sets.

Next, an efficient method of weighting the learning data will be described with reference to FIG. 24. FIG. 24 is a diagram useful in explaining an efficient method of weighting the learning data.

As shown in FIG. 24, the information processing apparatus 10 calculates feature amount vectors (feature amount coordinates) for all of the learning data (S211). After this, the information processing apparatus 10 normalizes the calculated feature amount coordinates (S212). For example, as shown in FIG. 24, the information processing apparatus 10 normalizes the values of the feature amounts so that the dispersion is 1 and the mean is 0.

Next, the information processing apparatus 10 randomly generates a hash function g (S213). As one example, the information processing apparatus 10 generates a plurality of hash functions g that output five-bit values as shown by Equation (1) given above. When doing so, the information processing apparatus 10 generates Q hash functions $g_q$ (where q=1 to Q). The functions $h_j$ (where j=1 to 5) are defined by Equation (2) given above. Here, "d" and "Threshold" are decided by random numbers.

If the distribution of the feature amount coordinates is close to a uniform distribution, a uniform random number is used as the random number used to decide "Threshold". Similarly, if the distribution of the feature amount coordinates is close to a Gaussian distribution, a Gaussian random number is used as the random number used to decide "Threshold". This also applies to other distributions. In the same way, d is decided using a random number that is biased in keeping with the contribution ratio of the basis function used to calculate zd. For example, a random number such that the larger the contribution ratio of the basis function used to calculate $z_d$, the higher the probability of generating d is used.

Figure 25:
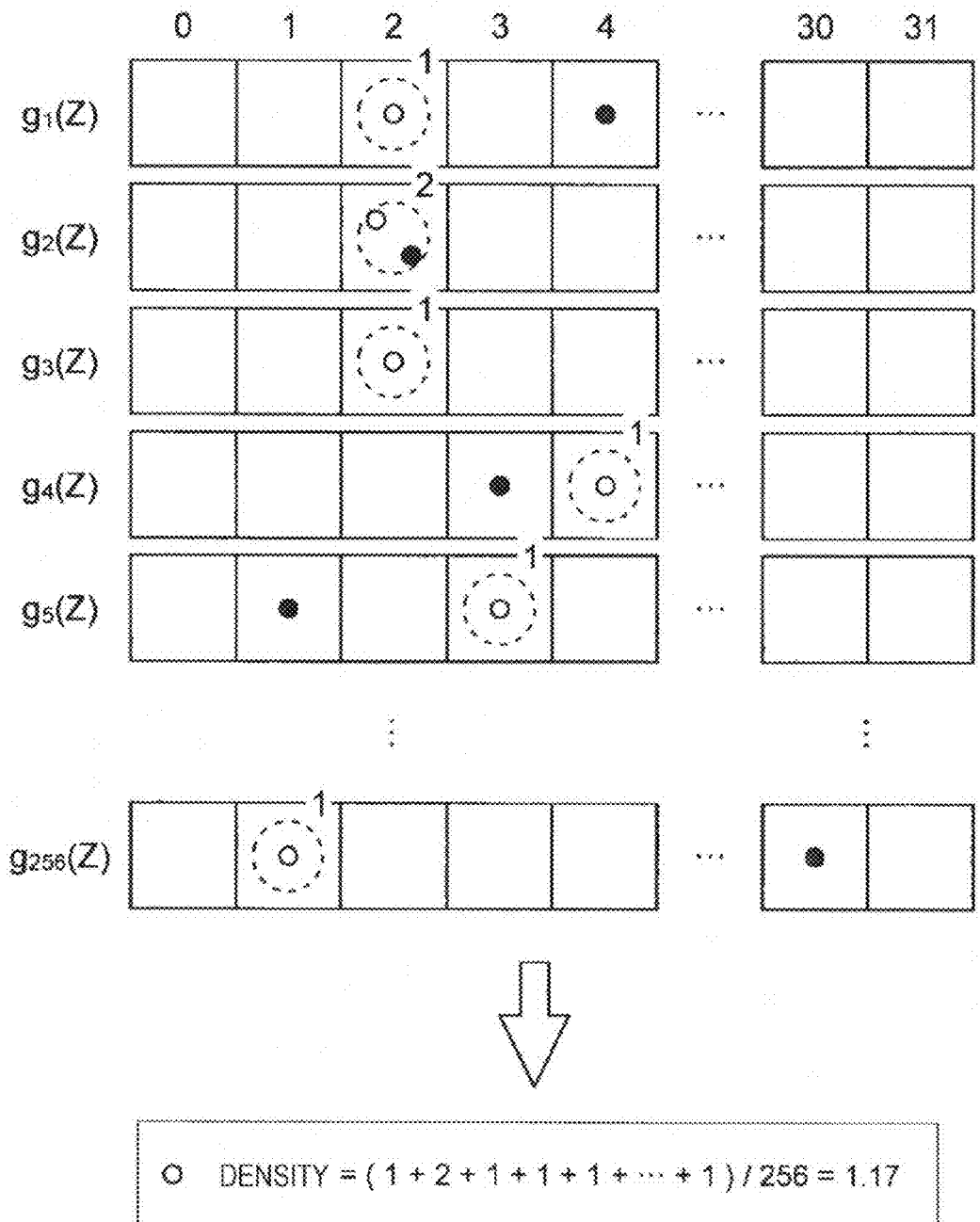
FIG. 25 is a diagram useful in explaining a method of integrating data sets.
Figure 27:
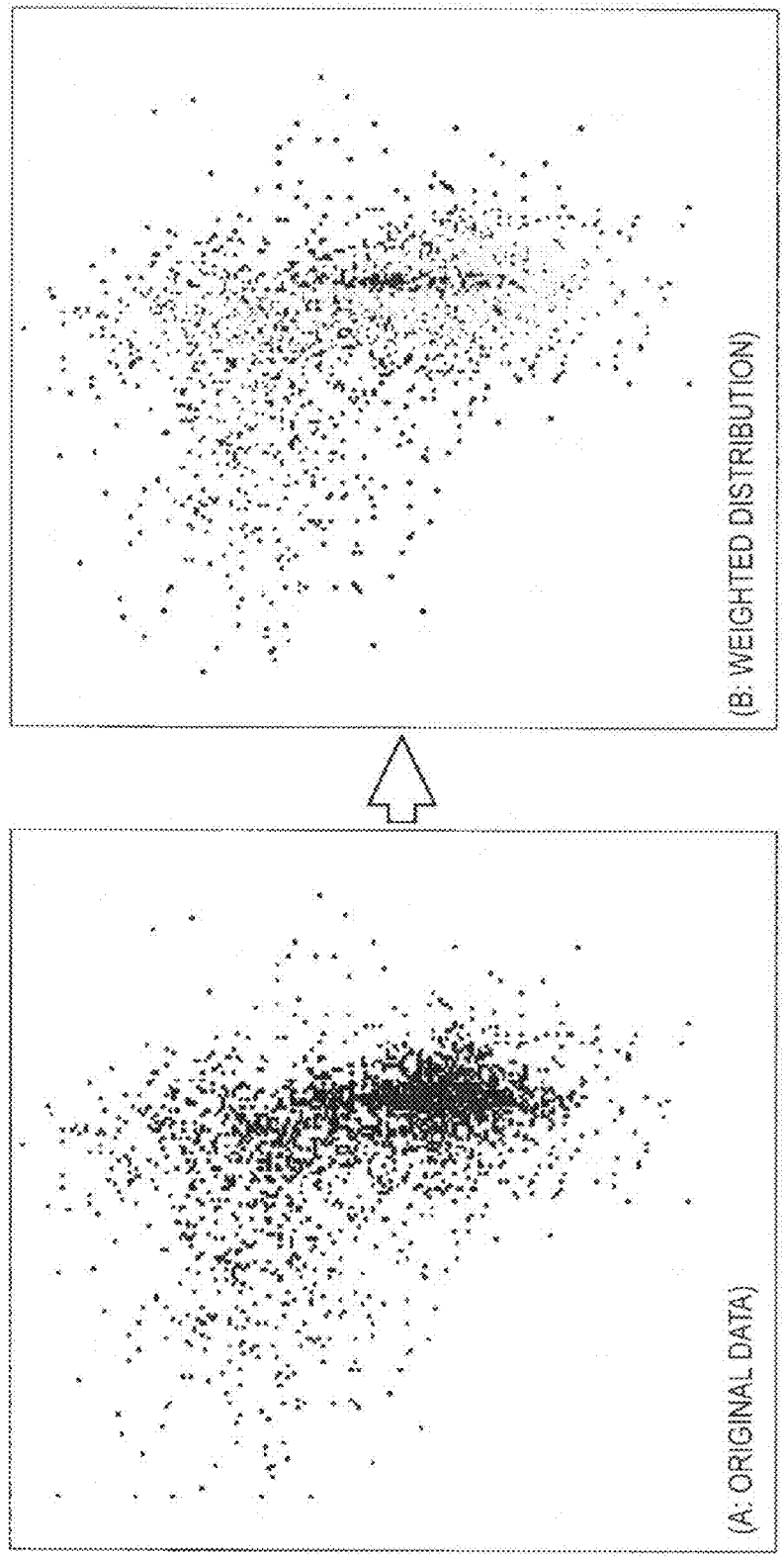
FIG. 27 is a diagram useful in explaining a method of integrating data sets.

On generating the hash function $g_q$ (where q=1 to Q), the information processing apparatus 10 inputs the feature amount vector Z corresponding to each learning data into the hash function $g_q$ to calculate hash values. The information processing apparatus 10 then assigns the learning data to a packet based on the calculated hash values (S214). After this, the information processing apparatus 10 calculates the density for the respective learning data (S215). As one example, assume that the learning data sets have been assigned to the packets as shown in FIG. 25. Focus here on the learning data depicted using white circles.

In this case, for the packet sets corresponding to the respective hash functions, the information processing apparatus 10 first counts the number of learning data assigned to packets including white circles. As one example, for the packet set corresponding to the hash function $g_1$, the number of learning data assigned to the packet including a white circle is 1. In the same way, for the packet set corresponding to the hash function $g_2$, the number of learning data assigned to the packet including a white circle is 2. The information processing apparatus 10 counts the number of learning data assigned to the packets including white circles for the packet sets corresponding to the hash functions $g_1$ to $g_{256}$.

After this, the information processing apparatus 10 calculates a mean value of the counted number of learning data and regards the calculated mean value as the density of the learning data corresponding to white circles. The information processing apparatus 10 calculates the densities of all of the learning data in the same way. Note that the densities of the learning data are expressed as shown in FIG. 26B. In FIG. 26B, dark-colored parts indicate a high density and light-colored parts indicate a low density On completing the calculation of density for all of the learning data, the information processing apparatus 10 advances to step S217 (S216). When the processing has advanced to step S217, the information processing apparatus 10 calculates weightings set for each learning data from the calculated densities (S217). For example, the information processing apparatus 10 sets a reciprocal of the density as the weighting. The distribution of the weightings set for the learning data is depicted in FIG. 27B. In FIG. 27B, dark-colored parts indicate a large weighting and light-colored parts indicate a small weighting. As should be clear from FIGS. 27A and 27B, dense regions have a small weighting and sparse regions have a large weighting.

When the calculation of weightings set for the learning data has been completed as described above, the information processing apparatus 10 ends the series of processes relating to weighting. This completes the description of an efficient method of weighting the learning data. Note that if the packets described above are not used, there is a large increase in the computation load that may be required to weight the learning data.

1-4-3: Combined Method

Figure 28:
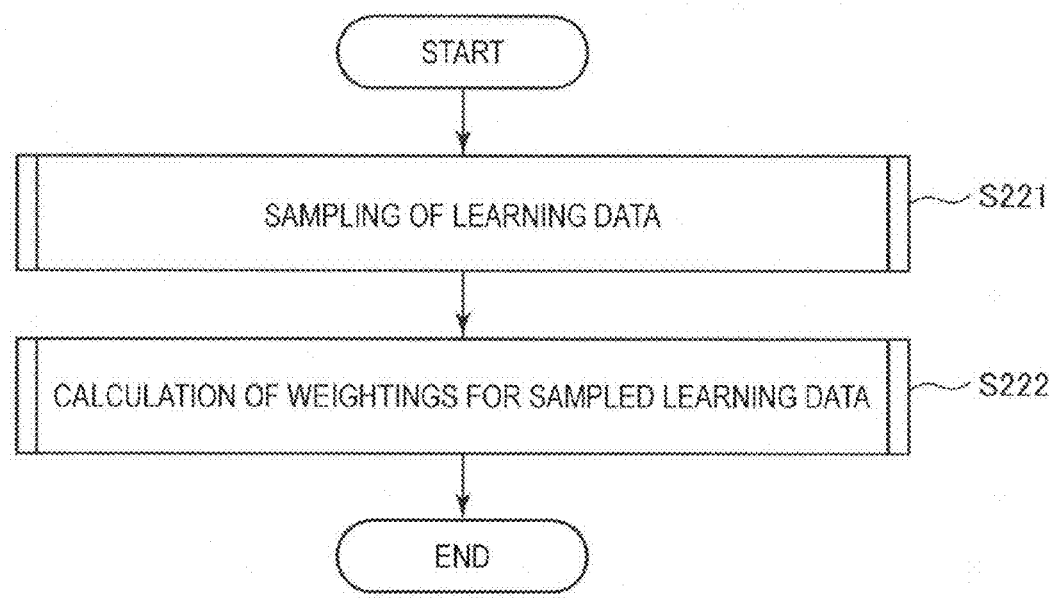
FIG. 28 is a diagram useful in explaining a method of integrating data sets.

Next, a method where the efficient method of sampling and the efficient method of weighting described above are combined will be described with reference to FIG. 28. FIG. 28 is a diagram useful in explaining the method of combining the efficient method of sampling and the efficient method of weighting described above.

As shown in FIG. 28, the information processing apparatus 10 first executes a sampling process for the learning data (S221). This sampling process is carried out in keeping with the flow of processing shown in FIG. 17. When a specified number of learning data have been obtained, the information processing apparatus 10 executes a weighting process for the obtained learning data (S222). The weighting process is carried out in keeping with the flow of processing shown in FIG. 24. Note that the feature amount vectors and hash functions calculated during the sampling process may be used again here. On completing the sampling process and the weighting process, the information processing apparatus 10 ends the series of processes.

This completes the description of the efficient method of sampling/weighting the learning data.

1-5: Modifications to Sampling Process and Weighting Process

Next, modifications to the sampling process and the weighting process will be introduced.

1-5-1: Modification 1 (Processing Based on Distance)

Figure 29:
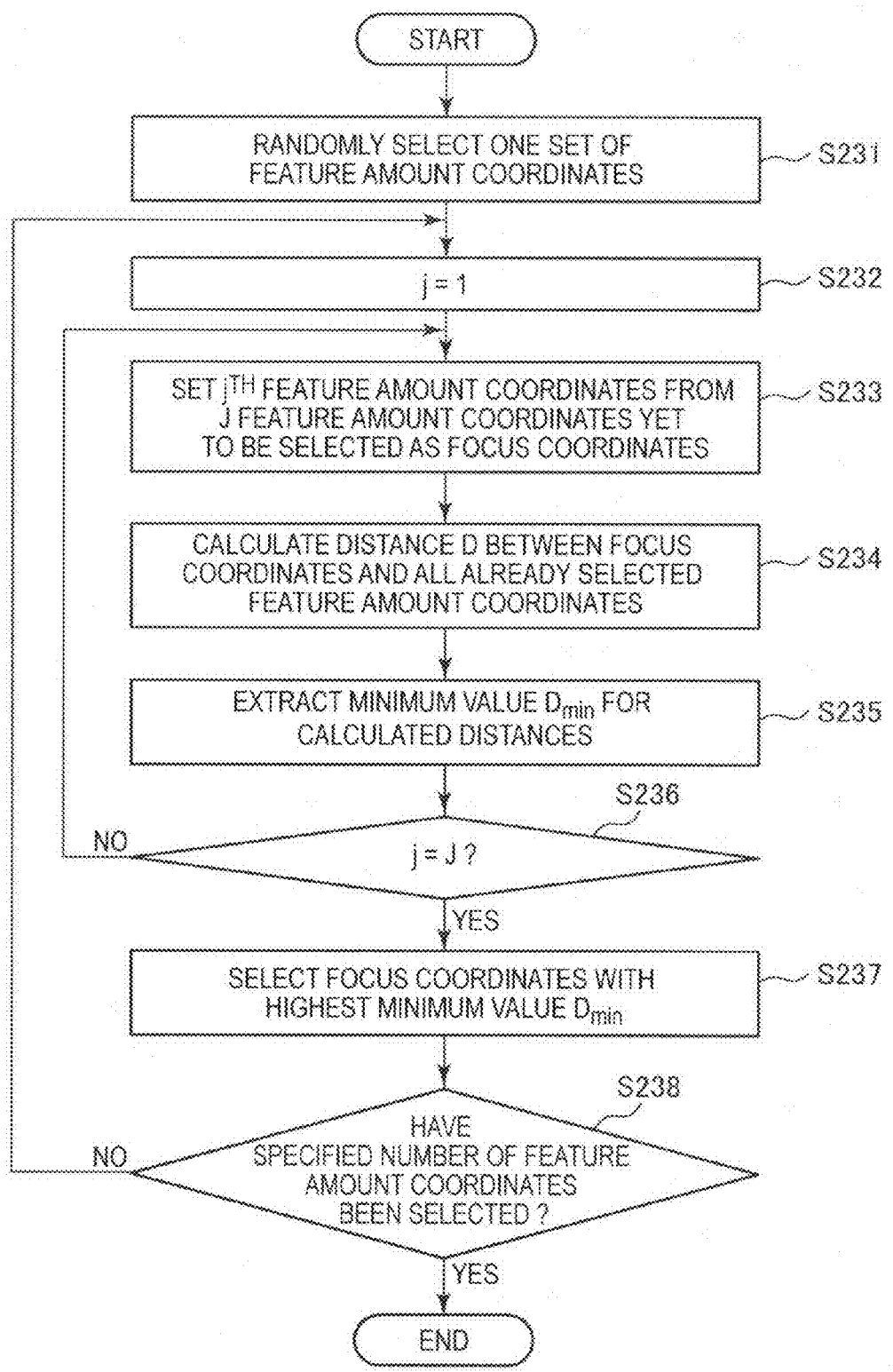
FIG. 29 is a diagram useful in explaining a method of integrating data sets.

First, a method of sampling the learning data based on the distances between feature amount coordinates will be described with reference to FIG. 29. FIG. 29 is a diagram useful in explaining a method of sampling learning data based on the distances between feature amount coordinates.

As shown in FIG. 29, the information processing apparatus 10 first randomly selects one set of feature amount coordinates (S231). Next, the information processing apparatus 10 initializes the index j (S232). The information processing apparatus 10 then sets the $j^{th}$ feature amount coordinates out of the J feature amount coordinates that are yet to be selected as focus coordinates (S233). After this, the information processing apparatus 10 calculates distances D between the focus coordinates and all of the feature amount coordinates that have already been selected (S234). Next, the information processing apparatus 10 extracts a minimum value $D_{min}$ out of the calculated distances D (S235).

After this, the information processing apparatus 10 determines whether j=J (S236). If j=J, the information processing apparatus 10 advances to step S237. Meanwhile, if j≠J, the information processing apparatus 10 advances to step S233. If the processing has advanced to step S237, the information processing apparatus 10 selects the focus coordinates (feature amount coordinates) with the largest minimum value $D_{min}$ (S237). Next, the information processing apparatus 10 determines whether the number of feature amount coordinates selected in steps S231 and S237 has reached a specified number (S238).

If the number of feature amount coordinates selected in steps S231 and S237 has reached the specified number, the information processing apparatus 10 outputs the learning data corresponding to the selected feature amount coordinates as the collection of learning data after integration and ends the series of processes. Meanwhile, if the number of feature amount coordinates selected in steps S231 and S237 has not reached the specified number, the information processing apparatus 10 advances to step S232.

This completes the method of sampling the learning data based on the distance between the feature amount coordinates.

1-5-2: Modification 2 (Processing Based on Clustering)

Next, a method of sampling/weighting the learning data based on clustering will be described. Note that although the sampling method and weighting method are described separately below, such methods may be combined.

Selection of Data Sets

Figure 30:
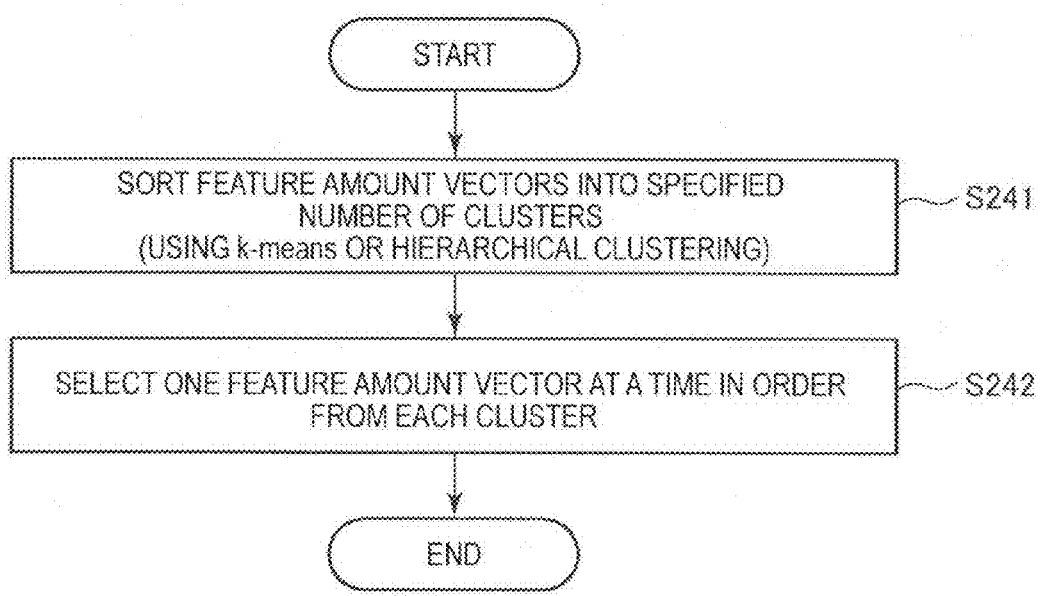
FIG. 30 is a diagram useful in explaining a method of integrating data sets.

First, a method of sampling learning data based on clustering will be described with reference to FIG. 30. FIG. 30 is a diagram useful in explaining a method of sampling the learning data based on clustering.

As shown in FIG. 30, first the information processing apparatus 10 classifies the feature amount vectors into a specified number of clusters (S241). As examples of the clustering method, it is possible to use k-means or hierarchical clustering. After this, the information processing apparatus 10 selects one feature amount vector from each cluster in order (S242). The information processing apparatus 10 then outputs the learning data corresponding to the selected feature amount vectors as the collection of learning data after integration and ends the series of processes.

Setting of Weightings

Figure 31:
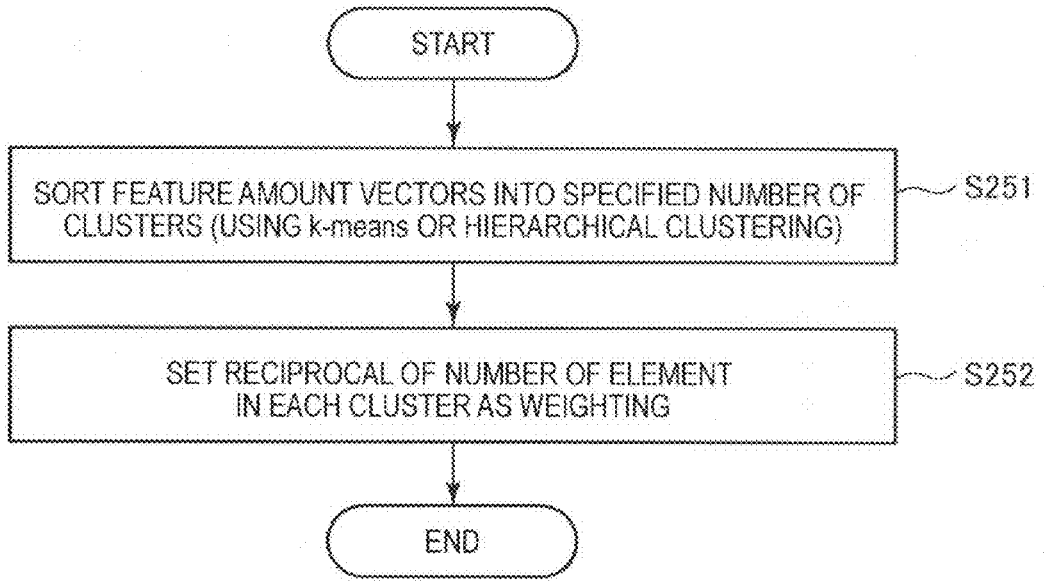
FIG. 31 is a diagram useful in explaining a method of integrating data sets.

Next, the method of weighting the learning data based on clustering will be described with reference to FIG. 31. FIG. 31 is a diagram useful in explaining a method of weighting the learning data based on clustering.

As shown in FIG. 31, the information processing apparatus 10 first classifies the feature amount vectors into a specified number of clusters (S251). As examples of the clustering method, it is possible to use k-means or hierarchical clustering. After this, the information processing apparatus 10 counts the number of elements in each cluster and calculates the reciprocals of the number of elements (S252). The information processing apparatus 10 then outputs the calculated reciprocals of the number of elements as the weightings and ends the series of processes.

This completes the description of the method of sampling/weighting the learning data based on clustering.

1-5-3: Modification 3 (Processing Based on Density Estimating Method)

Next, a method of sampling/weighting the learning data based on a density estimating method will be described. Note that although the sampling method and weighting method are described separately below, such methods may be combined.

Selection of Data Sets

Figure 32:
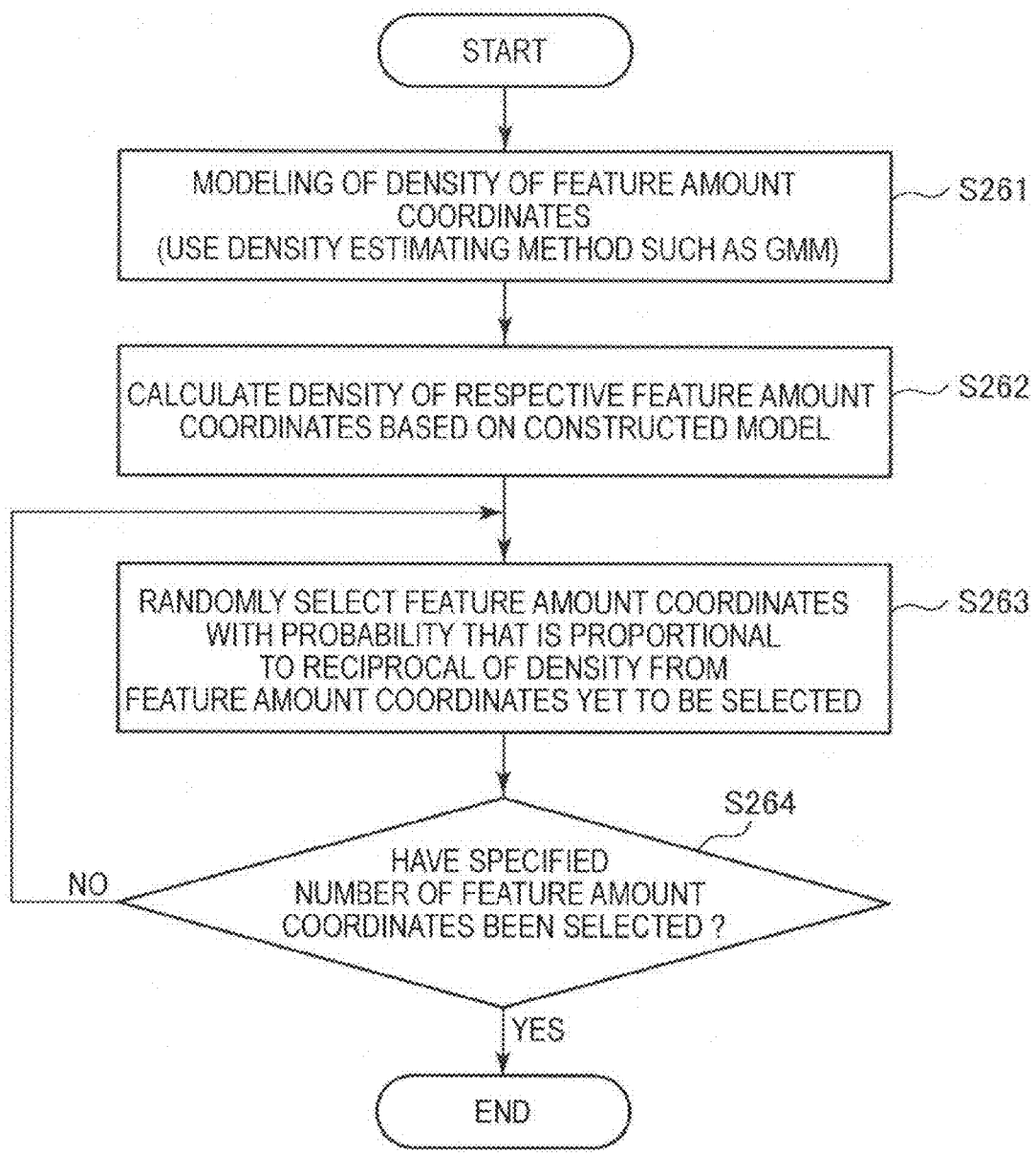
FIG. 32 is a diagram useful in explaining a method of integrating data sets.

First, a method of sampling learning data based on a density estimating method will be described with reference to FIG. 32. FIG. 32 is a diagram useful in explaining a method of sampling the learning data based on a density estimating method.

As shown in FIG. 32, the information processing apparatus 10 first models the density of the feature amount coordinates (S261). To model the density, as one example a density estimating method such as GMM (Gaussian Mixture Model) is used. Next, the information processing apparatus 10 calculates the density of the respective feature amount coordinates based on the constructed model (S262). After this, the information processing apparatus 10 randomly selects, out of the feature amount coordinates that are yet to be selected, the feature amount coordinates with a probability that is proportional to the reciprocal of the density (S263).

Next, the information processing apparatus 10 determines whether a specified number of feature amount coordinates have been selected (S264). If a specified number of feature amount coordinates have not been selected, the information processing apparatus 10 returns to step S263. Meanwhile, if a specified number of feature amount coordinates have been selected, the information processing apparatus 10 then outputs the learning data corresponding to the selected feature amount coordinates as the collection of learning data after integration and ends the series of processes.

Setting of Weightings

Figure 33:
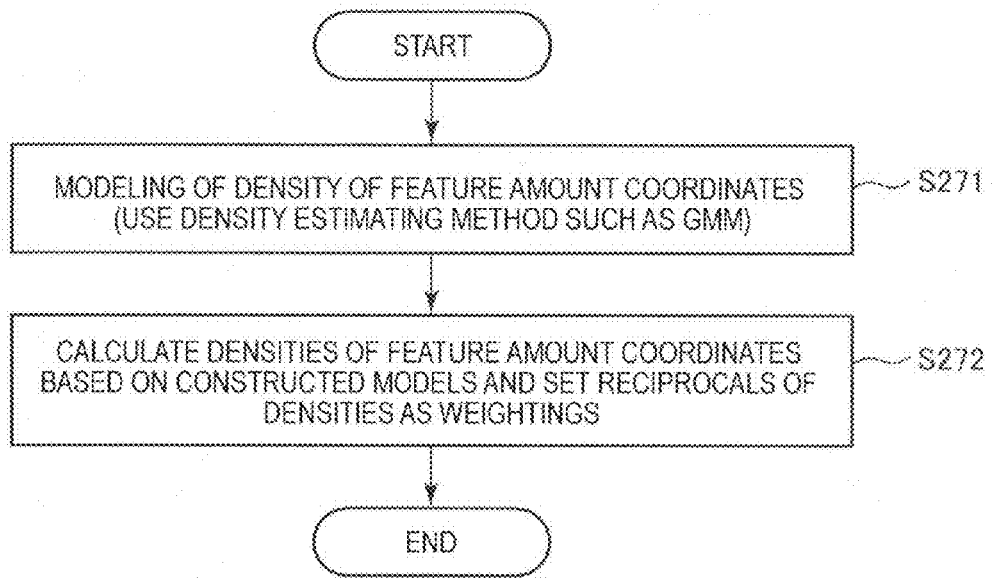
FIG. 33 is a diagram useful in explaining a method of integrating data sets.

Next, the method of weighting the learning data based on a density estimating method will be described with reference to FIG. 33. FIG. 33 is a diagram useful in explaining a method of weighting the learning data based on a density estimating method.

As shown in FIG. 33, the information processing apparatus 10 first models the density of the feature amount coordinates (S271). To model the density, as one example a density estimating method such as GMM (Gaussian Mixture Model) is used. Next, the information processing apparatus 10 calculates the density of the feature amount coordinates based on the constructed model (S272). After this, the information processing apparatus 10 sets the reciprocals of the calculated densities as the weightings and ends the series of processes.

This completes the description of the method of sampling/weighting the learning data based on a density estimating method.

This completes the description of the fundamental technology that can be used in the embodiment described below. However, the technology of the embodiment described below does not need to use all of the fundamental technology described above and may use a modification of the fundamental technology or may use the fundamental technology in combination with another machine learning algorithm.

2: Embodiment

An embodiment of the present disclosure will now be described.

2-1: Automated Construction Method for Thought Routine

The present embodiment relates to a technology that automatically constructs a thought routine of an agent such as a robot and/or a thought routine of an NPC (Non-Player Character) who appears in a variety of games. For example, the present disclosure relates to a technology that automatically constructs a thought routine that decides the next action a to be taken by an NPC in a certain state S. In the present specification, a program that outputs an action a in response to the input of a state S is referred to as a "thought routine". The following description is for an example of a thought routine that decides the action a of an NPC. It should be obvious that it is also possible to automatically construct a thought routine that decides the action of a robot or the like in the same way.

2-1-1: Thought Routine

Figure 34:
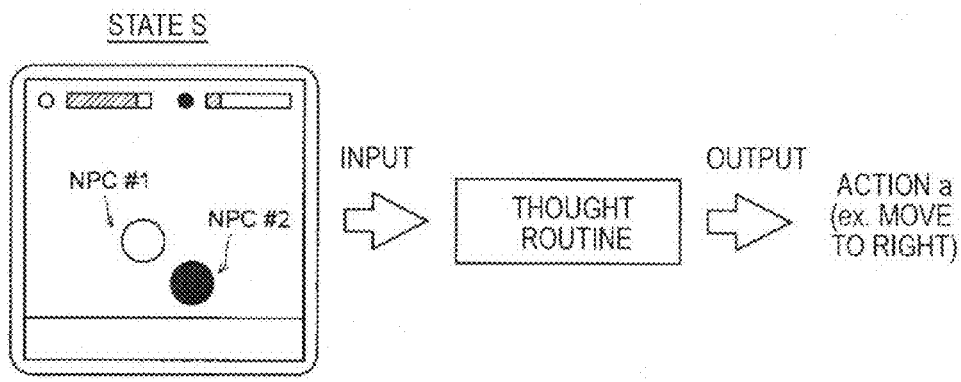
FIG. 34 is a diagram useful in explaining the configuration of a thought routine.

As described above, as shown in FIG. 34, the expression "thought routine" in this specification is a program that outputs an action a in response to input of a state S. Note that the expression "state S" refers to an environment in which the NPC whose action a is to be decided is located at a given moment. As one example, as shown in FIG. 34, consider a fight game where two NPCs (NPC#1 and #2) fight each other. This fighting game is configured so that NPC#1 and NPC#2 each have hit points and such hit points decrease when the character receives damage. In this example, the state S at a given moment is the hit points and the positional relationship between NPC#1 and NPC#2.

If this state S is inputted, the thought routine decides an action a of NPC#1 where it can be expected that NPC#1 will damage NPC#2 and finally reduce the hit points of NPC#2 to 0. As one example, if NPC#1 has sufficient hit points remaining but NPC#2 has very few hit points, the thought routine may decide an action a where NPC#1 may receive a certain amount of damage but rapidly causes damage to NPC#2. Also, if NPC#1 has few remaining hit points but NPC#2 has sufficient hit points, the thought routine may decide an action a where NPC#1 does not receive damage but causes some damage to NPC#2.

Thought routines that decide the action of an NPC have been designed in the past by extensive work by skilled technicians. It should be obvious that thought routines that randomly decide the action of an NPC may also exist. However, to construct a thought routine capable of realizing intelligent NPC behavior, it is necessary to analyze user operations and research optimal behavior in keeping with the environment. In addition, based on the results of such analysis and research, it is necessary to design conditions for deciding an optimal action of an NPC in keeping with the environment. This means that a lot of time and a great deal of effort have been necessary to construct a thought routine. In view of such situation, the present inventors developed an automated construction technique for a thought routine that does not rely on manual work.

2-1-2: Configuration of Thought Routine

Figure 35:
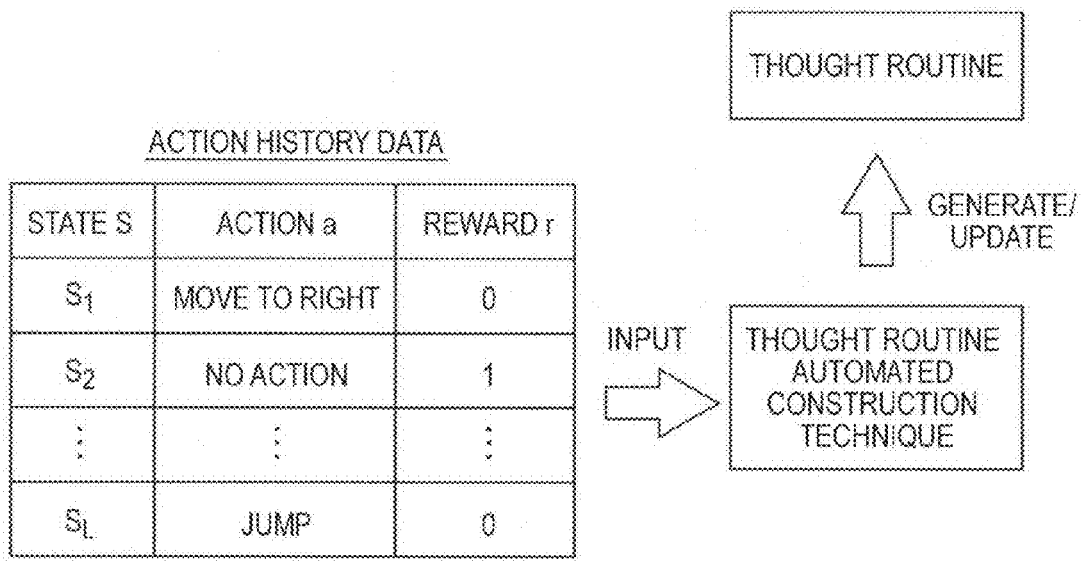
FIG. 35 is a diagram useful in explaining the configuration of a thought routine.

As shown in FIG. 35, a thought routine according to the present embodiment is generated by an automated construction technique for thought routines that is based on action history data. The action history data is composed of a state S, an action a, and a reward r. As one example, assume that if, in a state $S=S_1$, NPC#1 takes the action a="move to right", damage is received from NPC#2 and the hit points fall to 0. In this case, the action history data is state $S=S_1$, action a="move to right", and reward r="0". Action history data configured in this way is stored in advance and it is possible to automatically construct a thought routine through machine learning that uses this action history data as learning data.

Figure 36:
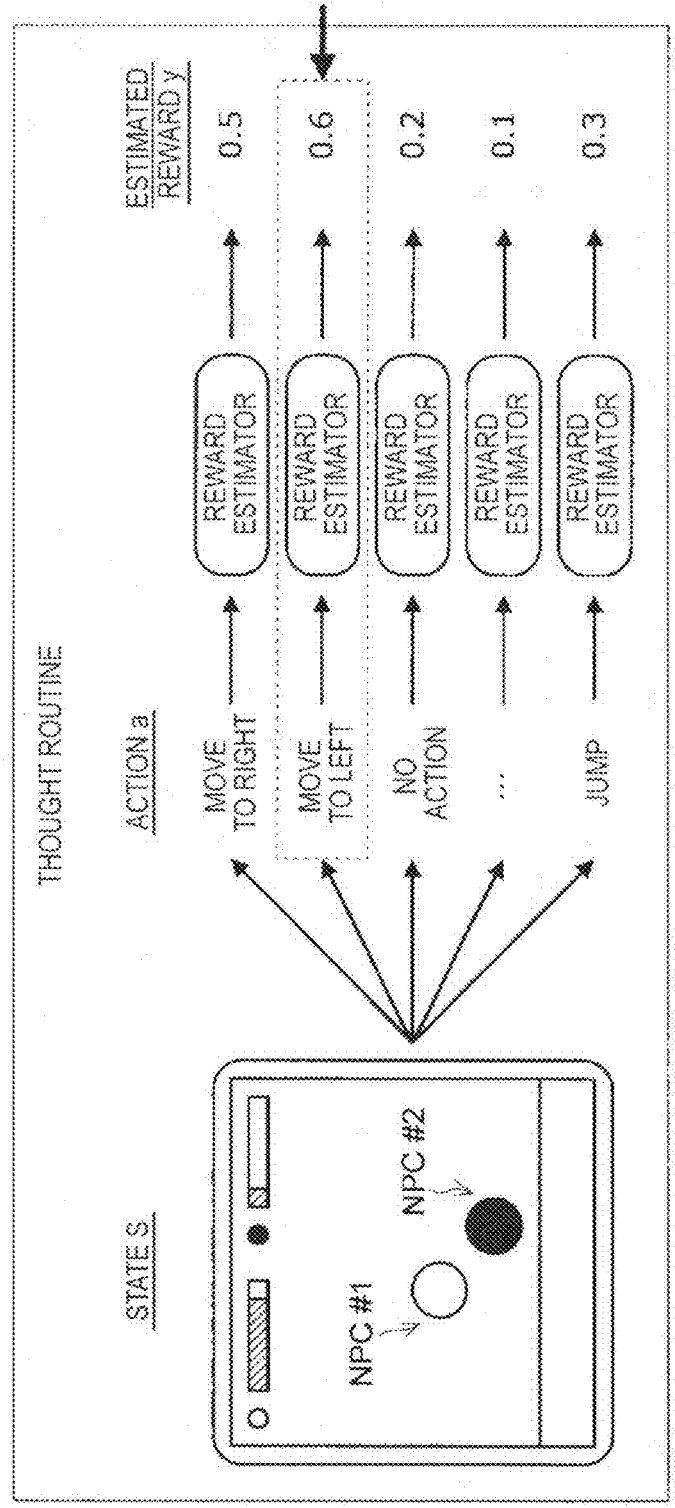
FIG. 36 is a diagram useful in explaining the configuration of a thought routine.

The thought routine according to the present embodiment has the configuration shown in FIG. 36. As shown in FIG. 36, the thought routine lists up actions a that can be taken by an NPC in response to input of a state S and calculates estimation values for the reward r (hereinafter "estimated rewards y") that may be obtained by the NPC for each action a. The thought routine then selects the action a where the estimated reward y is the highest. Note that the estimated rewards y are calculated using a reward estimator. Such reward estimator is an algorithm that outputs the estimated reward y in response to input of the state S and the action a. The reward estimator is automatically constructed through machine learning that uses the action history data as learning data. As one example, by applying the automated construction method for an estimator introduced earlier, it is possible to automatically construct the reward estimator.

Figure 37:
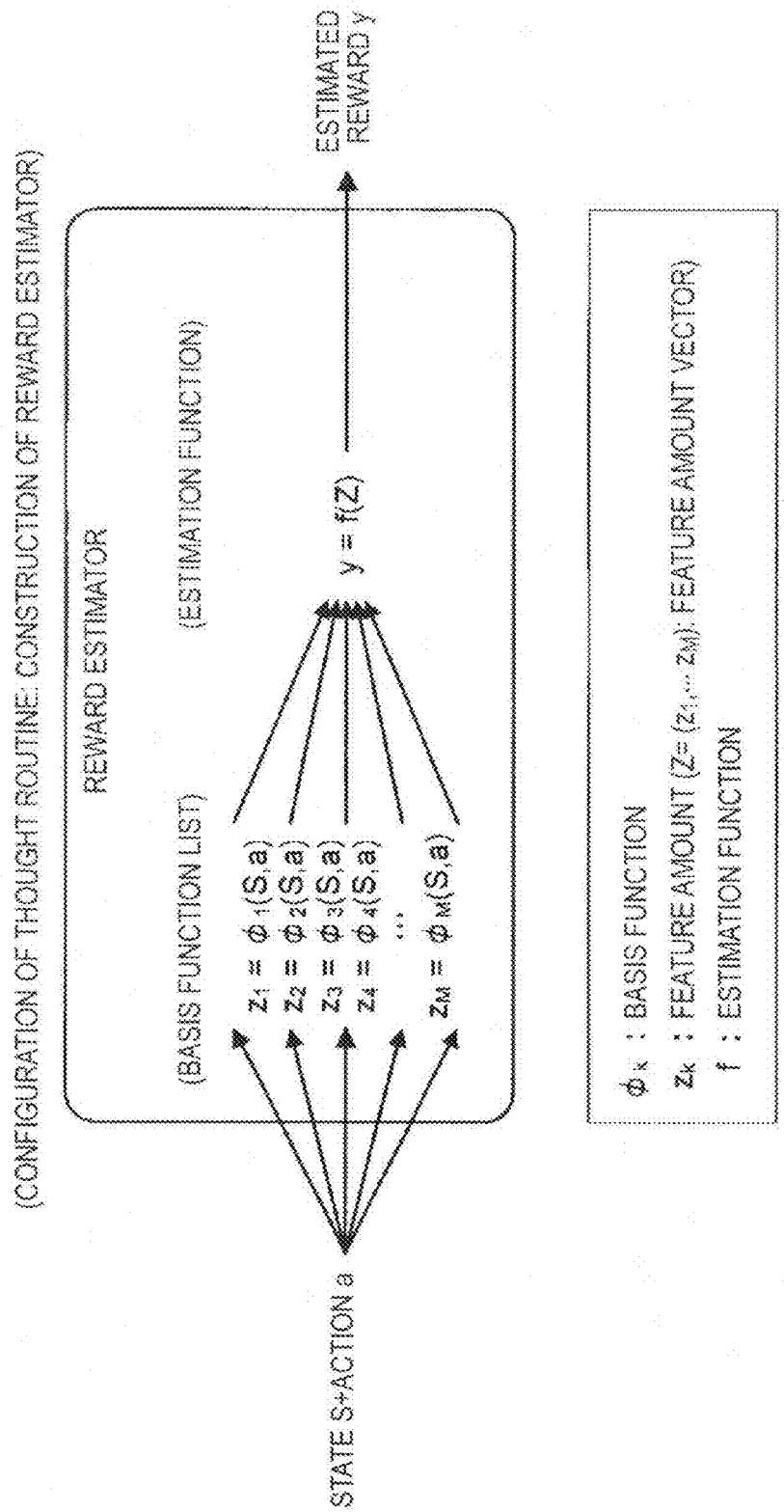
FIG. 37 is a diagram useful in explaining the configuration of a thought routine.

As shown in FIG. 37, the reward estimator is composed of a basis function list ($\phi_1, \ldots, \phi_M$) and the estimation function f. The basis function list ($\phi_1, \ldots, \phi_M$) includes M basis functions $\phi_k$ (where k=1 to M). Each basis function $\phi_k$ is a function that outputs a feature amount $z_k$ in response to the input of the input data X (the state S and the action a). In addition, the estimation function f is a function that outputs the estimated reward y in response to the feature amount vector $Z=(z_1, \ldots, z_M)$ including the M feature amounts $z_k$ (where k=1 to M) as elements. Each basis function $\phi_k$ is generated by combining one or a plurality of processing functions provided in advance. As the processing functions, as examples it is possible to use a trigonometric function, an exponential function, the four arithmetic operations, a digital filter, a differential operation, a median filter, a normalization operation, or the like.

The automated construction technique for a thought routine according to the present embodiment uses a thought routine that has been automatically constructed to cause an NPC to take an action and then updates such thought routine using action history data to which the action history data newly obtained as a result of such action has been added. Such action history data can be added using the technique relating to online learning introduced earlier.

2-1-3: Method of Constructing a Reward Estimator

Figure 38:
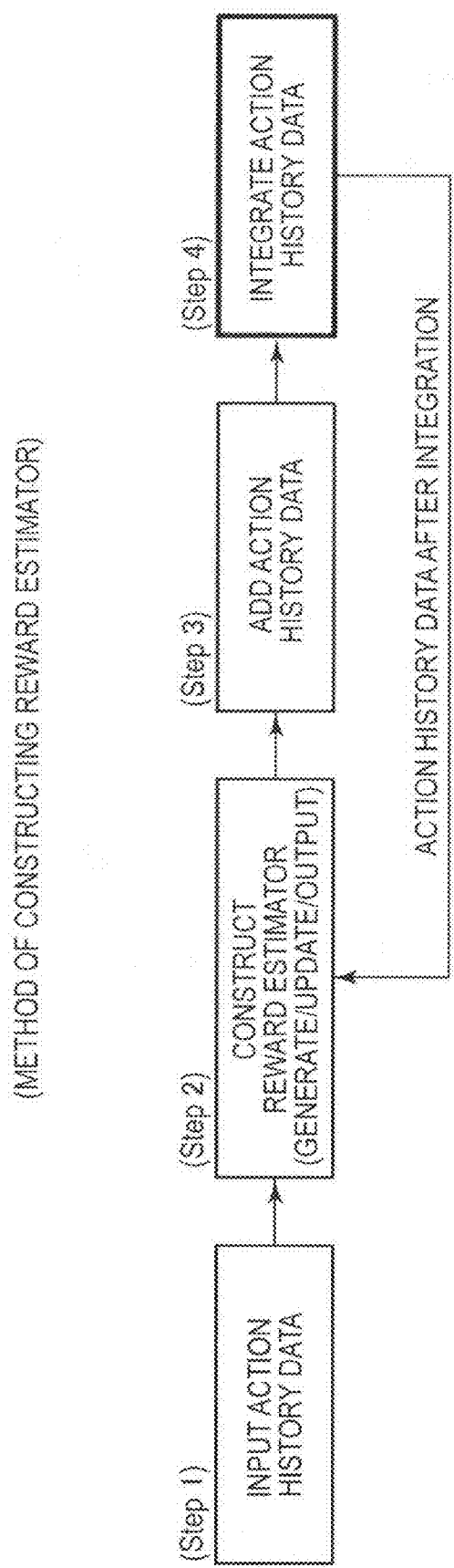
FIG. 38 is a diagram useful in explaining a method of constructing a thought routine.

As one example, the constructing and updating of a reward estimator using the technique relating to online learning are carried out according to the flow of processing shown in FIG. 38. Note that it is assumed that such processing is carried out by the information processing apparatus 10. As shown in FIG. 38, first the action history data is inputted into the information processing apparatus 10 (Step 1).

In Step 1, the information processing apparatus 10 uses a simple thought routine designed in advance to decide an action a, controls the behavior of the NPC in the environment, and thereby obtains the action history data (S, a, r). In the field of reinforcement learning, such simple thought routine is referred to as "Innate" (corresponding to instinctive behavior performed by a baby). Such Innate may select an action at random from actions that can be taken by an NPC. In such case, it is unnecessary to design Innate. The information processing apparatus 10 repeatedly has an action carried out by an NPC based on Innate until a specified number of sets of action history data are obtained. After this, the information processing apparatus 10 uses the inputted action history data to construct a reward estimator in the same way as the automated construction method for an estimator described earlier (Step 2).

Next, the information processing apparatus 10 acquires additional action history data at arbitrary or at specified timing (Step 3). The information processing apparatus 10 then integrates the action history data acquired in Step 3 into the action history data inputted in Step 1 (Step 4). When doing so, the information processing apparatus 10 executes a sampling process and/or a weighting process for the action history data to generate the action history data after integration. The information processing apparatus 10 then reconstructs the reward estimator using the action history data after integration (Step 2). The processing in Step 2 to Step 4 is repeatedly executed. The action history data is updated every time the processing is repeated.

This completes a brief description of the automated construction method for a thought routine. Here, although an automated construction method for a thought routine that decides the action of an NPC has been described, it is also possible to automatically construct various types of thought routines in the same way by changing the configuration of the action history data. That is, by applying the technology according to the present embodiment, it is possible to construct a variety of thought routines with a unified framework. Also, since a thought routine is automatically constructed, the construction of a thought routine does not take up someone's time, resulting in a large reduction in effort.

2-2: Configuration of Information Processing Apparatus 10

Figure 39:
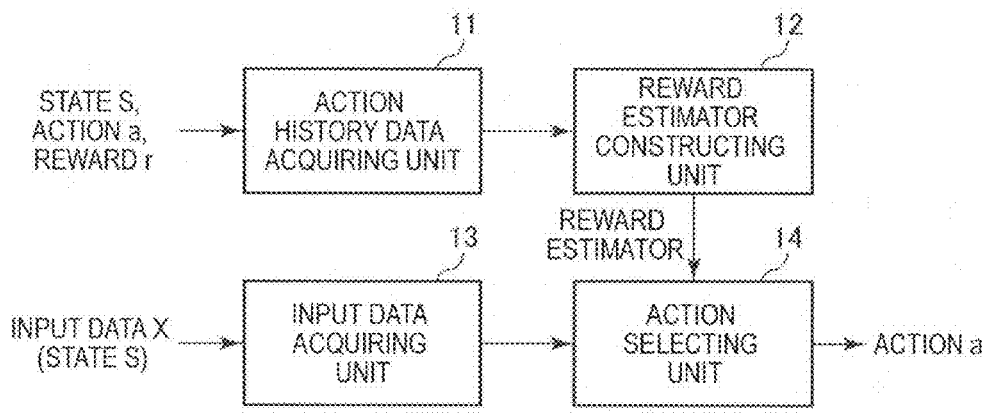
FIG. 39 is a diagram useful in explaining an example functional configuration of an information processing apparatus 10.
Figure 40:
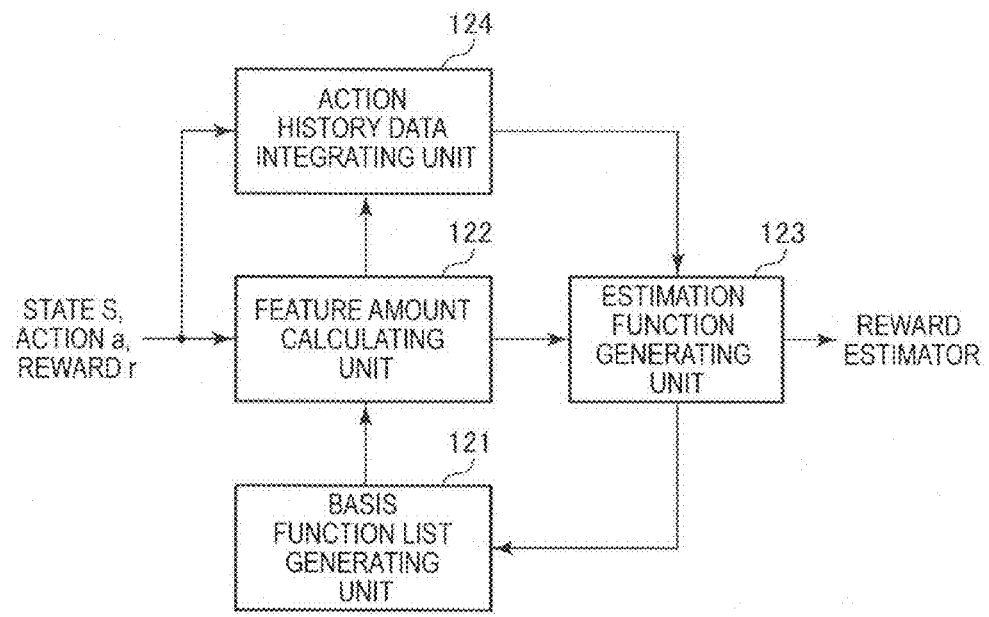
FIG. 40 is a diagram useful in explaining an example functional configuration of the information processing apparatus 10.

Here, the fundamental configuration of the information processing apparatus 10 according to the present embodiment will be described with reference to FIGS. 39 and 40. FIG. 39 is a diagram useful in showing the overall functional configuration of the information processing apparatus 10 according to the present embodiment. FIG. 40 is a diagram useful in showing the detailed functional configuration of a reward estimator constructing unit 12 that constructs the information processing apparatus 10 according to the present embodiment.

Overall Functional Configuration

First, the overall functional configuration will be described with reference to FIG. 39. As shown in FIG. 39, the information processing apparatus 10 mainly includes an action history data acquiring unit 11, the reward estimator constructing unit 12, an input data acquiring unit 13, and an action selecting unit 14.

When the construction process for a thought routine starts, the action history data acquiring unit 11 acquires the action history data to be used when constructing the reward estimator. As one example, the action history data acquiring unit 11 repeatedly causes an NPC to carry out an action based on a simple thought routine (Innate) to acquire a specified number of action history data. However, the action history data acquiring unit 11 may also read action history data stored in advance in a storage apparatus (not shown) or acquire action history data via a network from a system or the like that provides the action history data.

The action history data acquired by the action history data acquiring unit 11 is inputted into the reward estimator constructing unit 12. When the action history data is inputted, the reward estimator constructing unit 12 constructs a reward estimator through machine learning based on the inputted action history data. As one example, the reward estimator constructing unit 12 uses the automated construction method for an estimator based on a genetic algorithm described earlier to construct a reward estimator. Also, if additional action history data has been inputted from the action history data acquiring unit 11, the reward estimator constructing unit 12 integrates the action history data and constructs the reward estimator using the action history data after integration.

The reward estimator constructed by the reward estimator constructing unit 12 is inputted into the action selecting unit 14. The reward estimator is used to select an optimal action for arbitrary input data (the state S). When input data (the state S) has been acquired by the input data acquiring unit 13, the acquired input data is inputted into the action selecting unit 14. When the input data has been inputted, the action selecting unit 14 inputs the state S shown by the inputted input data and actions a that can be taken by the NPC in the state S into the reward estimator and selects an action a based on the estimated rewards y outputted from the reward estimator. As one example, as shown in FIG. 36, the action selecting unit 14 selects the action a where the estimated reward y is the highest.

This completes the description of the overall functional configuration of the information processing apparatus 10.

Functional Configuration of the Reward Estimator Constructing Unit 12

Next, the functional configuration of the reward estimator constructing unit 12 will be described in detail with reference to FIG. 40. As shown in FIG. 40, the reward estimator constructing unit 12 includes a basis function list generating unit 121, a feature amount calculating unit 122, an estimation function generating unit 123, and an action history data integrating unit 124.

When the thought routine construction process starts, first the basis function list generating unit 121 generates a basis function list. After this, the basis function list generated by the basis function list generating unit 121 is inputted into the feature amount calculating unit 122. Action history data is also inputted into the feature amount calculating unit 122. When the basis function list and the action history data have been inputted, the feature amount calculating unit 122 inputs the inputted action history data into the respective basis functions included in the basis function list to calculate feature amounts. Set of feature amounts (i.e., feature amount vectors) calculated by the feature amount calculating unit 122 are inputted into the estimation function generating unit 123.

When the feature amount vectors have been inputted, the estimation function generating unit 123 generates the estimation function by regressive/discriminative learning based on the inputted feature amount vectors and the reward values r that compose the action history data. Note that if a method of constructing an estimator based on a genetic algorithm is used, the estimation function generating unit 123 calculates a contribution ratio (evaluation value) of each basis function for the generated estimation function and determines, based on such contribution ratios, whether an end condition is satisfied. If the end condition is satisfied, the estimation function generating unit 123 outputs a reward estimator including the basis function list and the estimation function.

Meanwhile if the end condition is not satisfied, the estimation function generating unit 123 notifies the basis function list generating unit 121 of the contribution ratios of the respective basis functions for the generated estimation function. The basis function list generating unit 121 that has received such notification updates the basis function list according to the genetic algorithm based on the contribution ratios of the respective basis functions. When the basis function list has been updated, the basis function list generating unit 121 inputs the updated basis function list into the feature amount calculating unit 122. If an updated basis function list has been inputted, the feature amount calculating unit 122 calculates the feature amount vectors using the updated basis function list. The feature amount vectors calculated by the feature amount calculating unit 122 are then inputted into the estimation function generating unit 123.

As described above, when a method of constructing an estimator based on a genetic algorithm is used, the process of generating an estimation function by the estimation function generating unit 123, the updating process for the basis function list by the basis function list generating unit 121, and the calculating process for feature amount vectors by the feature amount calculating unit 122 are repeatedly executed until the end condition is satisfied. After this, if the end condition is satisfied, a reward estimator is outputted from the estimation function generating unit 123.

Also, if additional action history data is inputted, the inputted additional action history data is inputted into the feature amount calculating unit 122 and the action history data integrating unit 124. Once the additional action history data has been inputted, the feature amount calculating unit 122 inputs the additional action history data into the respective basis functions included in the basis function list to generate feature amounts. After this, the feature value vector(s) corresponding to the additional action history data and the feature value vectors corresponding to the existing action history data are inputted into the action history data integrating unit 124. Note that it is assumed that the existing action history data has also been inputted into the action history data integrating unit 124.

The action history data integrating unit 124 integrates the existing action history data and the additional action history data using an integration method for data sets introduced earlier. For example, the action history data integrating unit 124 samples the action history data and/or sets weightings for the action history data so that the distribution of the coordinates (feature amount coordinates) shown by the feature amount vectors in the feature amount space become a specified distribution. If the action history data has been sampled, the action history data after sampling is used as the action history data after integration. Meanwhile, if weightings have been set for the action history data, the weightings set for the respective action history data are taken into consideration during the regressive/discriminative learning by the estimation function generating unit 123.

Once the action history data has been integrated, the automated construction process for a reward estimator is carried out using the action history data after integration. More specifically, the integrated action history data and feature value vectors corresponding to the integrated action history data are inputted from the action history data integrating unit 124 into the estimation function generating unit 123 and an estimation function is generated by the estimation function generating unit 123. Also, if a method of constructing an estimator based on a genetic algorithm is used, processing such as the generation of the estimation function, the calculation of the contribution ratios, and the updating of the basis function list is executed using the integrated action history data.

This completes the detailed description of the functional configuration of the reward estimator constructing unit 12.

The configuration of the information processing apparatus 10 according to the present embodiment has been described above. By using the above configuration, it is possible to automatically construct a thought routine that decides, from an arbitrary state S, the next action a to be taken by an NPC. By using this thought routine, it is possible to make the NPC act intelligently. Note that by changing the action history data to be used, it is also possible to make an agent such as a robot act intelligently in the same way.

2-3: Method of Efficiently Constructing a Reward Estimator

An automated construction method for a thought routine based on the automated construction method for an estimator introduced earlier has been explained thus far. By using such method, it is possible to reliably and automatically construct a thought routine. However, to automatically construct a thought routine for an NPC that acts intelligently, it is necessary to spend a certain amount of time repeatedly executing the learning process. For this reason, the present inventors devised a more efficient method of constructing a high-performance reward estimator.

A method of efficiently constructing a reward estimator will now be described with reference to FIGS. 41 and 42. This method relates to a method that acquires action history data with higher learning efficiency. The expression "action history data with higher learning efficiency" here refers to data corresponding to feature amount coordinates with a higher estimated reward, with a larger estimation error, and that are located in a region with sparse density in the feature amount space. For this reason, the three scores shown in FIG. 42 are introduced. The first score is a reward score whose value increases as the estimated reward increases. The second score is an unknown score whose value is higher the more sparse the density in the feature amount space. The third score is an error score whose value increases as the estimation error increases.

For example, focus on the actions $a_1$, $a_2$, $a_3$ shown in FIG. 41. Suppose that the region surrounded by the broken line is a region where the estimation error is small. Assume also that the estimated reward increases toward the upper right in the drawing. In this case, the action $a_1$ can be said to be an action with a comparatively high reward score, a comparatively high unknown score, and a comparatively low error score. The action $a_2$ can be said to be an action with a comparatively low reward score, a comparatively low unknown score, and a comparatively high error score. The action $a_3$ can be said to be an action with a comparatively high reward score, a comparatively high unknown score, and a comparatively high error score.

By preferentially selecting an action with a higher reward score, it is possible to collect action history data that is necessary to realize a high reward. Similarly, by preferentially selecting an action with a higher unknown score or a higher error score, it is possible to collect action history data for which the result of selecting such action is indefinite. As one example, for the case shown in FIG. 41, it is believed that by selecting the action $a_3$, it is possible to collect action history data where obtaining a higher reward is likely and the result of selecting such action is indefinite. For the processing shown in FIG. 38, by acquiring the action history data according to the method described above in Step 1 and/or Step 3, it is possible to construct a reward estimator in Step 2 with higher efficiency.

This completes the description of an efficient method of constructing a reward estimator.

2-4: Modification 1. Thought Routine Using Action Score Estimator

Figure 44:
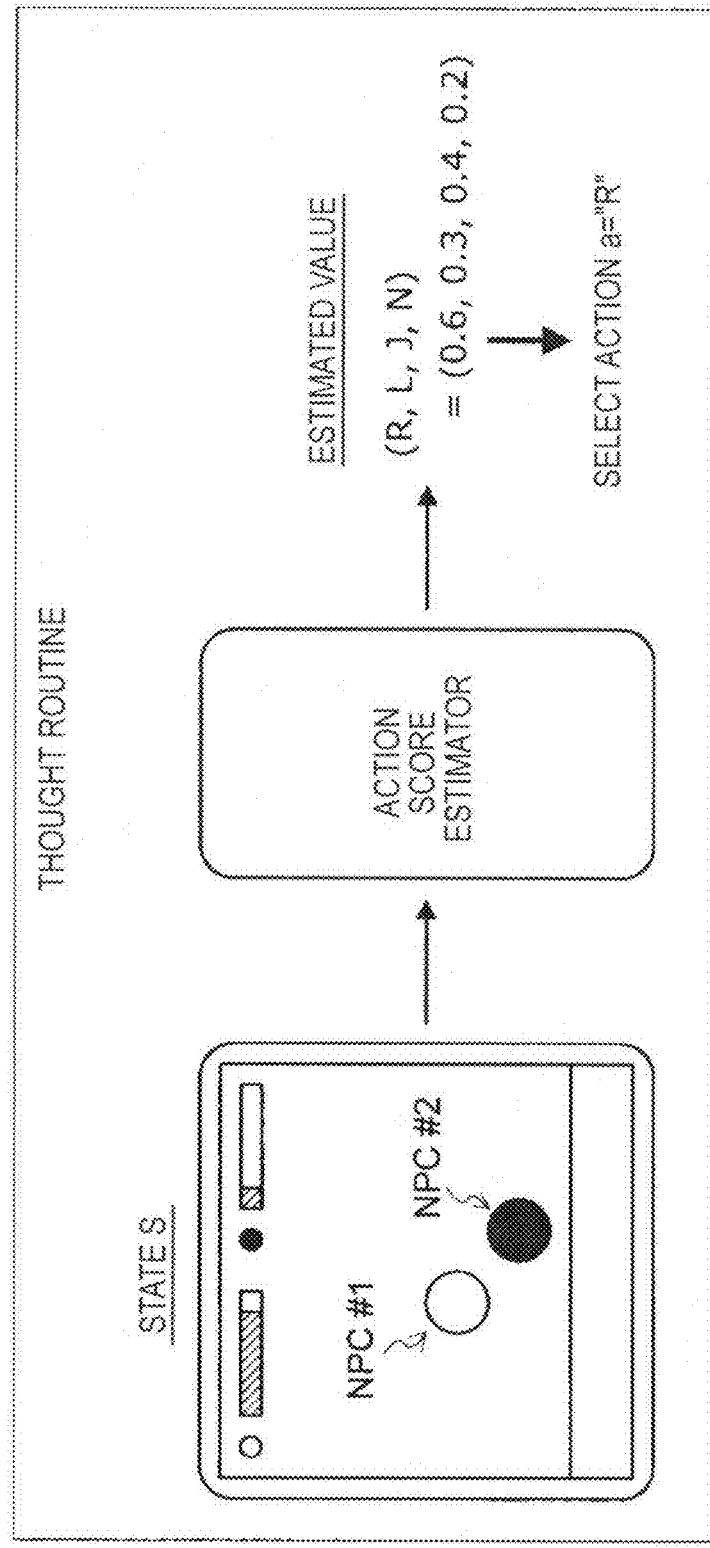
FIG. 44 is a diagram useful in explaining the configuration of a thought routine that uses an action score estimator.

The description above focuses on a thought routine that estimates rewards using a reward estimator and selects an action based on the estimated rewards. As shown in FIG. 44, let us now consider a thought routine that estimates action scores using an action score estimator and selects an action based on the estimated action scores. The expression "action score" here refers to a score associated with an action that can be taken and shows the probability of a favorable result being obtained when the corresponding action is taken.

Figure 43:
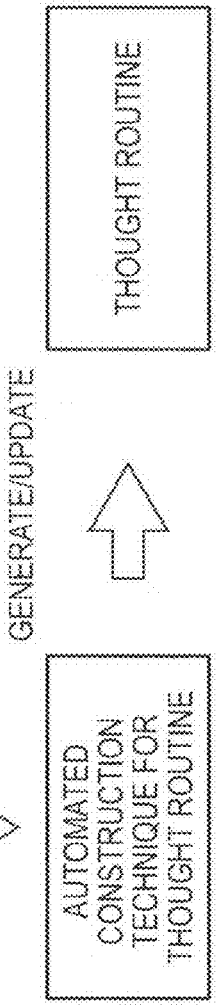
FIG. 43 is a diagram useful in explaining the configuration of a thought routine that uses an action score estimator.

When action scores are used, the action history data is provided in the form shown in FIG. 43. First, the information processing apparatus 10 collects sets of a state S, an action a, and a reward r in the same way as the action history data described earlier. After this, the information processing apparatus 10 calculates the action scores based on the rewards r.

For example, suppose that the reward r=0 is obtained if the action a="R (i.e., move to right)" is taken in the state S=$S_1$. In this case, the action score corresponding to the action a="R" is "0" and the action scores corresponding to other actions ("L", "N", "J") are "1". As a result, the action score (R, L, N, J)=(0, 1, 1, 1) is obtained corresponding to the state S=$S_1$ and the action a="R".

Suppose also that the reward r="1" is obtained if the action a="L (i.e., move to left)" is taken in the state S=$S_2$. In this case, the action score corresponding to the action a="L" is "1" and the action scores corresponding to other actions ("R", "N", "J") are "0". As a result, the action score (R, L, N, J)=(0, 1, 0, 0) is obtained corresponding to the state S=$S_2$ and the action a="L".

If the sets of a state S, an action a, and an action score obtained as described above are used as the action history data, an action score estimator that outputs estimated values of action scores in response to the inputting of a state S is obtained through machine learning. For example, if an automated construction method for an estimator based on a genetic algorithm is used, it is possible to automatically construct a high-performance action score estimator. When collecting the action history data, if the same method as the efficient method of constructing a reward estimator is used, it is possible to automatically construct an action score estimator efficiently.

If an action score estimator is used, the configuration of the thought routine is as shown in FIG. 44. That is, if the state S is inputted into the thought routine, the thought routine inputs the state S into the action score estimator to calculate estimated values of the action scores. The thought routine then selects the action for which the estimated value of the action score is the highest. For example, as shown in FIG. 44, if the estimated value of the action score is (R, L, J, N)=(0.6, 0.3, 0.4, 0.2), the thought routine selects the action "R" corresponding to the estimated value "0.6".

This completes the description of a thought routine that uses an action score estimator.

2-5: Modification 2. Estimation of Rewards using a Predictor

Next, a method of estimating rewards using a predictor will be described. Note that the expression "predictor" here refers to an algorithm that outputs a state ($t_2$) at a following time $t_2$ when a state $S(t_1)$ at a given time $t_1$ and an action $a(t_1)$ taken by an NPC in such state $S(t_1)$ have been inputted.

2-5-1: Method of Constructing a Predictor

Figures 45, 46:
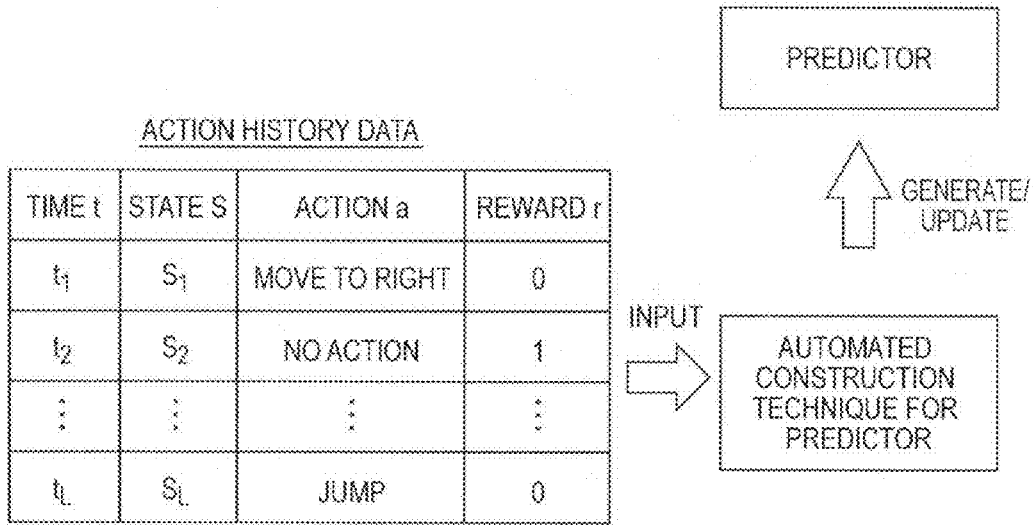
FIG. 45 is a diagram useful in explaining a method of estimating a reward using a predictor.
FIG. 46 is a diagram useful in explaining a method of estimating a reward using a predictor.

The predictor described above is constructed by a method such as that shown in FIG. 45. As shown in FIG. 45, action history data acquired at different points in time is used as the learning data. As one example, if a favorable result is obtained if no action is taken by the NPC in a state $S_2$ at time $t_2$, the action history data is time t=$t_2$, state S=$S_2$, action a="no action", and reward r="1". Note that an automated construction method for a predictor is described in detail in the specification of Japanese Laid-Open Patent Publication No. 2009-277084. Such specification describes a method of automatically constructing, through machine learning, a predictor that predicts observed values at a future point in time from observed values up to a certain point in time.

2-5-2: Method of Estimating Rewards

Figure 47:
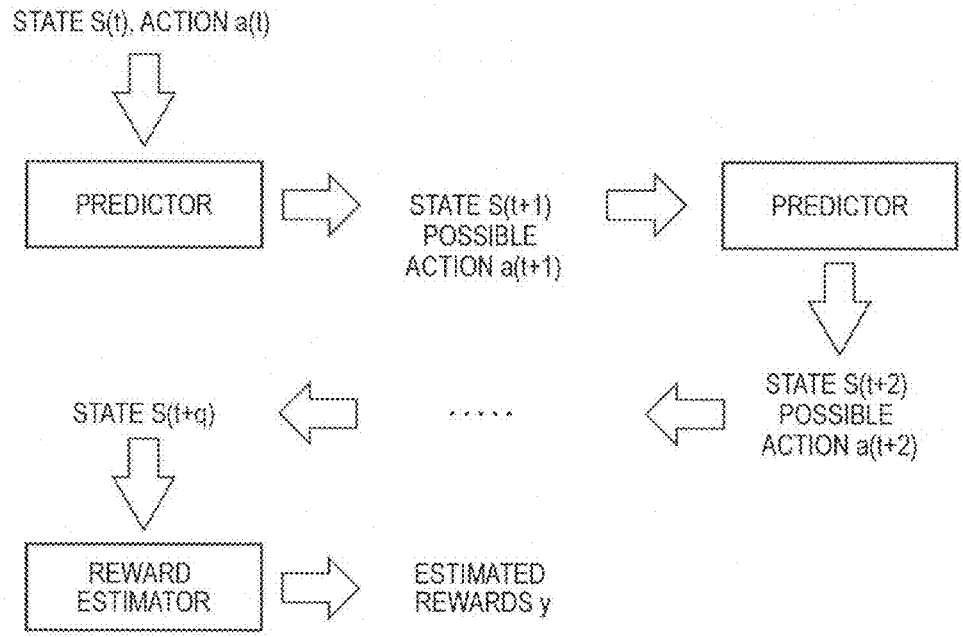
FIG. 47 is a diagram useful in explaining a method of estimating a reward using a predictor.

If the predictor described above is used, as shown in FIG. 46, it is possible to estimate rewards that are likely to be obtained in the future. As one example, it is possible to predict the state S(t+1) realized at the time t+1 if the NPC takes an action a(t) in a state S(t) at time t and to calculate the estimated rewards y of respective actions that can be taken by the NPC in such state S(t+1). This means that it is possible to select an action to be taken by the NPC at the time t based on the rewards estimated for the time t+1. As shown in FIG. 47, by repeatedly using the predictor, it is also possible to calculate the estimated rewards y estimated from a state S(t+q) that is several steps ahead. In this case, it is possible to consider a combination of actions that can be taken by the NPC at respective points in time and to select the combination of actions for which the highest estimated reward is ultimately obtained.

This completes the description of a method of estimating rewards using a predictor.

2-6: Modification 3. Simultaneous Learning for a Plurality of Agents

A method of constructing a thought routine that focuses on a single NPC and selects an optimal action has been described thus far. However, it is also possible to construct a thought routine that simultaneously considers actions taken by two or more NPCs. If two NPCs take actions in the same environment, the actions taken by both NPCs are reflected in the state S. For this reason, if this method is used, it is possible to automatically construct a thought routine that selects an action expected to result in the highest estimated reward for a present NPC in an environment where another NPC takes an action expected to result in the highest estimated reward for such NPC. The automated construction of such a thought routine is realized using Min-maxing, for example. This completes the description of simultaneous learning for a plurality of agents.

This also completes the description of the embodiment of the present disclosure.

3: Applications

Methods of specifically applying the technology of the embodiment described above will now be introduced.

3-1: Application to Tic-Tac-Toe

Figure 48:
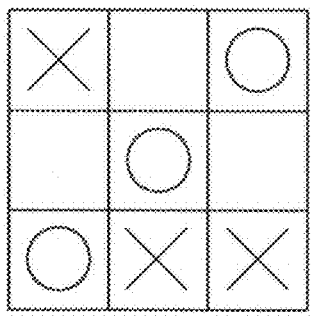
FIG. 48 is a diagram useful in explaining an application to tic-tac-toe.

First, a method of applying the technology of the embodiment described above to tic-tac-toe will be described with reference to FIGS. 48 to 54. As shown in FIG. 48, the main rules of tic-tac-toe are that the players take alternate turns and that the first player to place three marks in a row wins. For tic-tac-toe, the state S is the current state of the board and an action a is a move taken by a player.

For tic-tac-toe, it is known that optimal moves by both players will result in a draw. Many thought routines used for this type of perfect information game are composed of a static evaluation function and a look-ahead algorithm. The static evaluation function is a function that quantifies whether a given game phase is advantageous or disadvantageous. For example, when the game phases shown in FIG. 49 are provided, the static evaluation function outputs the value y (where "disadvantageous for ○": −1, "neutral": 0, "advantageous for ○": 1) showing whether such game phases are advantageous or disadvantageous. With the embodiment described above, the function of the static evaluation function is realized by a reward estimator.

A look-ahead algorithm is an algorithm that looks ahead to future moves and selects a move for which a higher output value will be obtained from the static evaluation function in the future. As one example, the look-ahead algorithm is realized using Min-maxing. As one example, as shown in FIG. 50, the look-ahead algorithm imagines the moves that can be taken by the opponent after the present player has taken a move, imagines the moves that the present player can then take in response to the imagined moves of the opponent, and selects the most advantageous move for the present player.

However, static evaluation functions such as those described above have hitherto been designed manually. For example, even with Bonanza, a famous shogi AI program, design elements, such as the features of game phases considered by a static evaluation function, were manually designed. Also, if the type of game is changed, it becomes necessary to also change the design of the feature amounts. For this reason, it has been necessary to manually design a static evaluation function for each game through repeated trial and error. However, by applying the technology according to the above embodiment, it is possible to automatically construct a thought routine while omitting such manual design work.

Figure 51:
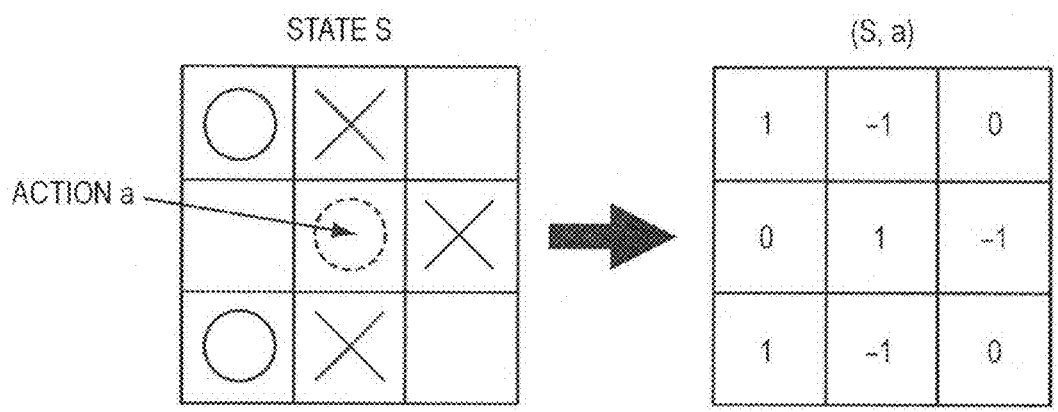
FIG. 51 is a diagram useful in explaining an application to tic-tac-toe.

In the case of tic-tac-toe, as shown in FIG. 51, the state S and the action a can be expressed by a 3×3 matrix. Here, the state S expresses the board when it has become the present player's turn. A board that reflects the present player's current move is expressed as (S, a). In addition, the present player's moves are expressed as "1", the opponent's moves are expressed as "−1", and empty spaces are expressed as "0". That is, the board and moves are represented by values. If it is possible to express the board and moves with values in this way, it will be possible to automatically construct a thought routine using the automated construction method for a reward estimator according to the above embodiment.

Figure 52:
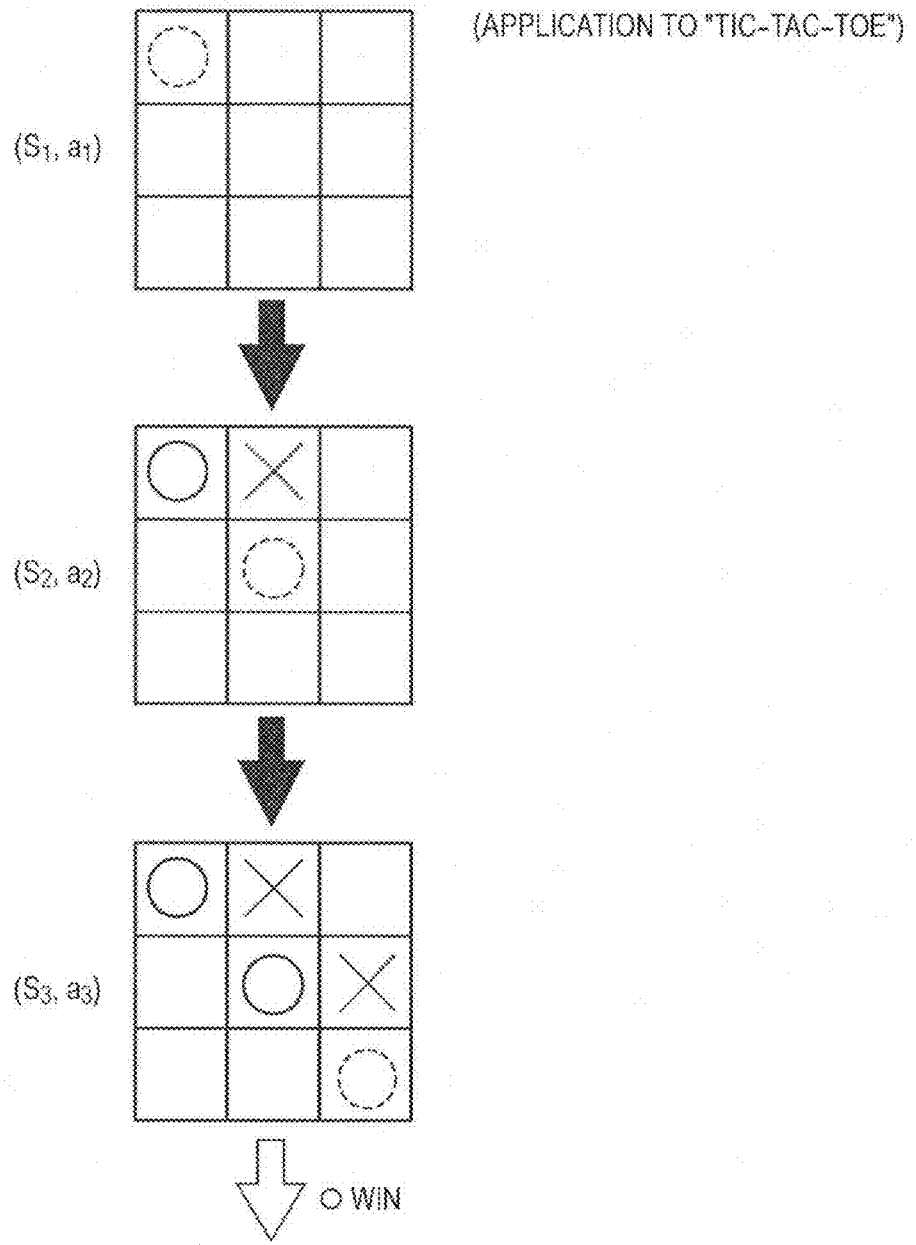
FIG. 52 is a diagram useful in explaining an application to tic-tac-toe.
Figure 53:
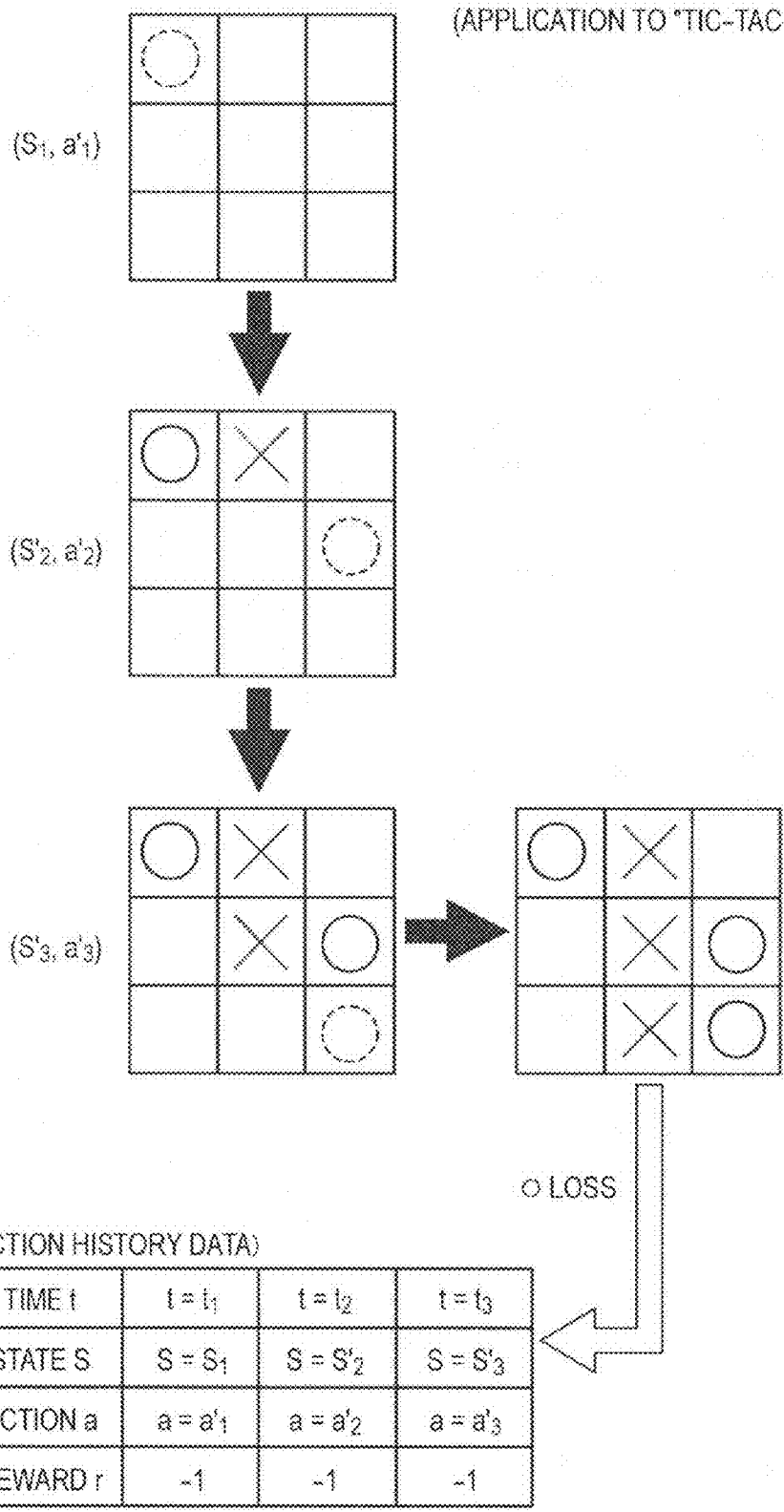
FIG. 53 is a diagram useful in explaining an application to tic-tac-toe.

For example, the information processing apparatus 10 first uses Innate to perform moves by the present player and the opponent at random positions to generate action history data. As described above, (S, a) is expressed by a 3×3 matrix. As shown in FIG. 52, the information processing apparatus 10 assigns the reward "1" to (S, a) corresponding to all of the moves that lead to a win. Meanwhile, as shown in FIG. 53, the information processing apparatus 10 assigns the reward "−1" to (S, a) corresponding to all of the moves that lead to a loss. Once action history data has been accumulated in this way, the information processing apparatus 10 constructs a reward estimator using the accumulated action history data.

Figure 54:
FIG. 54 is a diagram useful in explaining an application to tic-tac-toe.

When selecting an actual move, as shown in FIG. 54 the information processing apparatus 10 uses a reward estimator to calculate the estimated rewards y from the present state S and selects the move with the highest estimated reward y. In the example in FIG. 54, the move (C) corresponding to the highest estimated reward is selected. Note that although the move is selected in the example in FIG. 54 by evaluating the reward one step ahead, it is also possible to use a configuration where estimated rewards are calculated in the same way for the opponent and a method such as Min-maxing is used to select the present move using the results of looking several moves ahead.

Also, if a configuration that normally selects an optimal action using a reward estimator obtained by learning is used, there can be the problem that an NPC selects the same move every time. For this reason, some randomness may be added to the process of calculating the estimated rewards. For example, it would be conceivable to use a method that adds a small random number to the estimated rewards calculated by a reward estimator. Also, if a reward estimator is calculated by machine learning based on a genetic algorithm, it would be possible to use a configuration where a reward estimator calculated for each learning generation is stored and the reward estimator to be used is switched randomly.

This completes the description of the application to tic-tac-toe.

3-2: Application to Fighting Game

Next, a method of applying the technology according to the above embodiment to a fighting game will be described with reference to FIGS. 55 to 62. As shown in FIG. 55, the main rules of the fighting game considered here are (1) the game is a fight between two characters, (2) the actions of the respective players are a combination of "move to left", "move to right", "no left/right movement", "jump", and "no jump", and (3) if the player tramples on the opponent, damage to the opponent is caused in keeping with the difference in acceleration in the Y axis direction. Also, a player loses when his/her hit points reach 0. Note that in this application to a fighting game, the method of constructing a thought routine using an action score estimator described earlier is used.

In this case, the absolute coordinates of the present player, the absolute coordinates of the opponent, and the time are used as the state S. For this reason, the state S is expressed by a three-dimensional matrix such as that shown in FIG. 56. Here, consider an automated construction method for an action score estimator that estimates an action score that has five elements (N, L, R, J, NJ) in response to input of a state S expressed by a three-dimensional matrix. Here, the element N is the action score corresponding to the action a="(no left/ right movement)". The element L is the action score corresponding to the action a="(move to left)". The element R is the action score corresponding to the action a="(move to right)". The element J is the action score corresponding to the action a="(jump)". The element NJ is the action score corresponding to the action a="(no jump)".

As Innate for collecting the action history data, as one example a method that selects a player's moves completely randomly is used. As one example, such Innate randomly selects one action out of N (no left/right movement), L (move to left), and R (move to right) and randomly selects an action to be combined with the selected action out of J (jump) and NJ (no jump). Also, as shown in FIG. 57, when the player causes damage to the opponent, the information processing apparatus 10 sets the reward of the action history data from the time at which the player or the opponent previously received damage to the present time at 1. Meanwhile, if the player has received damage, as shown in FIG. 57, the information processing apparatus 10 sets the reward of the action history data from the time at which the player or the opponent previously received damage to the present time at 0.

Note that for the action history data where the reward is set at 1, the information processing apparatus 10 sets the action score of the action that was actually carried out at 1 and the action scores of actions that were not carried out at 0. Meanwhile, for the action history data where the reward is set at 0, the information processing apparatus 10 sets the action score of the action that was actually carried out at 0 and the action scores of actions that were not carried out at 1. By repeating such processing, action history data such as that shown in FIG. 57 composed of a state S and action scores is obtained.

Figure 58:
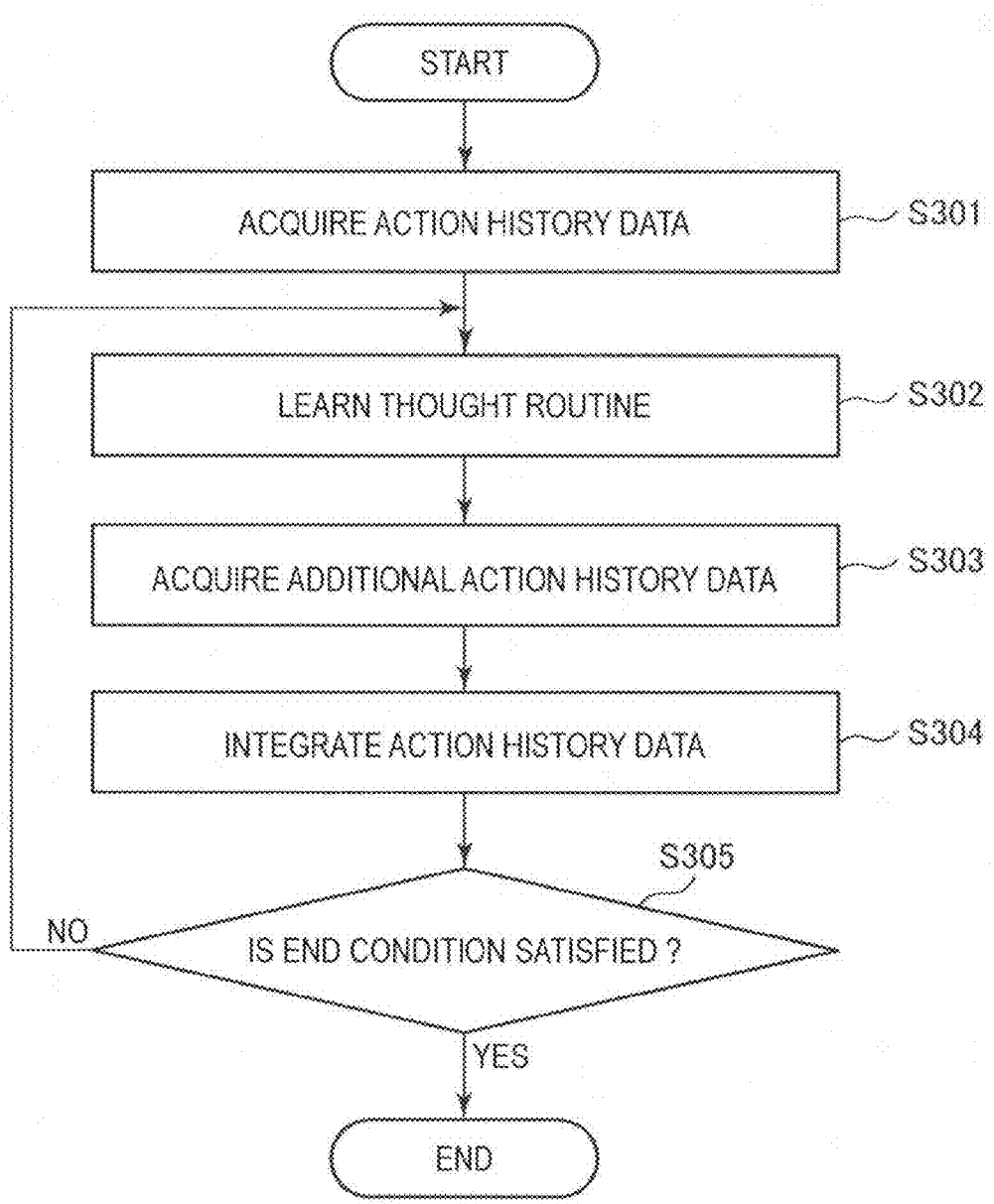
FIG. 58 is a diagram useful in explaining an application to a fighting game.

Once the action history data has been obtained, the information processing apparatus 10 constructs the thought routine according to the flow of processing shown in FIG. 58. As shown in FIG. 58, once the action history data has been obtained (S301), the information processing apparatus 10 constructs a thought routine through machine learning using the acquired action history data (S302). Next, the information processing apparatus 10 acquires additional action history data as necessary (S303). After this, the information processing apparatus 10 integrates the added action history data into the original action history data (S304). The information processing apparatus 10 then determines whether an end condition is satisfied (S305).

As examples, when an end operation has been carried out by the user or when the win ratio over a player who acts randomly has exceeded a specified threshold, the information processing apparatus 10 determines that the end condition is satisfied. If the end condition is not satisfied, the information processing apparatus 10 returns to step S302. Meanwhile, if the end condition is satisfied, the information processing apparatus 10 ends the series of processes relating to the construction of a thought routine.

Figure 59:
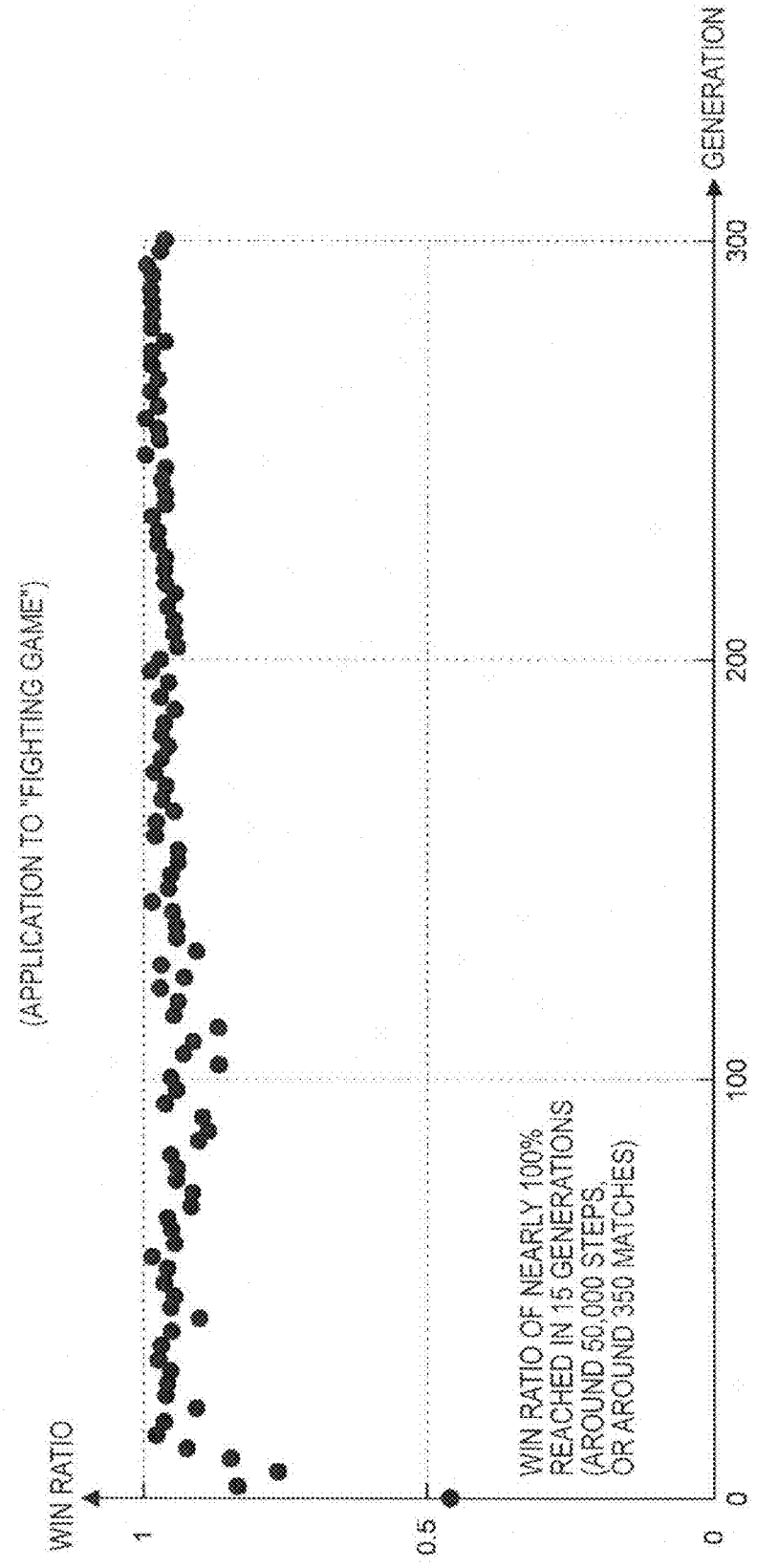
FIG. 59 is a diagram useful in explaining an application to a fighting game.

The results shown in FIG. 59 were obtained for the win ratio against a player who acts randomly and result from the player acting according to the thought routine that has been automatically constructed as described above. As shown in FIG. 59, the win ratio of a player who acts using the thought routine reached a value close to 100% in 15 generations (i.e., the number of iterations of step S302 to S304 in FIG. 58 was 15). Note that the selection of an action was carried out according to a method of selecting the action with the highest action score. However, when selecting an action in this example, the action was selected after adding a small random number to each action score.

Figure 60:
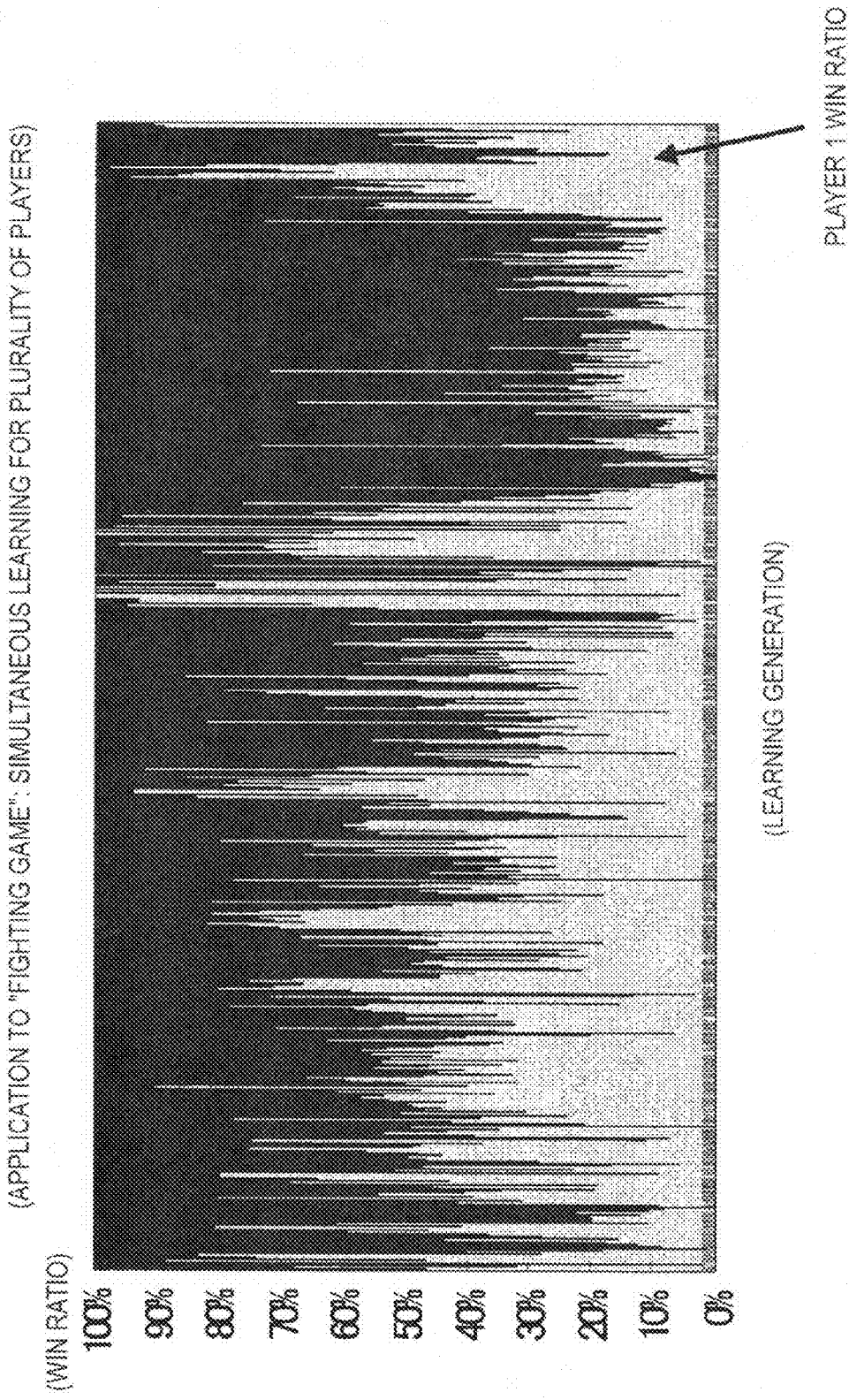
FIG. 60 is a diagram useful in explaining an application to a fighting game.

Also, a thought routine was constructed by simultaneously learning the actions of the two players using the simultaneous learning of a plurality of agents described earlier. Since a thought routine that attempts to win against a player who is not moving randomly is automatically constructed when simultaneous learning of a plurality of agents is used, a thought routine that moves a player more intelligently is constructed. Note that the results of fights between two players who both move using a thought routine are shown in FIG. 60. As shown in FIG. 60, depending on the learning generation, there are cases where player 1 wins most of the time and cases where player 2 wins most of the time.

Figures 61, 62:
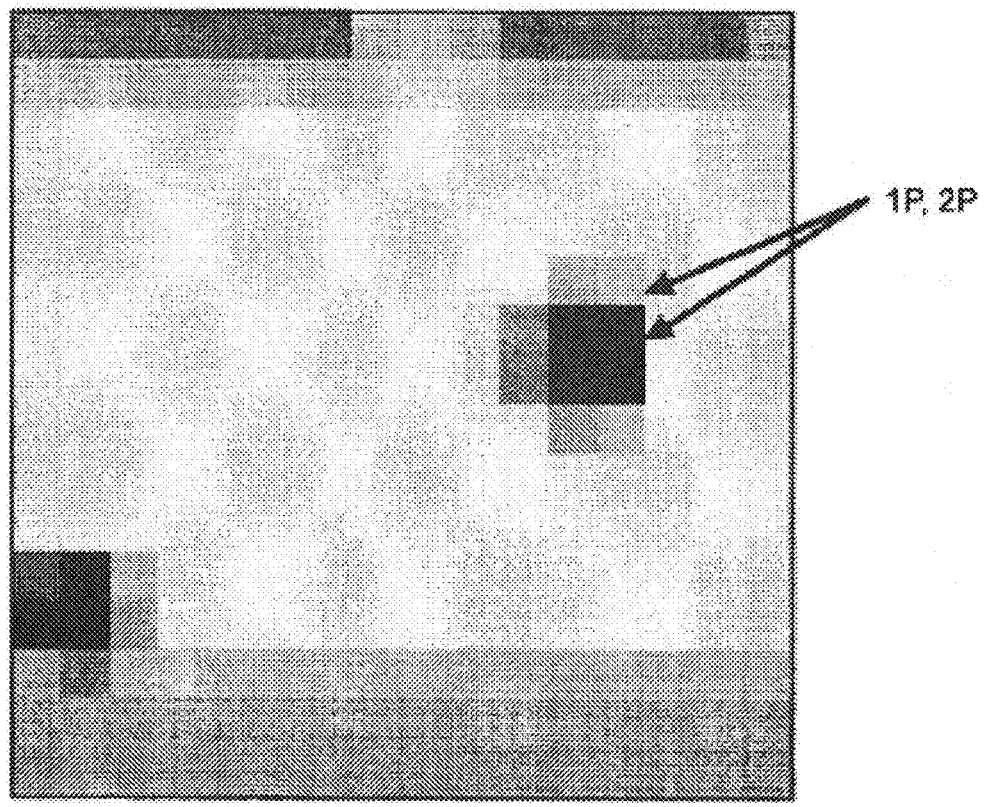
FIG. 61 is a diagram useful in explaining an application to a fighting game.
FIG. 62 is a diagram useful in explaining an application to a fighting game.

As shown in FIG. 61, the result of experimentally having 1,000 fights carried out for a given learning generation was that that player 1 won most of the time (i.e., had a high win ratio). Here, when the opponent was a player who moves randomly (i.e., a random opponent), both player 1 and player 2 achieved a win ratio of at least 90% against their opponent. That is, a player who moves according to the thought routine moves sufficiently intelligently. In this way, when simultaneous learning of a plurality of agents is used, while the thought routine is being improved so as to beat the opponent, a versatile algorithm capable of also beating an opponent who moves randomly is obtained.

However, although a three-dimensional matrix expressing the present player's coordinates, the opponent's coordinates, and the time is used in the above description as the state S, a method that uses image information of a game screen as it is in place of such three-dimensional matrix is also conceivable. For example, as the state S, it is also possible to use a luminance image of a game screen such as that shown in FIG. 62. That is, the state S may be anything that includes useful information for deciding an action. Based on this notion, it should be possible to easily imagine applying the technology according to the above embodiment to an automated construction method of a thought routine relating to a variety of games and tasks.

This completes the description of the application to a fighting game.

3-3: Application to "Connect Five" Game

Figure 63:
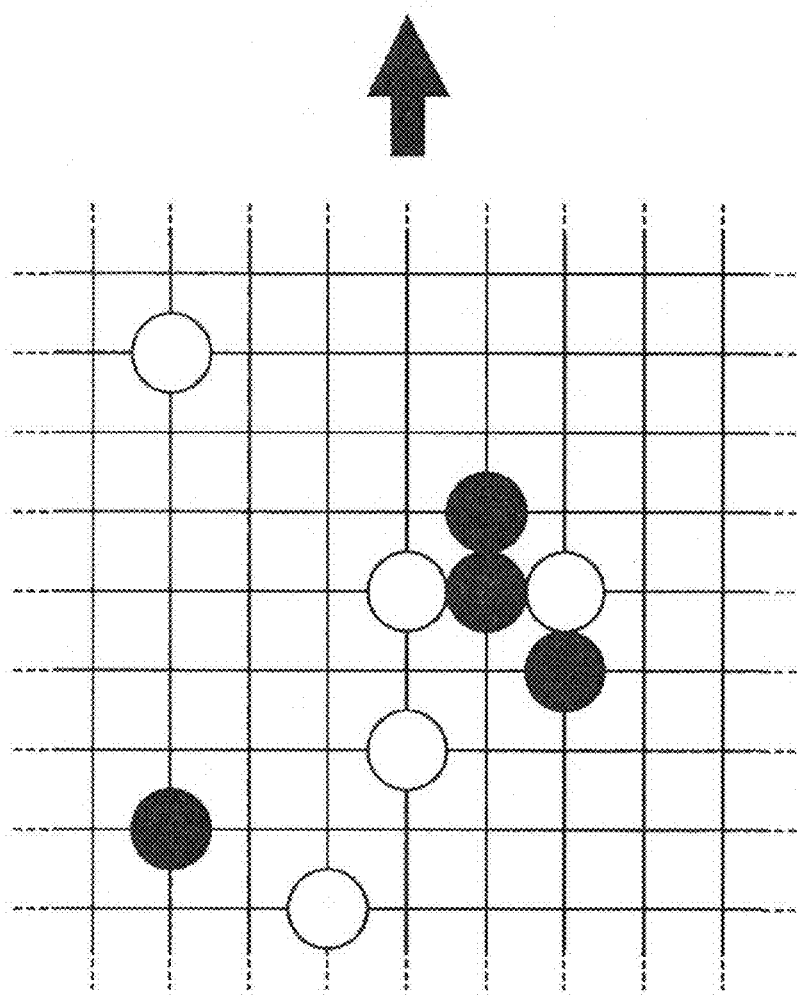
FIG. 63 is a diagram useful in explaining an application to a "connect five" game.
Figure 64:
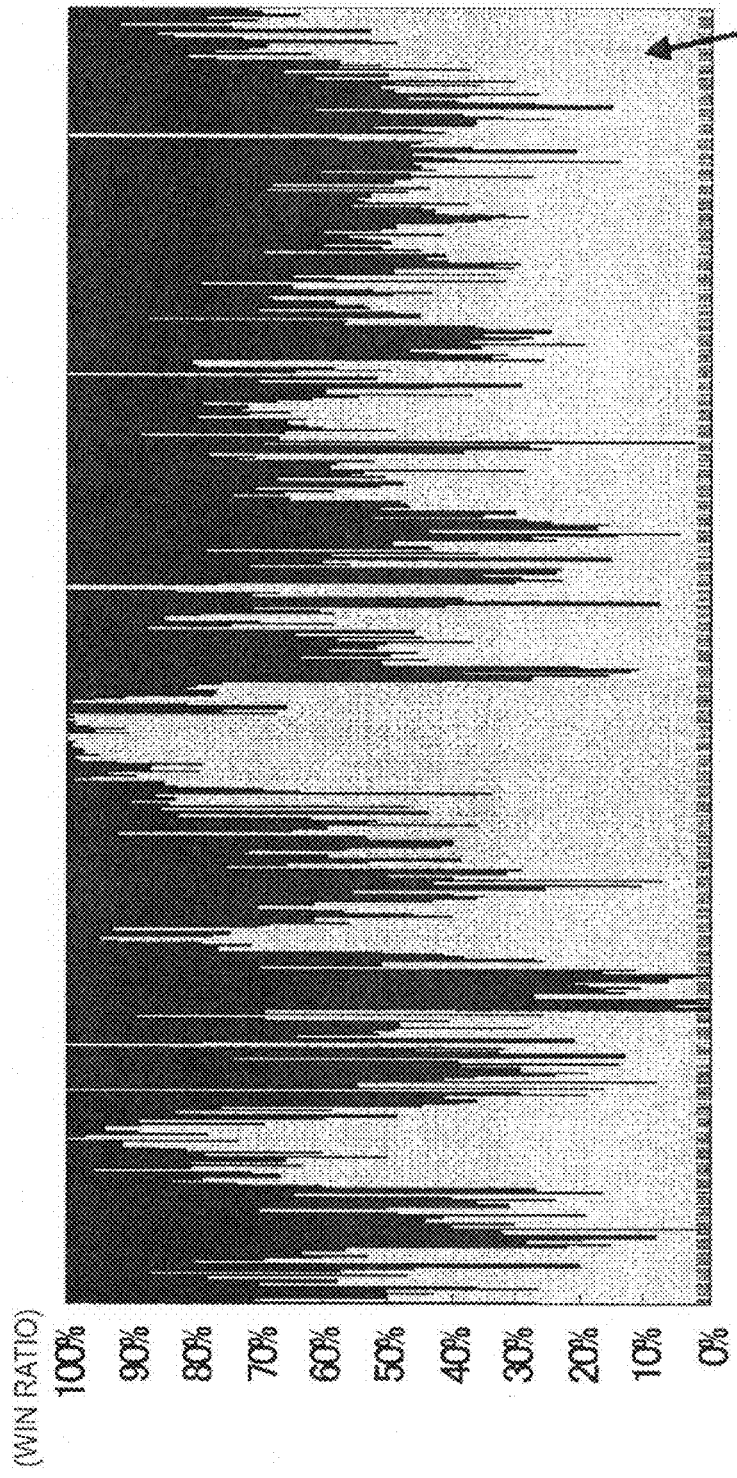
FIG. 64 is a diagram useful in explaining an application to a "connect five" game.

Next, a method of applying the technology according to the above embodiment to a "connect five" game will be described with reference to FIGS. 63 and 64. The main rules of connect five are that the players take alternate turns and that the first player to place five stones in a row vertically, horizontally, or diagonally wins. For connect five, the state S is the board and an action a is a move taken by a player.

The method of applying the technology to connect five is fundamentally the same as the method of applying the technology to tic-tac-toe. That is, as shown in FIG. 63, the state S and the action a are expressed by a two-dimensional matrix. The action history data used first is acquired using Innate that places stones completely randomly. The reward 1 is set for all (S, a) that ultimately lead to a win and the reward 0 is set for all (S, a) that ultimately lead to a loss. The information processing apparatus 10 constructs a thought routine using such action history data. The information processing apparatus 10 also plays a match using such thought routine and constructs a thought routine using action history data in which the result of such match has been integrated. By repeating such processing, a thought routine that selects intelligent actions is constructed.

When selecting an action, the information processing apparatus 10 finds the estimated rewards for all possible actions (i.e., for cases where stones have been placed on all of the available points) in the same way as with tic-tac-toe, and places a stone on the point with the highest estimated reward. It should be obvious that the information processing apparatus 10 may be configured so as to look several moves ahead when selecting the position where a stone is to be placed. Note that the number of board permutations for connect five is huge compared to tic-tac-toe. For this reason, a player who places stones randomly is likely to make very bad moves and is therefore extremely weak.

Accordingly, carrying out learning with a player who places stones randomly as an opponent may only produce a thought routine capable of beating extremely weak opponents and is unlikely to result in an intelligent thought routine. For this reason, in the same way as a fighting game, it is preferable to use a method that carries out simultaneous learning for a plurality of agents to learn about both the player and the opponent in the same environment. By using this configuration, it is possible to automatically construct a comparatively high-performance thought routine. The results of matches between players who both move using thought routines are shown in FIG. 64.

This completes the description of the application to connect five.

3-4: Application to Poker

Figure 65:
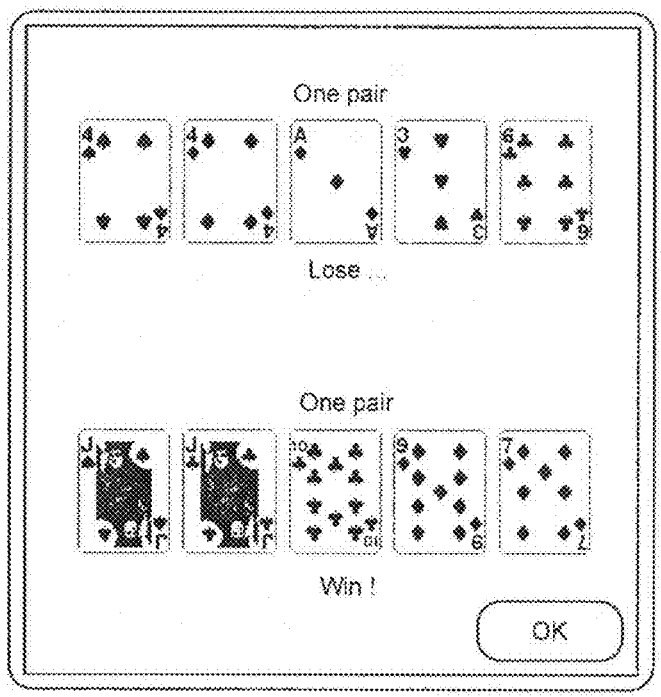
FIG. 65 is a diagram useful in explaining an application to poker.

Next, a method of applying the technology according to the above embodiment to poker will be described with reference to FIGS. 65 to 67. As shown in FIG. 65, the main rules of poker are (1) players are dealt five cards, (2) each player selects cards to discard, and (3) the strongest hand wins. Here, let us consider a method of constructing a thought routine that decides the cards to be discarded after the cards have been dealt.

Figure 66:
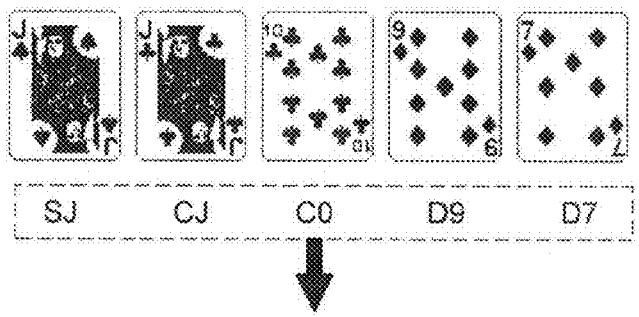
FIG. 66 is a diagram useful in explaining an application to poker.

As shown in FIG. 66, the state S and the action a are expressed using character strings. As examples, the ace of hearts is expressed as "HA", the two of clubs as "C2" and the king of diamonds as "DK". In the example shown in FIG. 66, the state S is expressed by the character string "SJCJC0D9D7". If the nine of diamonds and the seven of diamonds are discarded, the action a is expressed by the character string "D9D7". Also, the reward "1" is assigned if the game is won and the reward "0" is assigned if the game is lost. When cards are expressed in this way, action history data such as that shown in FIG. 67 is obtained for example.

As Innate that first acquires the action history data, as one example it is possible to use a method that decides whether to discard the five card(s) individually in a completely random manner. Also, the information processing apparatus 10 sets the reward "1" for action history data for a win and the reward "0" for action history data for a loss. The information processing apparatus 10 then uses the accumulated action history data to construct a thought routine. At this time, information such as the result of selecting an action, what kind of hand was ultimately produced, and the opponent's hand is not used. That is, the thought routine is constructed with consideration only to whether the game was ultimately won or lost. Here, there is a tendency whereby the more advantageously cards were kept or discarded in the action history data for the creation of a strong hand for the current player, the higher the probability that the reward of such action history data will be "1".

When an action is selected, the selection options of "keep" or "discard" are given for each of the five dealt cards. This means that there are a total of $2^5=32$ different combinations for the action. Accordingly, the thought routine uses a reward estimator to calculate the estimated rewards for 32 (S, a) patterns and selects the action with the highest estimated reward.

This completes the description of the application to poker.

3-5 Application to Role-Playing Game

Figure 68:
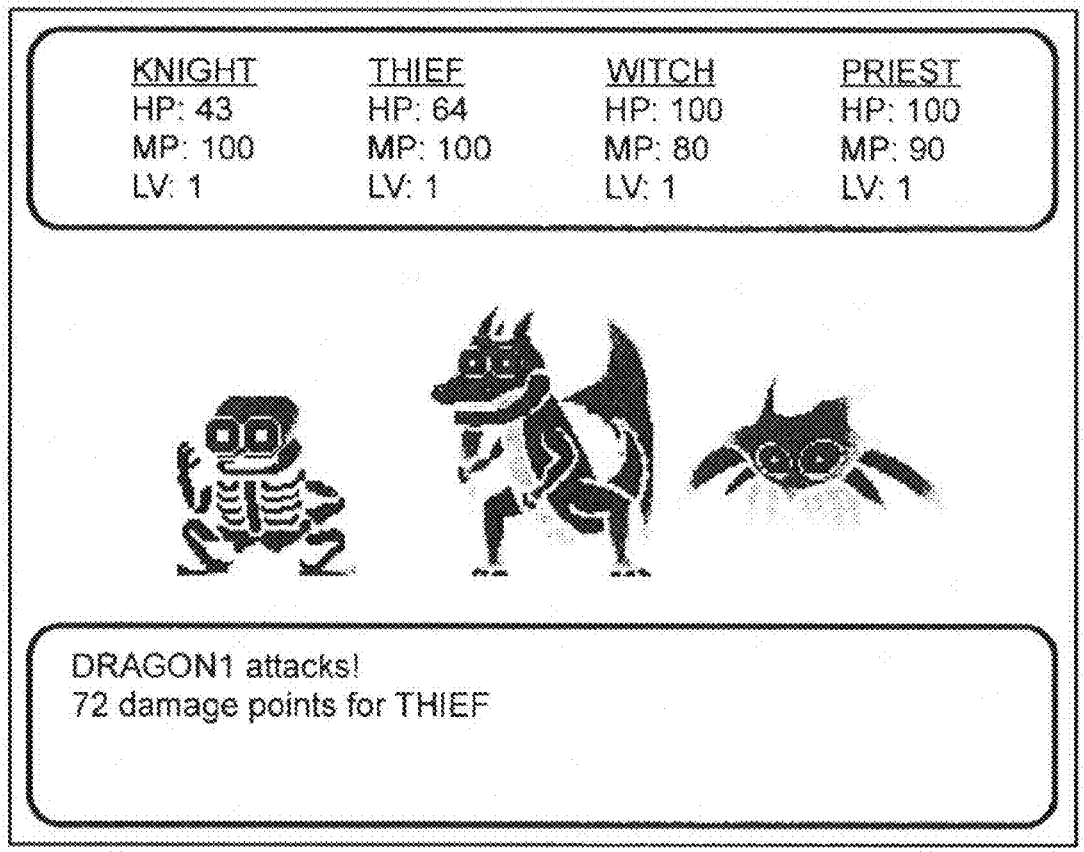
FIG. 68 is a diagram useful in explaining an application to a role-playing game.

Next, a method of applying the technology according to the above embodiment to a role-playing game will be described with reference to FIGS. 68 to 79. Here, let us consider an automated construction method for a thought routine that automatically and intelligently operates a character in place of a player in a fight scene in a role-playing game. Note that the rules of the role-playing game considered here are as shown in FIG. 68. As shown in FIG. 68, the state S is information provided to the player and the action a is a command for operating a character.

Figure 69:
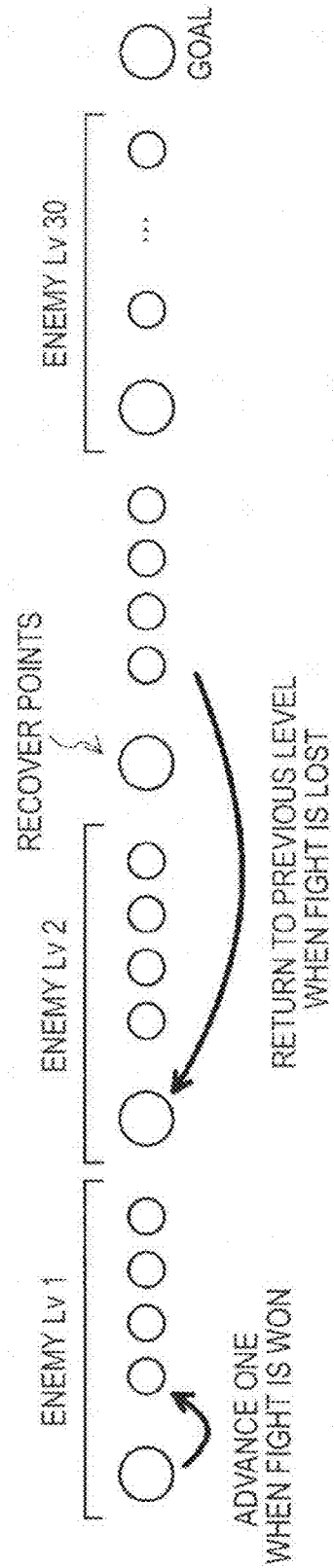
FIG. 69 is a diagram useful in explaining an application to a role-playing game.
Figure 76:
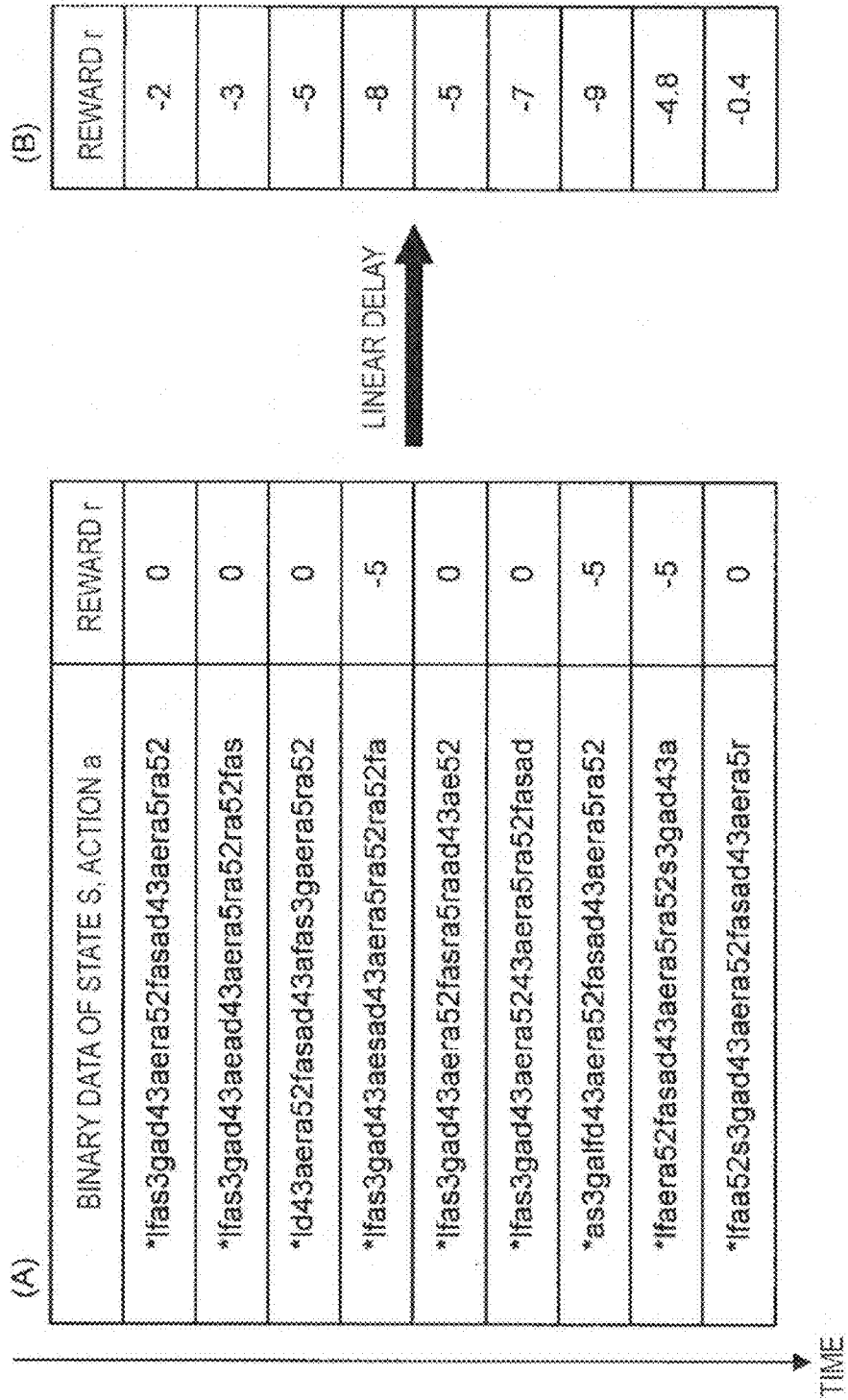
FIG. 76 is a diagram useful in explaining an application to a role-playing game.

The environment of the fight scene is as shown in FIG. 69. First, if a fight is won, experience points are divided up between the survivors. In addition, by accumulating experience points, a character can "level up". When a character levels up, the status value increases in keeping with the profession of the character and/or the character becomes able to use magic. When a character wins five consecutive fights, the level of the enemy is increased by one and the hit points of the character are regained. The game is cleared when the enemy level reaches 31.

Note that in a fight scene, the timing at which each character takes action is decided in keeping with a "speed" value that is part of the status of each character. Also, the actions that can be taken by a character are "attack" and "use magic" (if the character has magic abilities). The types of magic are "heal", "fire", and "ice". "Heal" is magic that causes allies to recover hit points (HP). "Fire" is magic that attacks an enemy using fire. "Ice" is magic that attacks an enemy using ice. It is also possible to select whether the target of the magic is a single enemy or all enemies. However, if all enemies are selected, the effect of the magic is halved. Also, the type and level of the magic that can be used change according to the level of the character. In addition, even for the same magic, the higher the level of the magic, the larger the number of magic points (MP) consumed and the larger the effect.

The professions of characters and the status for each profession are as shown in FIG. 70. The status increase rate shows the rate at which the status increases when the level of a character goes up by one. The magic level Lv shows the level of the possessed magic ability when the level indicated by the value has been reached. Blanks indicate that the corresponding magic ability is not available. The value 0 indicates that the corresponding magic ability is available from the start. Note that a party of allies is composed of characters with the upper four types of profession. Meanwhile, a party of enemies is composed of characters selected from characters with the lower four types of profession.

The information on the allies side used as the state S is shown in FIG. 71. As one example, the level, profession, HP, max HP, MP, max MP, attack strength, defense strength, and speed of each of the surviving allies are used as the state S. Note that for the profession columns, "1" is given as the value in the column of the corresponding profession and "0" is given in the other profession columns. The current values are written in the other columns relating to HP and the like. Meanwhile, the information on the enemy side used as the state S is shown in FIG. 72. As one example, the level, profession, and total damage of the surviving enemies are used as the state S. Note that the total damage is the total of the damage that has been caused thus far.

Also, the information on the allies side used as the action a is shown in FIG. 73. As one example, 1 is given for the performer (i.e., the character about to perform the action) and 0 is given for the other characters. In the action target column, 1 is given for the characters who will receive the action and 0 is given for the other characters. For example, 1 is given in the action target column corresponding to a character who is to receive healing magic. Also, 1 is given in the action type column of the action to be taken and 0 is given in the action type columns of actions not to be taken. Meanwhile, the information on the enemy side used as the action a is shown in FIG. 74. As shown in FIG. 74, information on the action target is used as the information on the enemy side.

In the same way as the example applications described earlier, the information processing apparatus 10 first acquires action history data. At this time, the information processing apparatus 10 applies weightings to the selection probabilities for each type of action and acquires action history data using Innate that randomly selects an action. For example, the information processing apparatus 10 causes the characters to carry out an action using Innate where the probability of selecting attack has been set higher than magic. As shown in FIG. 75, the information processing apparatus 10 sets a reward of "−5" in the action history data if an ally is defeated and a reward of "1" in the action history data if an enemy is defeated. As a result, action history data such as that shown in FIG. 76A is obtained. However, to further take into consideration an evaluation of the process by which an ally or an enemy is defeated, the information processing apparatus 10 causes linear decay in the rewards as shown in FIG. 76B.

Figure 77:
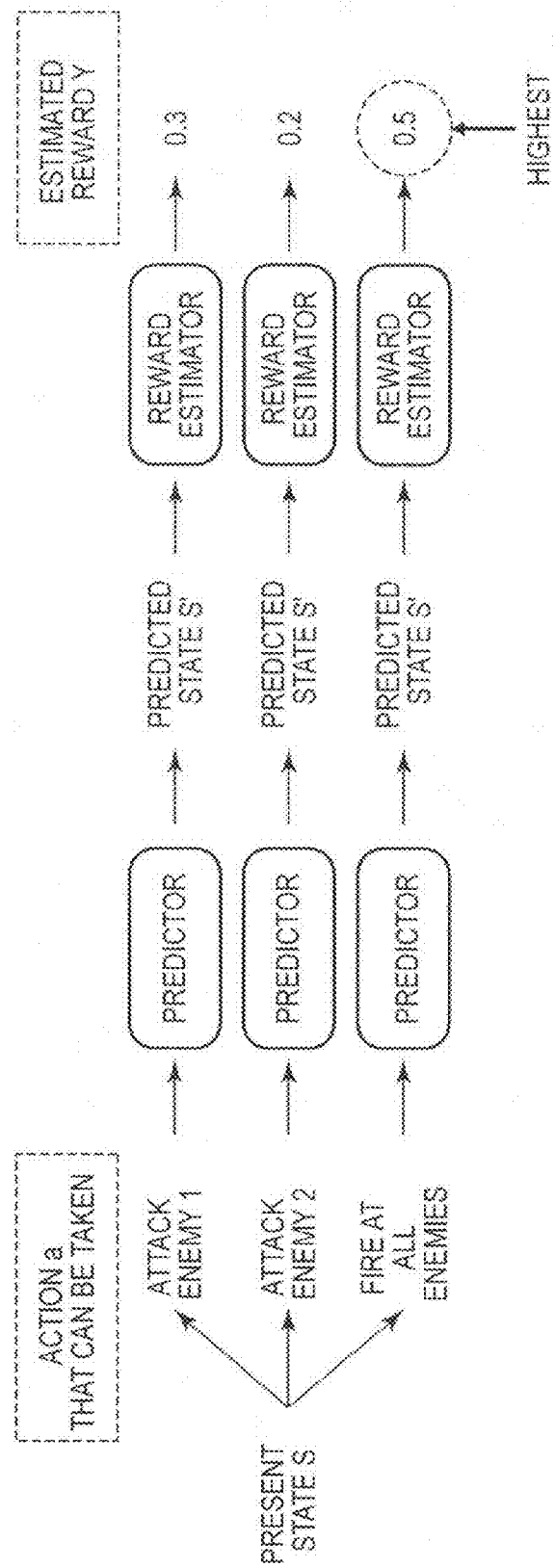
FIG. 77 is a diagram useful in explaining an application to a role-playing game.

The information processing apparatus 10 constructs the thought routine using the action history data acquired as described above. At this time, the information processing apparatus 10 constructs a predictor that estimates the state S' at time t+1 from the state S at the time t and the action a. The information processing apparatus 10 also constructs a reward estimator that calculates estimated rewards from the state S' at time t+1. As shown in FIG. 77, the information processing apparatus 10 then uses a predictor to predict the next state S' for each action that can be taken by a character in the present state S. In addition, the information processing apparatus 10 inputs the predicted state S' into the reward estimator to calculate the estimated rewards y. The information processing apparatus 10 that has calculated the estimated rewards y selects the action a where the estimated reward y is the highest.

Figure 78:
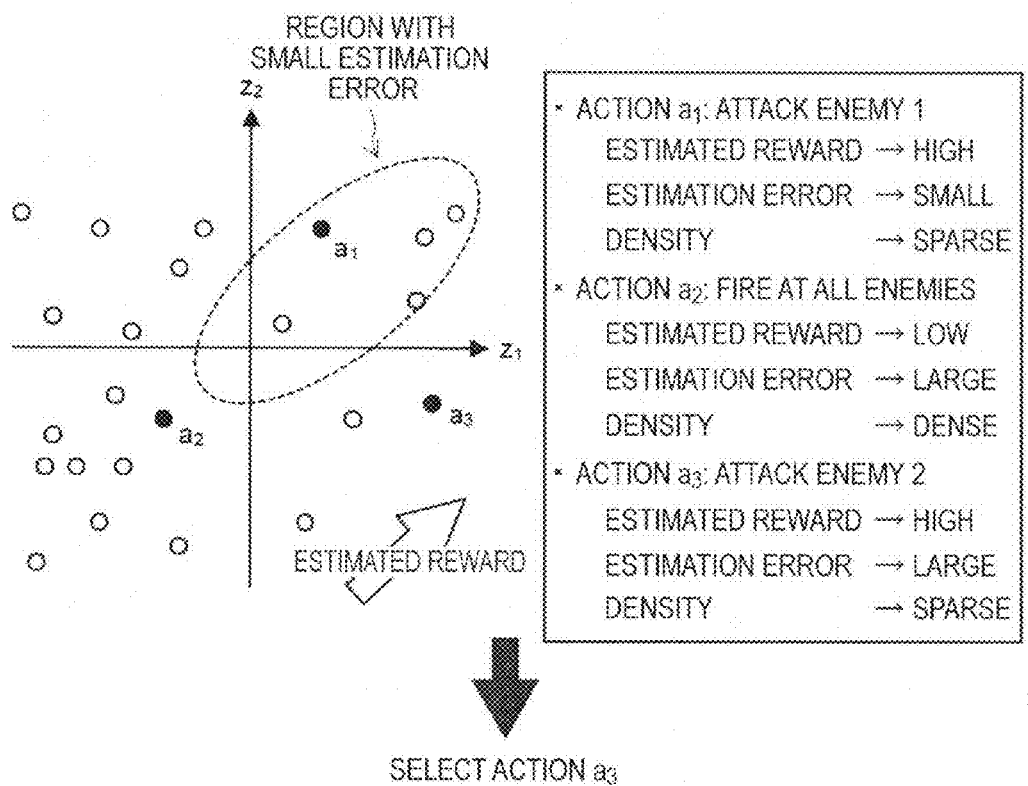
FIG. 78 is a diagram useful in explaining an application to a role-playing game.

In the example in FIG. 77, the estimated reward y corresponding to the action a="Fire at all enemies" is the highest. For this reason, in this example, action a="Fire at all enemies" is selected as the optimal action. Here, as shown in FIG. 78, the thought routine may be configured so as to select an action with a high estimated reward, a high estimation error, and which corresponds to feature amount coordinates in a region with a sparse density in the feature amount space. That is, the thought routine may be constructed based on the reward score, the unknown score, and the error score introduced for the efficient method of constructing a reward estimator described earlier.

Note that the reward scores are obtained by finding the estimated rewards for all of the actions that can be taken using a reward estimator and assigning scores that increase as the estimated reward increases, such as 1, 2, 3, . . . in order from the lowest estimated reward. The unknown scores are obtained by finding the peripheral densities of the feature amount coordinates for all of the actions using the method shown in FIG. 25 or the like and assigning scores that increase as the density falls, such as 1, 2, 3, . . . in order from the highest density.

Also to find the error scores, the information processing apparatus 10 first compares the values of estimated rewards y with the actual rewards r and finds the error for all of the existing action history data. Next, the information processing apparatus 10 plots the feature amount coordinates corresponding to action history data whose error is larger than a mean value in the feature amount space. After this, the information processing apparatus 10 finds the density distribution of the feature amount coordinates that have been plotted. Finally, the information processing apparatus 10 finds the density for the feature amount coordinates corresponding to all of the action history data and assigns scores that increase as the density increases, such as 1, 2, 3, . . . in order from the lowest density.

As one example, when the reward score is expressed as $s_1$, the unknown score as $s_2$, and the error score as $s_3$, when selecting an action, the information processing apparatus 10 calculates a value $s_1 \times w_1 + s_2 \times w_2 + s_3 \times w_3$ (where $w_1$ to $w_3$ are specified weightings) and selects the action for which such value is the highest. By selecting an action in this way, it is possible to select an action with a high reward, a large estimation error, and whose feature amount coordinates are in a region with a sparse density in the feature amount space.

Figure 79:
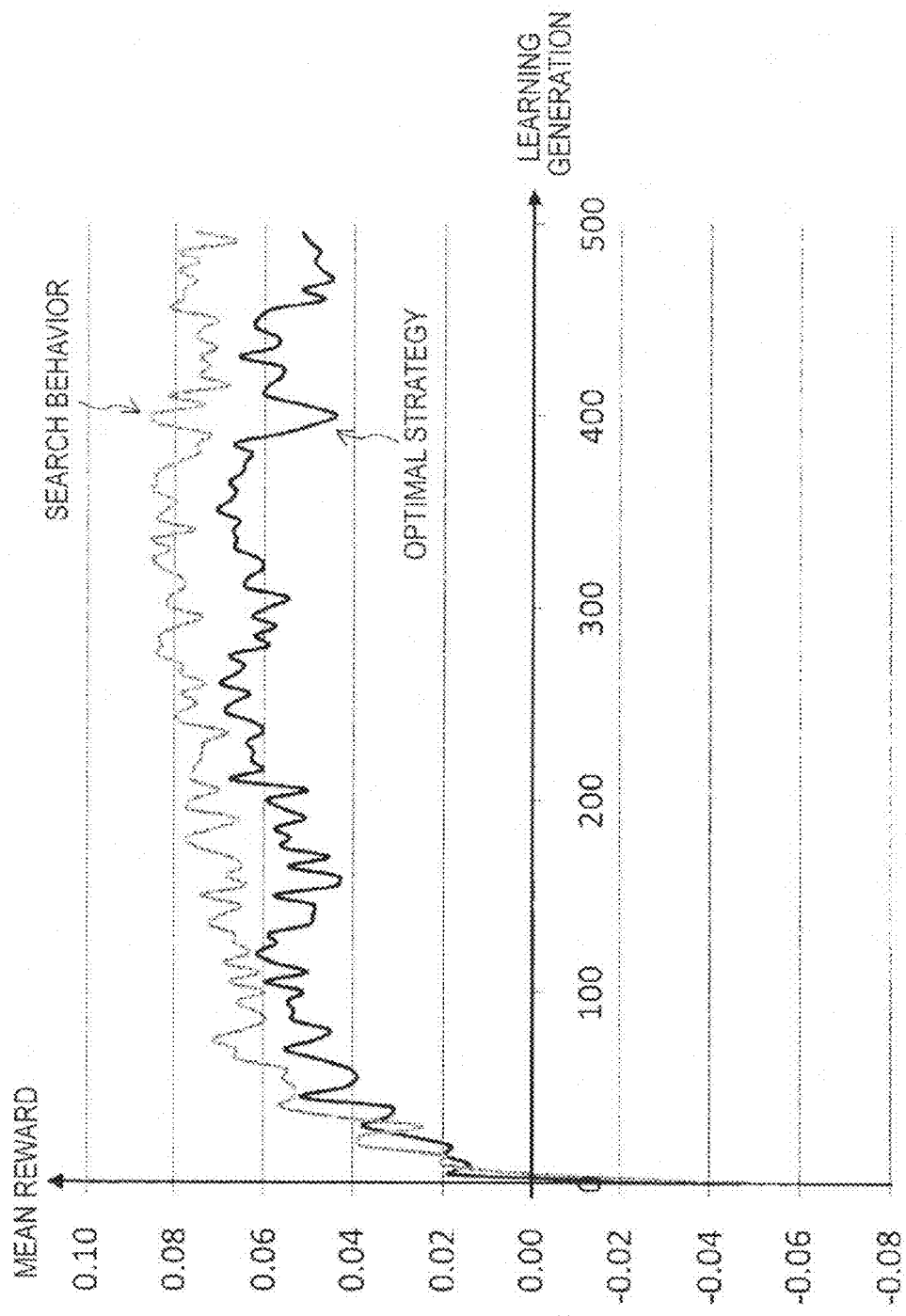
FIG. 79 is a diagram useful in explaining an application to a role-playing game.

The effect of using the efficient method of constructing a reward estimator will now be described with reference to FIG. 79. The graph in FIG. 79 is a graph in which the mean reward per step until a scenario is cleared is compared for a case where the action for which the highest estimated reward is obtained was selected ("optimal strategy") and a case where the efficient method of constructing the reward estimator was used ("search behavior"). As should be clear from the graph in FIG. 79, a high reward is stably obtained by the thought routine (search behavior) constructed so as to use the three scores. From this evaluation result, it was understood that it is possible to reduce the computation load and to also construct a thought routine with higher performance by using the efficient method of constructing a reward estimator Note that it was also understood that the automatically constructed thought routine applied to a role playing game is also capable of adding the following strategies.

(A) Concentrated Attack

A concentrated attack is made to rapidly reduce the number of enemies.

(B) Recover if HP Falls

HP of an ally who has suffered a fall in HP are recovered to protect the ally from defeat (C) Switching Between Individual Attack and Group Attack When there is a comparatively large number of enemies, magic that attacks all enemies is used. If it appears that an enemy currently subjected to a concentrated attack can be defeated by a little damage, it is possible to defeat such enemy and to also cause damage to other enemies using magic that attacks every enemy.

(D) Avoiding Wasted Use of Magic

Healing magic is not used on allies that have not suffered a fall in HP. Magic is also not used on enemies for which the magic has no effect.

This completes the description of an application to a role-playing game.

As described above, by applying the technology according to the above embodiment, it is possible to automatically construct a variety of thought routines without requiring manual adjustment.

4: Example Hardware Configuration

Figure 80:
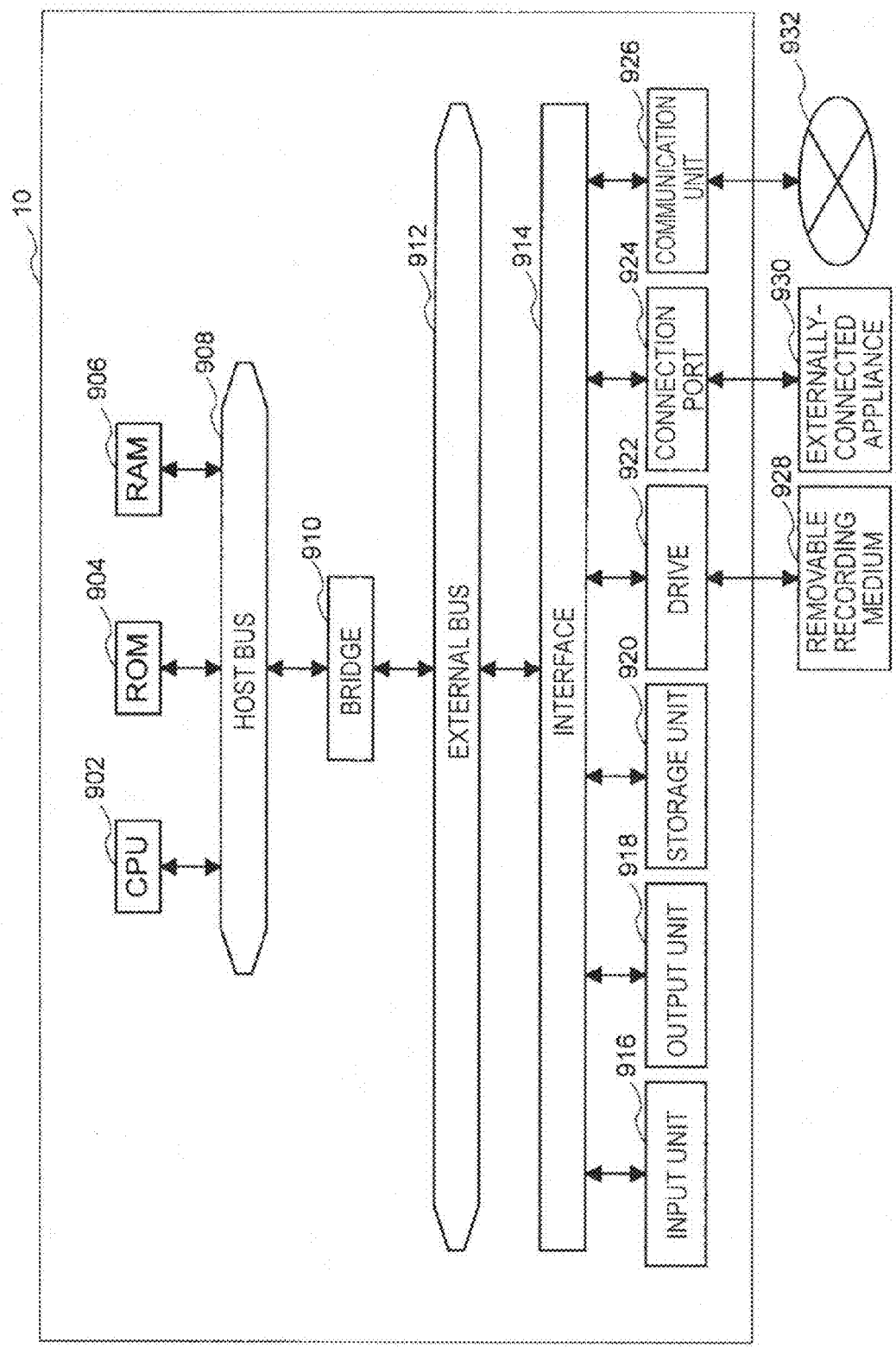
FIG. 80 is a diagram useful in explaining an example hardware configuration capable of realizing the functions of an information processing apparatus.

The functions of the respective component elements of the information processing apparatus 10 described above can be realized using the hardware configuration shown in FIG. 80, for example. That is, the functions of the respective component elements are realized by controlling the hardware shown in FIG. 80 using a computer program. Note that the form of the hardware is arbitrary and as examples includes a personal computer, a mobile phone, a PHS, a mobile information terminal such as a PDA, a game console, or a variety of intelligent home appliances. Here, the expression "PHS" is an abbreviation for "Personal Handy-phone System". The expression "PDA" given above is an abbreviation for "Personal Digital Assistant".

As shown in FIG. 80, the hardware mainly includes a CPU 902, a ROM 904, a RAM 906, a host bus 908, and a bridge 910. In addition, the hardware includes an external bus 912, an interface 914, an input unit 916, an output unit 918, a storage unit 920, a drive 922, a connection port 924, and a communication unit 926. Here, the expression "CPU" is an abbreviation for "Central Processing Unit". The expression "ROM" is an abbreviation for "Read Only Memory". The expression "RAM" is an abbreviation for "Random Access Memory"

The CPU 902 functions as a computational processing apparatus or a control apparatus, for example, and all or some of the operations of the respective component elements are controlled based on various programs recorded in the ROM 904, the RAM 906, the storage unit 920, or a removable recording medium 928. The ROM 904 is a device that stores a program written into the CPU 902 and data and the like used in the computation. In the RAM 906, as examples a program written into the CPU 902 and various parameters that change as appropriate when such program is executed are temporarily or permanently stored.

As one example, such component elements are connected to one another via the host bus 908 that is capable of high speed data transfer. Meanwhile, as one example, the host bus 908 is connected via the bridge 910 to the external bus 912 that has a comparatively low data transfer speed. As the input unit 916, as examples, a mouse, a keyboard, a touch panel, buttons, switches, and levers are used. In addition, a remote controller capable of transmitting a control signal using infrared or other electromagnetic waves may be used as the input unit 916.

The output unit 918 is an apparatus that audibly or visibly notifies the user of acquired information, such as a display apparatus like a CRT, an LCD, a PDP, or an ELD, an audio output apparatus like a speaker or headphones, a printer, a mobile phone, or a facsimile device. Here, "CRT" is an abbreviation for "Cathode Ray Tube", "LCD" is an abbreviation for "Liquid Crystal Display", "PDP" is an abbreviation for "Plasma Display Panel", and "ELD" is an abbreviation for "Electro-Luminescence Display".

The storage unit 920 is an apparatus for storing various types of data. As examples, a magnetic storage device such as a hard disk drive (HDD), a semiconductor storage device, an optical storage device, or a magneto-optical storage device is used as the storage unit 920. Here, "HDD" is an abbreviation for "Hard Disk Drive".

As one example, the drive 922 is an apparatus that reads information recorded on the removable recording medium 928, which may be a magnetic disk, an optical disc, a magneto-optical disc, or a semiconductor memory, or writes information onto the removable recording medium 928. As examples, the removable recording medium 928 is a DVD medium, a Blu-ray medium, an HD-DVD medium, or various types of semiconductor storage media. It should be obvious that as other examples, the removable recording medium 928 may be an IC card equipped with a contactless IC chip, an electronic appliance, or the like. Here, "IC" is an abbreviation for "Integrated Circuit".

The connection port 924 is a port, such as a USB port, a IEEE 1394 port, a SCSI, an RS-232C port, or an optical audio jack, for connecting to an externally-connected appliance 930. The externally-connected appliance 930 is a printer, a mobile music player, a digital camera, a digital video camera, or an IC recorder, for example. Here, "USB" is an abbreviation for "Universal Serial Bus" and "SCSI" is an abbreviation for "Small Computer System Interface".

The communication unit 926 is a communication device for connecting to the network 932 and as examples is a communication card for wired or wireless LAN, Bluetooth (registered trademark), or WUSB, a router for optical communication, an ADSL router, or various types of communication modem. The network 932 connected to the communication unit 926 is configured by a network that is connected wirelessly or using wires, and as examples is the Internet, a home LAN, infrared communication, visible light communication, a broadcast, or satellite communication. Here, "LAN" is an abbreviation for "Local Area Network" and "WUSB" is an abbreviation for "Wireless USB". "ADSL" is an abbreviation for "Asymmetric Digital Subscriber Line".

This completes the description of an example hardware configuration.

5: Conclusion

Finally, the technical concept of the above embodiment will be summarized in brief. The technical concept given below can be applied to a variety of information processing apparatuses such as a PC, a mobile phone, a mobile game console, a mobile information terminal, an intelligent home appliance, or a car navigation system.

The function configuration of the information processing apparatus described above can be expressed as shown below. For example, the information processing apparatus described in (1) below can automatically construct a reward estimator using action history data. When such reward estimator is used, it is possible to estimate, for every action that can be taken by an agent in response to a state in which the agent is present, a reward obtained by the agent on carrying out such action. This means that by carrying out control to have the agent take an action estimated to obtain a high reward, it is possible to realize intelligent action for an agent. In other words, the information processing apparatus described in (1) below is able to automatically construct a thought routine capable of realizing intelligent action for an agent. In particular, since the information processing apparatus described in (1) below preferentially selects an action whose reward value is high and is not included in the action history data, it is possible to automatically construct a thought routine efficiently.

(1) An information processing apparatus comprising:

a reward estimator generating unit using action history data, which includes state data expressing a state of an agent, action data expressing an action taken by the agent in the state, and a reward value expressing a reward obtained by the agent as a result of the action, as learning data to generate, through machine learning, a reward estimator that estimates the reward value from inputted state data and action data;

an action selecting unit preferentially selecting, out of actions that can be taken by the agent, an action that has a high reward value estimated using the reward estimator and is not included in the action history data; and an action history adding unit causing the agent to carry out the action according to a selection result of the action selecting unit and adding to the action history data the state data and the action data obtained in a process of the action and a reward value obtained as a result of the action in association with each other, wherein the reward estimator generating unit is operable when a set of the state data, the action data, and the reward value has been added to the action history data, to regenerate the reward estimator.

(2) The information processing apparatus according to (1),
wherein the action selecting unit preferentially selects an action that has a high reward value estimated using the reward estimator, has a high estimation error for the reward value, and is not included in the action history data.

(3) The information processing apparatus according to (1) or (2),
wherein the reward estimator generating unit includes:
a basis function generating unit generating a plurality of basis functions by combining a plurality of processing functions;
a feature amount vector calculating unit calculating feature amount vectors by inputting the state data and the action data included in the action history data into the plurality of basis functions; and
an estimation function calculating unit calculating an estimation function that estimates the reward value included in the action history data from the feature amount vectors according to regressive/discriminative learning,
wherein the reward estimator includes the plurality of basis functions and the estimation function.

(4) The information processing apparatus according to (3),
wherein the feature amount vector calculating unit is operable when a set of the state data, the action data, and the reward value has been added to the action history data, to calculate feature amount vectors for all of the state data and the action data included in the action history data, and
the information processing apparatus further comprises a distribution adjusting unit sampling the sets of the state data, the action data, and the reward value included in the action history data so that a distribution of coordinate points indicated by the feature amount vectors in a feature amount space approaches a specified distribution.

(5) The information processing apparatus according to (3),
wherein the feature amount vector calculating unit is operable when a set of the state data, the action data, and the reward value has been added to the action history data, to calculate feature amount vectors for all of the state data and the action data included in the action history data, and
the information processing apparatus further comprises a distribution adjusting unit setting weightings for the sets of the state data, the action data, and the reward value included in the action history data so that a distribution of coordinate points indicated by the feature amount vectors in a feature amount space approaches a specified distribution.

(6) The information processing apparatus according to (4),
wherein the distribution adjusting unit sets weightings for the sets of the state data, the action data, and the reward value included in the action history data so that the distribution of coordinate points indicated by the feature amount vectors in a feature amount space for the sets of the state data, the action data, and the reward value remaining after sampling approaches a specified distribution.

(7) The information processing apparatus according to any one of (3) to (6),
wherein the basis function generating unit updates the basis functions based on a genetic algorithm,
the feature amount vector calculating unit is operable when the basis functions have been updated, to input the state data and the action data into the updated basis functions to calculate the feature amount vectors, and the estimation function calculating unit calculates the estimation function that estimates the reward value in response to input of the feature amount vectors calculated using the updated basis functions.

(8) An information processing apparatus comprising:
a reward estimator generating unit using action history data, which includes state data expressing a state of an agent, action data expressing an action taken by the agent in the state, and a reward value expressing a reward obtained by the agent as a result of the action, as learning data to generate, through machine learning, a reward estimator that estimates the reward value from inputted state data and action data;
an action selecting unit preferentially selecting, out of actions that can be taken by the agent, an action that has a high reward value estimated using the reward estimator and whose reward value has a large estimation error; and
an action history adding unit causing the agent to carry out the action according to a selection result of the action selecting unit and adding to the action history data the state data and the action data obtained in a process of the action and a reward value obtained as a result of the action in association with each other,
wherein the reward estimator generating unit is operable when a set of the state data, the action data, and the reward value has been added to the action history data, to regenerate the reward estimator.

(9) An information processing method comprising:
using action history data, which includes state data expressing a state of an agent, action data expressing an action taken by the agent in the state, and a reward value expressing a reward obtained by the agent as a result of the action, as learning data to generate, through machine learning, a reward estimator that estimates the reward value from inputted state data and action data;
preferentially selecting, out of actions that can be taken by the agent, an action that has a high reward value estimated using the reward estimator and is not included in the action history data;
causing the agent to carry out the action according to a selection result and adding to the action history data the state data and the action data obtained in a process of the action and a reward value obtained as a result of the action in association with each other; and
regenerating the reward estimator when a set of the state data, the action data, and the reward value has been added to the action history data.

(10) An information processing method comprising:
using action history data, which includes state data expressing a state of an agent, action data expressing an action taken by the agent in the state, and a reward value expressing a reward obtained by the agent as a result of the action, as learning data to generate, through machine learning, a reward estimator that estimates the reward value from inputted state data and action data;
preferentially selecting, out of actions that can be taken by the agent, an action that has a high reward value estimated using the reward estimator and whose reward value has a large estimation error;
causing the agent to carry out the action according to a selection result and adding to the action history data the state data and the action data obtained in a process of the action and a reward value obtained as a result of the action in association with each other; and
regenerating the reward estimator when a set of the state data, the action data, and the reward value has been added to the action history data.

(11) A program causing a computer to realize:

a reward estimator generating function using action history data, which includes state data expressing a state of an agent, action data expressing an action taken by the agent in the state, and a reward value expressing a reward obtained by the agent as a result of the action, as learning data to generate, through machine learning, a reward estimator that estimates the reward value from inputted state data and action data;

an action selecting function preferentially selecting, out of actions that can be taken by the agent, an action that has a high reward value estimated using the reward estimator and is not included in the action history data; and an action history adding function causing the agent to carry out the action according to a selection result of the action selecting function and adding to the action history data the state data and the action data obtained in a process of the action and a reward value obtained as a result of the action in association with each other, wherein the reward estimator generating function is operable when a set of the state data, the action data, and the reward value has been added to the action history data, to regenerate the reward estimator.

(12) A program causing a computer to realize:

a reward estimator generating function using action history data, which includes state data expressing a state of an agent, action data expressing an action taken by the agent in the state, and a reward value expressing a reward obtained by the agent as a result of the action, as learning data to generate, through machine learning, a reward estimator that estimates the reward value from inputted state data and action data;

an action selecting function preferentially selecting, out of actions that can be taken by the agent, an action that has a high reward value estimated using the reward estimator and whose reward value has a large estimation error; and an action history adding function causing the agent to carry out the action according to a selection result of the action selecting function and adding to the action history data the state data and the action data obtained in a process of the action and a reward value obtained as a result of the action in association with each other, wherein the reward estimator generating function is operable when a set of the state data, the action data, and the reward value has been added to the action history data, to regenerate the reward estimator.

Comments

The reward estimator constructing unit 12 described above is one example of a "reward estimator generating unit". The action history data acquiring unit 11 described above is one example of an "action history adding unit". The basis function list generating unit 121 described above is one example of a "basis function generating unit". The feature amount calculating unit 122 described above is one example of a "feature amount vector calculating unit". The estimation function generating unit 123 described above is one example of an "estimation function calculating unit". The action history data integrating unit 124 described above is one example of a "distribution adjusting unit".

Although a preferred embodiment of the present disclosure has been described above with reference to the attached drawings, it should be obvious that the present disclosure is not limited to the example configurations described in this specification. It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2011-224639 filed in the Japan Patent Office on Oct. 12, 2011, the entire content of which is hereby incorporated by reference.

What is claimed is:

1. An information processing apparatus comprising:
circuitry configured to
generate, through machine learning, a reward estimator that estimates a reward value from inputted state data and action data using action history data, which includes state data expressing a state of an agent, action data expressing an action taken by the agent in the state, and the reward value expressing a reward obtained by the agent as a result of the action, as learning data,
preferentially select, out of actions that can be taken by the agent, an action that has a high reward value estimated using the reward estimator and that is not included in the action history data, and
cause the agent to carry out the selected action,
add to the action history data the state data and the action data obtained in a process of the action and a reward value obtained as a result of the action in association with each other,
wherein the circuitry is further configured to, when a set of the state data, the action data, and the reward value has been added to the action history data, regenerate the reward estimator.

2. The information processing apparatus according to claim 1,
wherein the circuitry is further configured to preferentially select an action that has a high reward value estimated using the reward estimator, that has a high estimation error for the reward value, and that is not included in the action history data.

3. The information processing apparatus according to claim 1,
wherein the circuitry is further configured to
generate a plurality of basis functions by combining a plurality of processing functions;
calculate feature amount vectors by inputting the state data and the action data included in the action history data into the plurality of basis functions; and
calculate an estimation function that estimates the reward value included in the action history data from the feature amount vectors according to regressive/discriminative learning.

4. The information processing apparatus according to claim 3,
wherein the circuitry is further configured to
when a set of the state data, the action data, and the reward value has been added to the action history data, calculate feature amount vectors for all of the state data and the action data included in the action history data, and
sample the sets of the state data, the action data, and the reward value included in the action history data so that a distribution of coordinate points indicated by the feature amount vectors in a feature amount space approaches a specified distribution.

5. The information processing apparatus according to claim 3,
wherein the circuitry is further configured to
when a set of the state data, the action data, and the reward value has been added to the action history data, calculate feature amount vectors for all of the state data and the action data included in the action history data, and set weightings for the sets of the state data, the action data, and the reward value included in the action history data so that a distribution of coordinate points indicated by the feature amount vectors in a feature amount space approaches a specified distribution.

6. The information processing apparatus according to claim 4,
wherein the circuitry is further configured to set weightings for the sets of the state data, the action data, and the reward value included in the action history data so that the distribution of coordinate points indicated by the feature amount vectors in a feature amount space for the sets of the state data, the action data, and the reward value remaining after sampling approaches a specified distribution.

7. The information processing apparatus according to claim 3,
wherein the circuitry is further configured to
update the basis functions based on a genetic algorithm,
when the basis functions have been updated, input the state data and the action data into the updated basis functions to calculate the feature amount vectors, and
calculate the estimation function that estimates the reward value in response to input of the feature amount vectors calculated using the updated basis functions.

8. An information processing apparatus comprising:
circuitry configured to
generate, through machine learning, a reward estimator that estimates the reward value from inputted state data and action data using action history data, which includes state data expressing a state of an agent, action data expressing an action taken by the agent in the state, and a reward value expressing a reward obtained by the agent as a result of the action, as learning data,
preferentially select, out of actions that can be taken by the agent, an action that has a high reward value estimated using the reward estimator and whose reward value has a large estimation error, and
cause the agent to carry out the selected action,
add to the action history data the state data and the action data obtained in a process of the action and a reward value obtained as a result of the action in association with each other,
wherein the circuitry is further configured to, when a set of the state data, the action data, and the reward value has been added to the action history data, to regenerate the reward estimator.

9. An information processing method comprising:
generating, through machine learning, a reward estimator that estimates the reward value from inputted state data and action data using action history data, which includes state data expressing a state of an agent, action data expressing an action taken by the agent in the state, and a reward value expressing a reward obtained by the agent as a result of the action, as learning data;
preferentially selecting, out of actions that can be taken by the agent, an action that has a high reward value estimated using the reward estimator and is not included in the action history data;
causing the agent to carry out the action according to a selection result and adding to the action history data the state data and the action data obtained in a process of the action and a reward value obtained as a result of the action in association with each other; and
regenerating the reward estimator when a set of the state data, the action data, and the reward value has been added to the action history data.

10. An information processing method comprising:
generating, through machine learning, a reward estimator that estimates the reward value from inputted state data and action data using action history data, which includes state data expressing a state of an agent, action data expressing an action taken by the agent in the state, and a reward value expressing a reward obtained by the agent as a result of the action, as learning data;
preferentially selecting, out of actions that can be taken by the agent, an action that has a high reward value estimated using the reward estimator and whose reward value has a large estimation error;
causing the agent to carry out the action according to a selection result and adding to the action history data the state data and the action data obtained in a process of the action and a reward value obtained as a result of the action in association with each other; and
regenerating the reward estimator when a set of the state data, the action data, and the reward value has been added to the action history data.

11. A non-transitory computer readable medium having stored thereon a program that when executed by a computer causes the computer to implement an information processing method comprising:
generating, through machine learning, a reward estimator that estimates the reward value from inputted state data and action data using action history data, which includes state data expressing a state of an agent, action data expressing an action taken by the agent in the state, and a reward value expressing a reward obtained by the agent as a result of the action, as learning data;
preferentially selecting, out of actions that can be taken by the agent, an action that has a high reward value estimated using the reward estimator and is not included in the action history data;
causing the agent to carry out the action according to a selection result and adding to the action history data the state data and the action data obtained in a process of the action and a reward value obtained as a result of the action in association with each other; and
regenerating the reward estimator when a set of the state data, the action data, and the reward value has been added to the action history data.

12. A non-transitory computer readable medium having stored thereon a program that when executed by a computer causes the computer to implement an information processing method comprising:
generating, through machine learning, a reward estimator that estimates the reward value from inputted state data and action data using action history data, which includes state data expressing a state of an agent, action data expressing an action taken by the agent in the state, and a reward value expressing a reward obtained by the agent as a result of the action, as learning data;
preferentially selecting, out of actions that can be taken by the agent, an action that has a high reward value estimated using the reward estimator and whose reward value has a large estimation error;
causing the agent to carry out the action according to a selection result and adding to the action history data the state data and the action data obtained in a process of the action and a reward value obtained as a result of the action in association with each other; and
regenerating the reward estimator when a set of the state data, the action data, and the reward value has been added to the action history data.

* * * * *